(12) United States Patent
Blank et al.

(10) Patent No.: US 11,957,072 B2
(45) Date of Patent: Apr. 16, 2024

(54) PRE-EMERGENCE WEED DETECTION AND MITIGATION SYSTEM

(71) Applicant: Deere & Company, Moline, IL (US)

(72) Inventors: Sebastian Blank, Moline, IL (US); Curtis R. Hammer, Bettendorf, IA (US); Noel W. Anderson, Fargo, ND (US); Dohn W. Pfeiffer, Bettendorf, IA (US); Gurmukh H. Advani, West Fargo, ND (US)

(73) Assignee: Deere & Company, Moline, IL (US)

( * ) Notice: Subject to any disclaimer, the term of this patent is extended or adjusted under 35 U.S.C. 154(b) by 1084 days.

(21) Appl. No.: 16/783,475

(22) Filed: Feb. 6, 2020

(65) Prior Publication Data
US 2021/0243938 A1  Aug. 12, 2021

(51) Int. Cl.
| | |
|---|---|
| A01B 79/00 | (2006.01) |
| A01B 79/02 | (2006.01) |
| A01C 5/08 | (2006.01) |
| A01M 7/00 | (2006.01) |
| G05D 1/00 | (2006.01) |
| G06T 3/06 | (2024.01) |

(52) U.S. Cl.
CPC ............ *A01B 79/005* (2013.01); *A01B 79/02* (2013.01); *A01C 5/08* (2013.01); *A01M 7/0089* (2013.01); *G05D 1/0274* (2013.01); *G06T 3/06* (2024.01)

(58) Field of Classification Search
None
See application file for complete search history.

(56) References Cited

U.S. PATENT DOCUMENTS

| | | | |
|---|---|---|---|
| 3,568,157 A | 3/1971 | Downing et al. |
| 3,580,257 A | 5/1971 | Teague |
| 3,599,543 A | 8/1971 | Kerridge |
| 3,775,019 A | 11/1973 | Konig et al. |
| 3,856,754 A | 12/1974 | Habermeier et al. |
| 4,129,573 A | 12/1978 | Bellus et al. |
| 4,166,735 A | 9/1979 | Pilgram et al. |
| 4,183,742 A | 1/1980 | Sasse et al. |
| 4,268,679 A | 5/1981 | Lavanish |

(Continued)

FOREIGN PATENT DOCUMENTS

| | | |
|---|---|---|
| AR | 108898 A1 | 10/2018 |
| AU | 20100224431 | 4/2011 |

(Continued)

OTHER PUBLICATIONS

Colbach et al., "Predictive modelling of weed seed movement in response to superficial tillage tools", 2014, Soil and Tillage Research vol. 138, pp. 1-8 (Year: 2014) (Year: 2014).*

(Continued)

*Primary Examiner* — Jelani A Smith
*Assistant Examiner* — Davin Seol
(74) *Attorney, Agent, or Firm* — Christopher J. Volkmann; z Kelly, Holt & Christenson, PLLC.

(57) ABSTRACT

A computer-implemented method includes obtaining a weed map of a field including a crop, the weed map representing weed plant locations on the field, identifying, based at least in part on the weed map, weed seed locations that represent presence of weed seeds on the field, and generating a control signal for a pre-emergence weed mitigation operation based on the weed seed locations.

19 Claims, 16 Drawing Sheets

(56) References Cited

U.S. PATENT DOCUMENTS

| | | |
|---|---|---|
| 4,349,377 A | 9/1982 | Durr et al. |
| 4,360,677 A | 11/1982 | Doweyko et al. |
| 4,435,203 A | 3/1984 | Funaki et al. |
| 4,493,726 A | 1/1985 | Burdeska et al. |
| 4,527,241 A | 7/1985 | Sheehan et al. |
| 4,566,901 A | 1/1986 | Martin et al. |
| 4,584,013 A | 4/1986 | Brunner |
| 4,687,505 A | 8/1987 | Sylling et al. |
| 4,857,101 A | 8/1989 | Musco et al. |
| 4,911,751 A | 3/1990 | Nyffeler et al. |
| 5,059,154 A | 10/1991 | Reyenga |
| 5,089,043 A | 2/1992 | Hayase et al. |
| 5,246,164 A | 9/1993 | McCann et al. |
| 5,246,915 A | 9/1993 | Lutz et al. |
| 5,250,690 A | 10/1993 | Turner et al. |
| 5,296,702 A | 3/1994 | Beck et al. |
| 5,300,477 A | 4/1994 | Tice |
| 5,416,061 A | 5/1995 | Hewett et al. |
| 5,477,459 A | 12/1995 | Clegg et al. |
| 5,488,817 A | 2/1996 | Paquet et al. |
| 5,563,112 A | 10/1996 | Barnes, III |
| 5,585,626 A | 12/1996 | Beck et al. |
| 5,586,033 A | 12/1996 | Hall |
| 5,592,606 A | 1/1997 | Myers |
| 5,606,821 A | 3/1997 | Sadjadi et al. |
| 5,666,793 A | 9/1997 | Bottinger |
| 5,712,782 A | 1/1998 | Weigelt et al. |
| 5,721,679 A | 2/1998 | Monson |
| 5,767,373 A | 6/1998 | Ward et al. |
| 5,771,169 A | 6/1998 | Wendte |
| 5,789,741 A | 8/1998 | Kinter et al. |
| 5,809,440 A | 9/1998 | Beck et al. |
| 5,841,282 A | 11/1998 | Christy et al. |
| 5,849,665 A | 12/1998 | Gut et al. |
| 5,878,821 A | 3/1999 | Flenker et al. |
| 5,899,950 A | 5/1999 | Milender et al. |
| 5,902,343 A | 5/1999 | Hale et al. |
| 5,915,492 A | 6/1999 | Yates et al. |
| 5,957,304 A | 9/1999 | Dawson |
| 5,974,348 A | 10/1999 | Rocks |
| 5,978,723 A | 11/1999 | Hale et al. |
| 5,991,687 A | 11/1999 | Hale et al. |
| 5,991,694 A | 11/1999 | Gudat et al. |
| 5,995,859 A | 11/1999 | Takahashi |
| 5,995,894 A | 11/1999 | Wendte |
| 5,995,895 A | 11/1999 | Watt et al. |
| 6,004,076 A | 12/1999 | Cook et al. |
| 6,016,713 A | 1/2000 | Hale |
| 6,029,106 A | 2/2000 | Hale et al. |
| 6,041,582 A | 3/2000 | Tiede et al. |
| 6,073,070 A | 6/2000 | Diekhans |
| 6,073,428 A | 6/2000 | Diekhans |
| 6,085,135 A | 7/2000 | Steckel |
| 6,119,442 A | 9/2000 | Hale |
| 6,119,531 A | 9/2000 | Wendte et al. |
| 6,128,574 A | 10/2000 | Diekhans |
| 6,141,614 A | 10/2000 | Janzen et al. |
| 6,178,253 B1 | 1/2001 | Hendrickson et al. |
| 6,185,990 B1 | 2/2001 | Missotten et al. |
| 6,188,942 B1 | 2/2001 | Corcoran et al. |
| 6,199,000 B1 | 3/2001 | Keller et al. |
| 6,204,856 B1 | 3/2001 | Wood et al. |
| 6,205,381 B1 | 3/2001 | Motz et al. |
| 6,205,384 B1 | 3/2001 | Diekhans |
| 6,216,071 B1 | 4/2001 | Motz |
| 6,236,924 B1 | 5/2001 | Motz et al. |
| 6,272,819 B1 | 8/2001 | Wendte et al. |
| 6,327,569 B1 | 12/2001 | Reep |
| 6,374,173 B1 | 4/2002 | Ehlbeck |
| 6,380,745 B1 | 4/2002 | Anderson et al. |
| 6,431,790 B1 | 8/2002 | Anderegg et al. |
| 6,451,733 B1 | 9/2002 | Pidskalny et al. |
| 6,505,146 B1 | 1/2003 | Blackmer |
| 6,505,998 B1 | 1/2003 | Bullivant |
| 6,539,102 B1 | 3/2003 | Anderson et al. |
| 6,549,849 B2 | 4/2003 | Lange et al. |
| 6,584,390 B2 | 6/2003 | Beck |
| 6,591,145 B1 | 7/2003 | Hoskinson et al. |
| 6,591,591 B2 | 7/2003 | Coers et al. |
| 6,592,453 B2 | 7/2003 | Coers et al. |
| 6,604,432 B1 | 8/2003 | Hamblen et al. |
| 6,681,551 B1 | 1/2004 | Sheidler et al. |
| 6,682,416 B2 | 1/2004 | Behnke et al. |
| 6,687,616 B1 | 2/2004 | Peterson et al. |
| 6,729,189 B2 | 5/2004 | Paakkinen |
| 6,735,568 B1 | 5/2004 | Buckwalter et al. |
| 6,834,550 B2 | 12/2004 | Upadhyaya et al. |
| 6,838,564 B2 | 1/2005 | Edmunds et al. |
| 6,846,128 B2 | 1/2005 | Sick |
| 6,932,554 B2 | 8/2005 | Isfort et al. |
| 6,999,877 B1 | 2/2006 | Dyer et al. |
| 7,073,374 B2 | 7/2006 | Berkman |
| 7,167,797 B2 | 1/2007 | Faivre et al. |
| 7,167,800 B2 | 1/2007 | Faivre et al. |
| 7,184,892 B1 | 2/2007 | Dyer et al. |
| 7,191,062 B2 | 3/2007 | Chi et al. |
| 7,194,965 B2 | 3/2007 | Hickey et al. |
| 7,211,994 B1 | 5/2007 | Mergen et al. |
| 7,248,968 B2 | 7/2007 | Reid |
| 7,255,016 B2 | 8/2007 | Burton |
| 7,261,632 B2 | 8/2007 | Pirro et al. |
| 7,302,837 B2 | 12/2007 | Wendte |
| 7,308,326 B2 | 12/2007 | Maertens et al. |
| 7,313,478 B1 | 12/2007 | Anderson et al. |
| 7,318,010 B2 | 1/2008 | Anderson |
| 7,347,168 B2 | 3/2008 | Reckels et al. |
| 7,408,145 B2 | 8/2008 | Holland |
| 7,480,564 B2 | 1/2009 | Metzler et al. |
| 7,483,791 B2 | 1/2009 | Anderegg et al. |
| 7,537,519 B2 | 5/2009 | Huster et al. |
| 7,540,129 B2 | 6/2009 | Kormann |
| 7,557,066 B2 | 7/2009 | Hills et al. |
| 7,628,059 B1 | 12/2009 | Scherbring |
| 7,687,435 B2 | 3/2010 | Witschel et al. |
| 7,703,036 B2 | 4/2010 | Satterfield et al. |
| 7,725,233 B2 | 5/2010 | Hendrickson et al. |
| 7,733,416 B2 | 6/2010 | Gal |
| 7,756,624 B2 | 7/2010 | Diekhans et al. |
| 7,798,894 B2 | 9/2010 | Isfort |
| 7,827,042 B2 | 11/2010 | Jung et al. |
| 7,915,200 B2 | 3/2011 | Epp et al. |
| 7,945,364 B2 | 5/2011 | Schricker et al. |
| 7,993,188 B2 | 8/2011 | Ritter |
| 8,024,074 B2 | 9/2011 | Stelford et al. |
| 8,060,283 B2 | 11/2011 | Mott et al. |
| 8,107,681 B2 | 1/2012 | Gaál |
| 8,145,393 B2 | 3/2012 | Foster et al. |
| 8,147,176 B2 | 4/2012 | Coers et al. |
| 8,152,610 B2 | 4/2012 | Harrington |
| 8,190,335 B2 | 5/2012 | Vik et al. |
| 8,195,342 B2 | 6/2012 | Anderson |
| 8,195,358 B2 | 6/2012 | Anderson |
| 8,213,964 B2 | 7/2012 | Fitzner et al. |
| 8,224,500 B2 | 7/2012 | Anderson |
| 8,252,723 B2 | 8/2012 | Jakobi et al. |
| 8,254,351 B2 | 8/2012 | Fitzner et al. |
| 8,321,365 B2 | 11/2012 | Anderson |
| 8,329,717 B2 | 12/2012 | Minn et al. |
| 8,332,105 B2 | 12/2012 | Laux |
| 8,338,332 B1 | 12/2012 | Hacker et al. |
| 8,340,862 B2 | 12/2012 | Baumgarten et al. |
| 8,407,157 B2 | 3/2013 | Anderson |
| 8,428,829 B2 | 4/2013 | Brunnert et al. |
| 8,478,493 B2 | 7/2013 | Anderson |
| 8,488,865 B2 | 7/2013 | Hausmann et al. |
| 8,494,727 B2 | 7/2013 | Green et al. |
| 8,527,157 B2 | 9/2013 | Imhof et al. |
| 8,544,397 B2 | 10/2013 | Bassett |
| 8,577,561 B2 | 11/2013 | Green et al. |
| 8,606,454 B2 | 12/2013 | Wang et al. |
| 8,626,406 B2 | 1/2014 | Schleicher et al. |
| 8,635,903 B2 | 1/2014 | Oetken et al. |
| 8,649,940 B2 | 2/2014 | Bonefas |
| 8,656,693 B2 | 2/2014 | Madsen et al. |

(56) References Cited

U.S. PATENT DOCUMENTS

| | | |
|---|---|---|
| 8,662,972 B2 | 3/2014 | Behnke et al. |
| 8,671,760 B2 | 3/2014 | Wallrath et al. |
| 8,677,724 B2 | 3/2014 | Chaney et al. |
| 8,738,238 B2 | 5/2014 | Rekow |
| 8,738,244 B2 | 5/2014 | Lenz et al. |
| 8,755,976 B2 | 6/2014 | Peters et al. |
| 8,781,692 B2 | 7/2014 | Kormann |
| 8,789,563 B2 | 7/2014 | Wenzel |
| 8,814,640 B2 | 8/2014 | Behnke et al. |
| 8,843,269 B2 | 9/2014 | Anderson et al. |
| 8,868,304 B2 | 10/2014 | Bonefas |
| 8,909,389 B2 | 12/2014 | Meyer |
| D721,740 S | 1/2015 | Schmaltz et al. |
| 8,942,860 B2 | 1/2015 | Morselli |
| 8,962,523 B2 | 2/2015 | Rosinger et al. |
| 9,002,591 B2 | 4/2015 | Wang et al. |
| 9,008,918 B2 | 4/2015 | Missotten et al. |
| 9,009,087 B1 | 4/2015 | Mewes et al. |
| 9,011,222 B2 | 4/2015 | Johnson et al. |
| 9,014,901 B2 | 4/2015 | Wang et al. |
| 9,043,096 B2 | 5/2015 | Zielke et al. |
| 9,043,129 B2 | 5/2015 | Bonefas et al. |
| 9,066,465 B2 | 6/2015 | Hendrickson et al. |
| 9,072,227 B2 | 7/2015 | Wenzel |
| 9,095,090 B2 | 8/2015 | Casper et al. |
| 9,119,342 B2 | 9/2015 | Bonefas |
| 9,127,428 B2 | 9/2015 | Meier |
| 9,131,644 B2 | 9/2015 | Osborne |
| 9,152,938 B2 | 10/2015 | Lang et al. |
| 9,173,339 B2 | 11/2015 | Sauder et al. |
| 9,179,599 B2 | 11/2015 | Bischoff |
| 9,188,518 B2 | 11/2015 | Snyder et al. |
| 9,188,986 B2 | 11/2015 | Baumann |
| 9,226,449 B2 | 1/2016 | Bischoff |
| 9,234,317 B2 | 1/2016 | Chi |
| 9,235,214 B2 | 1/2016 | Anderson |
| 9,301,447 B2 | 4/2016 | Kormann |
| 9,301,466 B2 | 4/2016 | Kelly |
| 9,313,951 B2 | 4/2016 | Herman et al. |
| 9,326,443 B2 | 5/2016 | Zametzer et al. |
| 9,326,444 B2 | 5/2016 | Bonefas |
| 9,392,746 B2 | 7/2016 | Darr et al. |
| 9,405,039 B2 | 8/2016 | Anderson |
| 9,410,840 B2 | 8/2016 | Acheson et al. |
| 9,439,342 B2 | 9/2016 | Pasquier |
| 9,457,971 B2 | 10/2016 | Bonefas et al. |
| 9,463,939 B2 | 10/2016 | Bonefas et al. |
| 9,485,905 B2 | 11/2016 | Jung et al. |
| 9,489,576 B2 | 11/2016 | Johnson et al. |
| 9,497,898 B2 | 11/2016 | Dillon |
| 9,510,508 B2 | 12/2016 | Jung |
| 9,511,633 B2 | 12/2016 | Anderson et al. |
| 9,511,958 B2 | 12/2016 | Bonefas |
| 9,516,812 B2 | 12/2016 | Baumgarten et al. |
| 9,521,805 B2 | 12/2016 | Muench et al. |
| 9,522,791 B2 | 12/2016 | Bonefas et al. |
| 9,522,792 B2 | 12/2016 | Bonefas et al. |
| 9,523,180 B2 | 12/2016 | Deines |
| 9,529,364 B2 | 12/2016 | Foster et al. |
| 9,532,504 B2 | 1/2017 | Herman et al. |
| 9,538,714 B2 | 1/2017 | Anderson |
| 9,563,492 B2 | 2/2017 | Bell et al. |
| 9,563,848 B1 | 2/2017 | Hunt |
| 9,563,852 B1 | 2/2017 | Wiles et al. |
| 9,578,808 B2 | 2/2017 | Dybro et al. |
| 9,629,308 B2 | 4/2017 | Schøler et al. |
| 9,631,964 B2 | 4/2017 | Gelinske et al. |
| 9,642,305 B2 | 5/2017 | Nykamp et al. |
| 9,648,807 B2 | 5/2017 | Escher et al. |
| 9,675,008 B1 | 6/2017 | Rusciolelli et al. |
| 9,681,605 B2 | 6/2017 | Noonan et al. |
| 9,694,712 B2 | 7/2017 | Healy |
| 9,696,162 B2 | 7/2017 | Anderson |
| 9,699,967 B2 | 7/2017 | Palla et al. |
| 9,714,856 B2 | 7/2017 | Myers |
| 9,717,178 B1 | 8/2017 | Sauder et al. |
| 9,721,181 B2 | 8/2017 | Guan et al. |
| 9,723,790 B2 | 8/2017 | Berry et al. |
| 9,740,208 B2 | 8/2017 | Sugumaran et al. |
| 9,767,521 B2 | 9/2017 | Stuber et al. |
| 9,807,934 B2 | 11/2017 | Rusciolelli et al. |
| 9,807,940 B2 | 11/2017 | Roell et al. |
| 9,810,679 B2 | 11/2017 | Kimmel |
| 9,829,364 B2 | 11/2017 | Wilson et al. |
| 9,848,528 B2 | 12/2017 | Werner et al. |
| 9,856,609 B2 | 1/2018 | Dehmel |
| 9,856,612 B2 | 1/2018 | Oetken |
| 9,861,040 B2 | 1/2018 | Bonefas |
| 9,872,433 B2 | 1/2018 | Acheson et al. |
| 9,903,077 B2 | 2/2018 | Rio |
| 9,903,979 B2 | 2/2018 | Dybro et al. |
| 9,904,963 B2 | 2/2018 | Rupp et al. |
| 9,915,952 B2 | 3/2018 | Dollinger et al. |
| 9,922,405 B2 | 3/2018 | Sauder et al. |
| 9,924,636 B2 | 3/2018 | Lisouski et al. |
| 9,928,584 B2 | 3/2018 | Jens et al. |
| 9,933,787 B2 | 4/2018 | Story |
| 9,974,226 B2 | 5/2018 | Rupp et al. |
| 9,982,397 B2 | 5/2018 | Korb et al. |
| 9,984,455 B1 | 5/2018 | Fox et al. |
| 9,992,931 B2 | 6/2018 | Bonefas et al. |
| 9,992,932 B2 | 6/2018 | Bonefas et al. |
| 10,004,176 B2 | 6/2018 | Mayerle |
| 10,015,928 B2 | 7/2018 | Nykamp et al. |
| 10,019,018 B2 | 7/2018 | Hulin |
| 10,019,790 B2 | 7/2018 | Bonefas et al. |
| 10,025,983 B2 | 7/2018 | Guan et al. |
| 10,028,435 B2 | 7/2018 | Anderson et al. |
| 10,028,451 B2 | 7/2018 | Rowan et al. |
| 10,034,427 B2 | 7/2018 | Krause et al. |
| 10,039,231 B2 | 8/2018 | Anderson et al. |
| 10,064,331 B2 | 9/2018 | Bradley |
| 10,064,335 B2 | 9/2018 | Byttebier et al. |
| 10,078,890 B1 | 9/2018 | Tagestad et al. |
| 10,085,372 B2 | 10/2018 | Noyer et al. |
| 10,091,925 B2 | 10/2018 | Aharoni et al. |
| 10,115,158 B2 | 10/2018 | Lindores |
| 10,126,153 B2 | 11/2018 | Bischoff et al. |
| 10,129,528 B2 | 11/2018 | Bonefas et al. |
| 10,143,132 B2 | 12/2018 | Inoue et al. |
| 10,152,035 B2 | 12/2018 | Reid et al. |
| 10,154,624 B2 | 12/2018 | Guan et al. |
| 10,165,725 B2 | 1/2019 | Sugumaran et al. |
| 10,178,823 B2 | 1/2019 | Kovach et al. |
| 10,183,667 B2 | 1/2019 | Anderson et al. |
| 10,188,037 B2 | 1/2019 | Bruns et al. |
| 10,201,121 B1 | 2/2019 | Wilson |
| 10,209,179 B2 | 2/2019 | Hollstein |
| 10,231,371 B2 | 3/2019 | Dillon |
| 10,254,147 B2 | 4/2019 | Vermue et al. |
| 10,254,765 B2 | 4/2019 | Rekow |
| 10,255,670 B1 | 4/2019 | Wu |
| 10,275,550 B2 | 4/2019 | Lee |
| 10,295,703 B2 | 5/2019 | Dybro et al. |
| 10,310,455 B2 | 6/2019 | Blank et al. |
| 10,314,232 B2 | 6/2019 | Isaac et al. |
| 10,315,655 B2 | 6/2019 | Blank et al. |
| 10,317,272 B2 | 6/2019 | Bhavsar et al. |
| 10,351,364 B2 | 7/2019 | Green et al. |
| 10,368,488 B2 | 8/2019 | Becker et al. |
| 10,398,084 B2 | 9/2019 | Ray et al. |
| 10,408,545 B2 | 9/2019 | Blank et al. |
| 10,412,889 B2 | 9/2019 | Palla et al. |
| 10,426,086 B2 | 10/2019 | Van de Wege et al. |
| 10,437,243 B2 | 10/2019 | Blank et al. |
| 10,462,603 B1 | 10/2019 | Tippery et al. |
| 10,477,756 B2 | 11/2019 | Richt et al. |
| 10,485,178 B2 | 11/2019 | Mayerle |
| 10,521,526 B2 | 12/2019 | Haaland et al. |
| 10,537,061 B2 | 1/2020 | Farley et al. |
| 10,568,316 B2 | 2/2020 | Gall et al. |
| 10,631,462 B2 | 4/2020 | Bonefas |
| 10,677,637 B1 | 6/2020 | Von Muenster |
| 10,681,872 B2 | 6/2020 | Viaene et al. |

(56) References Cited

U.S. PATENT DOCUMENTS

| | | |
|---|---|---|
| 10,703,277 B1 | 7/2020 | Schroeder |
| 10,729,067 B2 | 8/2020 | Hammer et al. |
| 10,740,703 B2 | 8/2020 | Story |
| 10,745,868 B2 | 8/2020 | Laugwitz et al. |
| 10,760,946 B2 | 9/2020 | Meier et al. |
| 10,809,118 B1 | 10/2020 | Von Muenster |
| 10,830,634 B2 | 11/2020 | Blank et al. |
| 10,866,109 B2 | 12/2020 | Madsen et al. |
| 10,890,922 B2 | 1/2021 | Ramm et al. |
| 10,909,368 B2 | 2/2021 | Guo et al. |
| 10,912,249 B1 | 2/2021 | Wilson |
| 11,252,485 B2 | 2/2022 | Celicourt |
| 2002/0011061 A1 | 1/2002 | Lucand et al. |
| 2002/0083695 A1 | 7/2002 | Behnke et al. |
| 2002/0091458 A1 | 7/2002 | Moore |
| 2002/0099471 A1 | 7/2002 | Benneweis |
| 2002/0133309 A1 | 9/2002 | Hardt |
| 2002/0173893 A1 | 11/2002 | Blackmore et al. |
| 2002/0193928 A1 | 12/2002 | Beck |
| 2002/0193929 A1 | 12/2002 | Beck |
| 2002/0198654 A1 | 12/2002 | Lange et al. |
| 2003/0004630 A1 | 1/2003 | Beck |
| 2003/0014171 A1 | 1/2003 | Ma et al. |
| 2003/0015351 A1 | 1/2003 | Goldman et al. |
| 2003/0024450 A1 | 2/2003 | Juptner |
| 2003/0060245 A1 | 3/2003 | Coers et al. |
| 2003/0069680 A1 | 4/2003 | Cohen et al. |
| 2003/0075145 A1 | 4/2003 | Sheidler et al. |
| 2003/0174207 A1 | 9/2003 | Alexia et al. |
| 2003/0182144 A1 | 9/2003 | Pickett et al. |
| 2003/0187560 A1 | 10/2003 | Keller et al. |
| 2003/0216158 A1 | 11/2003 | Bischoff |
| 2003/0229432 A1 | 12/2003 | Ho et al. |
| 2003/0229433 A1 | 12/2003 | van den Berg et al. |
| 2003/0229435 A1 | 12/2003 | Van der Lely |
| 2004/0004544 A1 | 1/2004 | Knutson |
| 2004/0054457 A1 | 3/2004 | Kormann |
| 2004/0073468 A1 | 4/2004 | Vyas et al. |
| 2004/0141641 A1 | 7/2004 | McDonald et al. |
| 2004/0193348 A1 | 9/2004 | Gray et al. |
| 2005/0059445 A1 | 3/2005 | Niermann et al. |
| 2005/0066738 A1 | 3/2005 | Moore |
| 2005/0149235 A1 | 7/2005 | Seal et al. |
| 2005/0150202 A1 | 7/2005 | Quick |
| 2005/0197175 A1 | 9/2005 | Anderson |
| 2005/0241285 A1 | 11/2005 | Maertens et al. |
| 2005/0283314 A1 | 12/2005 | Hall |
| 2005/0284119 A1 | 12/2005 | Brunnert |
| 2006/0014489 A1 | 1/2006 | Fitzner et al. |
| 2006/0014643 A1 | 1/2006 | Hacker et al. |
| 2006/0047377 A1 | 3/2006 | Ferguson et al. |
| 2006/0058896 A1 | 3/2006 | Pokorny et al. |
| 2006/0074560 A1 | 4/2006 | Dyer et al. |
| 2006/0155449 A1 | 7/2006 | Dammann |
| 2006/0162631 A1 | 7/2006 | Hickey et al. |
| 2006/0196158 A1 | 9/2006 | Faivre et al. |
| 2006/0200334 A1 | 9/2006 | Faivre et al. |
| 2007/0005209 A1 | 1/2007 | Fitzner et al. |
| 2007/0021948 A1 | 1/2007 | Anderson |
| 2007/0056258 A1 | 3/2007 | Behnke |
| 2007/0068238 A1 | 3/2007 | Wendte |
| 2007/0073700 A1 | 3/2007 | Wippersteg et al. |
| 2007/0089390 A1 | 4/2007 | Hendrickson et al. |
| 2007/0135190 A1 | 6/2007 | Diekhans et al. |
| 2007/0185749 A1 | 8/2007 | Anderson et al. |
| 2007/0199903 A1 | 8/2007 | Denney |
| 2007/0208510 A1 | 9/2007 | Anderson et al. |
| 2007/0233348 A1 | 10/2007 | Diekhans et al. |
| 2007/0233374 A1 | 10/2007 | Diekhans et al. |
| 2007/0239337 A1 | 10/2007 | Anderson |
| 2007/0282523 A1 | 12/2007 | Diekhans et al. |
| 2007/0298744 A1 | 12/2007 | Fitzner et al. |
| 2008/0030320 A1 | 2/2008 | Wilcox et al. |
| 2008/0098035 A1 | 4/2008 | Wippersteg et al. |
| 2008/0140431 A1 | 6/2008 | Anderson et al. |
| 2008/0177449 A1 | 7/2008 | Pickett et al. |
| 2008/0248843 A1 | 10/2008 | Birrell et al. |
| 2008/0268927 A1 | 10/2008 | Farley et al. |
| 2008/0269052 A1 | 10/2008 | Rosinger et al. |
| 2008/0289308 A1 | 11/2008 | Brubaker |
| 2008/0312085 A1 | 12/2008 | Kordes et al. |
| 2009/0044505 A1 | 2/2009 | Huster et al. |
| 2009/0074243 A1 | 3/2009 | Missotten et al. |
| 2009/0143941 A1 | 6/2009 | Tarasinski et al. |
| 2009/0192654 A1 | 7/2009 | Wendte et al. |
| 2009/0216410 A1 | 8/2009 | Allen et al. |
| 2009/0226036 A1 | 9/2009 | Gaal |
| 2009/0259483 A1 | 10/2009 | Hendrickson et al. |
| 2009/0265098 A1 | 10/2009 | Dix |
| 2009/0306835 A1 | 12/2009 | Ellermann et al. |
| 2009/0311084 A1 | 12/2009 | Coers et al. |
| 2009/0312919 A1 | 12/2009 | Foster et al. |
| 2009/0312920 A1 | 12/2009 | Boenig et al. |
| 2009/0325658 A1 | 12/2009 | Phelan et al. |
| 2010/0036696 A1 | 2/2010 | Lang et al. |
| 2010/0042297 A1 | 2/2010 | Foster et al. |
| 2010/0063626 A1 | 3/2010 | Anderson |
| 2010/0063648 A1 | 3/2010 | Anderson |
| 2010/0063651 A1 | 3/2010 | Anderson |
| 2010/0063664 A1 | 3/2010 | Anderson |
| 2010/0063954 A1 | 3/2010 | Anderson |
| 2010/0070145 A1 | 3/2010 | Foster et al. |
| 2010/0071329 A1 | 3/2010 | Hindryckx et al. |
| 2010/0094481 A1 | 4/2010 | Anderson |
| 2010/0121541 A1 | 5/2010 | Behnke et al. |
| 2010/0137373 A1 | 6/2010 | Hungenberg et al. |
| 2010/0145572 A1 | 6/2010 | Steckel et al. |
| 2010/0152270 A1 | 6/2010 | Suty-Heinze et al. |
| 2010/0152943 A1 | 6/2010 | Matthews |
| 2010/0217474 A1 | 8/2010 | Baumgarten et al. |
| 2010/0268562 A1 | 10/2010 | Anderson |
| 2010/0268679 A1 | 10/2010 | Anderson |
| 2010/0285964 A1 | 11/2010 | Waldraff et al. |
| 2010/0317517 A1 | 12/2010 | Rosinger et al. |
| 2010/0319941 A1 | 12/2010 | Peterson |
| 2010/0332051 A1 | 12/2010 | Kormann |
| 2011/0056178 A1 | 3/2011 | Sauerwein et al. |
| 2011/0059782 A1 | 3/2011 | Harrington |
| 2011/0072773 A1 | 3/2011 | Schroeder et al. |
| 2011/0084851 A1 | 4/2011 | Peterson et al. |
| 2011/0086684 A1 | 4/2011 | Luellen et al. |
| 2011/0160961 A1 | 6/2011 | Wollenhaupt et al. |
| 2011/0213531 A1 | 9/2011 | Farley et al. |
| 2011/0224873 A1 | 9/2011 | Reeve et al. |
| 2011/0227745 A1 | 9/2011 | Kikuchi et al. |
| 2011/0257850 A1 | 10/2011 | Reeve et al. |
| 2011/0270494 A1 | 11/2011 | Imhof et al. |
| 2011/0270495 A1 | 11/2011 | Knapp |
| 2011/0295460 A1 | 12/2011 | Hunt et al. |
| 2011/0307149 A1 | 12/2011 | Pighi et al. |
| 2012/0004813 A1 | 1/2012 | Baumgarten et al. |
| 2012/0029732 A1 | 2/2012 | Meyer |
| 2012/0087771 A1 | 4/2012 | Wenzel |
| 2012/0096827 A1 | 4/2012 | Chaney et al. |
| 2012/0143642 A1 | 6/2012 | O'Neil |
| 2012/0215378 A1 | 8/2012 | Sprock et al. |
| 2012/0215379 A1 | 8/2012 | Sprock et al. |
| 2012/0253611 A1 | 10/2012 | Zielke et al. |
| 2012/0263560 A1 | 10/2012 | Diekhans et al. |
| 2012/0265412 A1 | 10/2012 | Diekhans et al. |
| 2012/0271489 A1 | 10/2012 | Roberts et al. |
| 2012/0323452 A1 | 12/2012 | Green et al. |
| 2013/0019580 A1 | 1/2013 | Anderson et al. |
| 2013/0022430 A1 | 1/2013 | Anderson et al. |
| 2013/0046419 A1 | 2/2013 | Anderson et al. |
| 2013/0046439 A1 | 2/2013 | Anderson et al. |
| 2013/0046525 A1 | 2/2013 | Ali et al. |
| 2013/0103269 A1 | 4/2013 | Meyer Zu Helligen et al. |
| 2013/0124239 A1 | 5/2013 | Rosa et al. |
| 2013/0126399 A1 | 5/2013 | Wolff |
| 2013/0184944 A1 | 7/2013 | Missotten et al. |
| 2013/0185104 A1 | 7/2013 | Klavins |
| 2013/0197767 A1 | 8/2013 | Lenz |
| 2013/0205733 A1 | 8/2013 | Peters et al. |

(56) References Cited

U.S. PATENT DOCUMENTS

| | | |
|---|---|---|
| 2013/0210505 A1 | 8/2013 | Bischoff |
| 2013/0231823 A1 | 9/2013 | Wang et al. |
| 2013/0319941 A1 | 12/2013 | Schneider |
| 2013/0325242 A1 | 12/2013 | Cavender-Bares et al. |
| 2013/0332003 A1 | 12/2013 | Murray et al. |
| 2014/0002489 A1 | 1/2014 | Sauder et al. |
| 2014/0019017 A1 | 1/2014 | Wilken et al. |
| 2014/0021598 A1 | 1/2014 | Sutardja |
| 2014/0050364 A1 | 2/2014 | Brueckner et al. |
| 2014/0067745 A1 | 3/2014 | Avey |
| 2014/0121882 A1 | 5/2014 | Gilmore et al. |
| 2014/0129048 A1 | 5/2014 | Baumgarten et al. |
| 2014/0172222 A1 | 6/2014 | Nickel |
| 2014/0172224 A1 | 6/2014 | Matthews et al. |
| 2014/0172225 A1 | 6/2014 | Matthews et al. |
| 2014/0208870 A1 | 7/2014 | Quaderer et al. |
| 2014/0215984 A1 | 8/2014 | Bischoff |
| 2014/0230391 A1 | 8/2014 | Hendrickson et al. |
| 2014/0230392 A1 | 8/2014 | Dybro et al. |
| 2014/0236381 A1 | 8/2014 | Anderson et al. |
| 2014/0236431 A1 | 8/2014 | Hendrickson et al. |
| 2014/0257911 A1 | 9/2014 | Anderson |
| 2014/0262547 A1 | 9/2014 | Acheson et al. |
| 2014/0277960 A1 | 9/2014 | Blank et al. |
| 2014/0297242 A1 | 10/2014 | Sauder et al. |
| 2014/0303814 A1 | 10/2014 | Burema et al. |
| 2014/0324272 A1 | 10/2014 | Madsen et al. |
| 2014/0331631 A1 | 11/2014 | Sauder et al. |
| 2014/0338298 A1 | 11/2014 | Jung et al. |
| 2014/0350802 A1 | 11/2014 | Biggerstaff et al. |
| 2014/0360148 A1 | 12/2014 | Wienker et al. |
| 2014/0379228 A1 | 12/2014 | Batcheller et al. |
| 2015/0049088 A1 | 2/2015 | Snyder et al. |
| 2015/0088785 A1 | 3/2015 | Chi |
| 2015/0095830 A1 | 4/2015 | Massoumi et al. |
| 2015/0101519 A1 | 4/2015 | Blackwell et al. |
| 2015/0105984 A1 | 4/2015 | Birrell et al. |
| 2015/0124054 A1 | 5/2015 | Darr et al. |
| 2015/0168187 A1 | 6/2015 | Myers |
| 2015/0211199 A1 | 7/2015 | Corcoran et al. |
| 2015/0230403 A1 | 8/2015 | Jung et al. |
| 2015/0242799 A1 | 8/2015 | Seki et al. |
| 2015/0243114 A1 | 8/2015 | Tanabe et al. |
| 2015/0254800 A1 | 9/2015 | Johnson et al. |
| 2015/0264863 A1 | 9/2015 | Muench et al. |
| 2015/0276794 A1 | 10/2015 | Pistrol et al. |
| 2015/0278640 A1 | 10/2015 | Johnson et al. |
| 2015/0285647 A1 | 10/2015 | Meyer zu Helligen et al. |
| 2015/0293029 A1 | 10/2015 | Acheson et al. |
| 2015/0302305 A1 | 10/2015 | Rupp et al. |
| 2015/0305238 A1 | 10/2015 | Klausmann et al. |
| 2015/0305239 A1 | 10/2015 | Jung |
| 2015/0327440 A1 | 11/2015 | Dybro et al. |
| 2015/0351320 A1 | 12/2015 | Takahara et al. |
| 2015/0370935 A1 | 12/2015 | Starr |
| 2015/0373902 A1 | 12/2015 | Pasquier |
| 2015/0373913 A1 | 12/2015 | Berry et al. |
| 2015/0379785 A1 | 12/2015 | Brown,, Jr. et al. |
| 2016/0025531 A1 | 1/2016 | Bischoff et al. |
| 2016/0029558 A1 | 2/2016 | Dybro et al. |
| 2016/0052525 A1 | 2/2016 | Tuncer et al. |
| 2016/0057922 A1 | 3/2016 | Freiberg et al. |
| 2016/0066505 A1 | 3/2016 | Bakke et al. |
| 2016/0073573 A1 | 3/2016 | Ethington et al. |
| 2016/0078375 A1 | 3/2016 | Ethington et al. |
| 2016/0078391 A1 | 3/2016 | Blank et al. |
| 2016/0078570 A1 | 3/2016 | Ethington et al. |
| 2016/0088794 A1 | 3/2016 | Baumgarten et al. |
| 2016/0106038 A1 | 4/2016 | Boyd et al. |
| 2016/0084813 A1 | 5/2016 | Anderson et al. |
| 2016/0146611 A1 | 5/2016 | Matthews |
| 2016/0147962 A1 | 5/2016 | Vollmar et al. |
| 2016/0202227 A1 | 7/2016 | Mathur et al. |
| 2016/0203657 A1 | 7/2016 | Bell et al. |
| 2016/0205918 A1* | 7/2016 | Chan .................... A01M 21/04 |
| 2016/0212939 A1 | 7/2016 | Ouchida et al. |
| 2016/0215994 A1 | 7/2016 | Mewes et al. |
| 2016/0232621 A1 | 8/2016 | Ethington et al. |
| 2016/0247075 A1 | 8/2016 | Mewes et al. |
| 2016/0247082 A1 | 8/2016 | Stehling |
| 2016/0260021 A1 | 9/2016 | Marek |
| 2016/0286720 A1 | 10/2016 | Heitmann et al. |
| 2016/0286721 A1 | 10/2016 | Heitmann et al. |
| 2016/0286722 A1 | 10/2016 | Heitmann et al. |
| 2016/0309656 A1 | 10/2016 | Wilken et al. |
| 2016/0327535 A1 | 11/2016 | Cotton et al. |
| 2016/0330906 A1 | 11/2016 | Acheson et al. |
| 2016/0338267 A1 | 11/2016 | Anderson et al. |
| 2016/0342915 A1 | 11/2016 | Humphrey |
| 2016/0345485 A1 | 12/2016 | Acheson et al. |
| 2016/0360697 A1 | 12/2016 | Diaz |
| 2017/0013773 A1 | 1/2017 | Kirk et al. |
| 2017/0031365 A1 | 2/2017 | Sugumaran et al. |
| 2017/0034997 A1 | 2/2017 | Mayerle |
| 2017/0049045 A1 | 2/2017 | Wilken et al. |
| 2017/0055433 A1 | 3/2017 | Jamison |
| 2017/0082442 A1 | 3/2017 | Anderson |
| 2017/0083024 A1 | 3/2017 | Reijersen Van Buuren |
| 2017/0086381 A1 | 3/2017 | Roell et al. |
| 2017/0089741 A1 | 3/2017 | Takahashi et al. |
| 2017/0089742 A1 | 3/2017 | Bruns et al. |
| 2017/0090068 A1 | 3/2017 | Xiang et al. |
| 2017/0105331 A1 | 4/2017 | Herlitzius et al. |
| 2017/0105335 A1 | 4/2017 | Xu et al. |
| 2017/0112049 A1 | 4/2017 | Weisberg et al. |
| 2017/0112061 A1 | 4/2017 | Meyer |
| 2017/0115862 A1 | 4/2017 | Stratton et al. |
| 2017/0118915 A1 | 5/2017 | Middelberg et al. |
| 2017/0124463 A1 | 5/2017 | Chen et al. |
| 2017/0127606 A1 | 5/2017 | Horton |
| 2017/0160916 A1 | 6/2017 | Baumgarten et al. |
| 2017/0161627 A1 | 6/2017 | Xu et al. |
| 2017/0185086 A1 | 6/2017 | Sauder et al. |
| 2017/0188515 A1 | 7/2017 | Baumgarten et al. |
| 2017/0192431 A1 | 7/2017 | Foster et al. |
| 2017/0208742 A1 | 7/2017 | Ingibergsson et al. |
| 2017/0213141 A1 | 7/2017 | Xu et al. |
| 2017/0215330 A1 | 8/2017 | Missotten et al. |
| 2017/0223947 A1 | 8/2017 | Gall et al. |
| 2017/0227969 A1 | 8/2017 | Murray et al. |
| 2017/0235471 A1 | 8/2017 | Schøler et al. |
| 2017/0245434 A1 | 8/2017 | Jung et al. |
| 2017/0251600 A1 | 9/2017 | Anderson et al. |
| 2017/0270446 A1 | 9/2017 | Starr et al. |
| 2017/0270616 A1 | 9/2017 | Basso |
| 2017/0316692 A1 | 11/2017 | Rusciolelli et al. |
| 2017/0318743 A1 | 11/2017 | Sauder et al. |
| 2017/0322550 A1 | 11/2017 | Yokoyama |
| 2017/0332551 A1 | 11/2017 | Todd et al. |
| 2017/0336787 A1 | 11/2017 | Pichlmaier et al. |
| 2017/0370765 A1 | 12/2017 | Meier et al. |
| 2018/0000011 A1 | 1/2018 | Schleusner et al. |
| 2018/0014452 A1 | 1/2018 | Starr |
| 2018/0022559 A1 | 1/2018 | Knutson |
| 2018/0024549 A1 | 1/2018 | Hurd |
| 2018/0035622 A1 | 2/2018 | Gresch et al. |
| 2018/0054955 A1 | 3/2018 | Oliver |
| 2018/0060975 A1 | 3/2018 | Hassanzadeh |
| 2018/0070534 A1* | 3/2018 | Mayerle .................. A01F 12/40 |
| 2018/0077865 A1 | 3/2018 | Gallmeier |
| 2018/0084709 A1 | 3/2018 | Wieckhorst et al. |
| 2018/0084722 A1 | 3/2018 | Wieckhorst et al. |
| 2018/0092301 A1 | 4/2018 | Vandike et al. |
| 2018/0092302 A1 | 4/2018 | Vandike et al. |
| 2018/0108123 A1 | 4/2018 | Baurer et al. |
| 2018/0120133 A1 | 5/2018 | Blank et al. |
| 2018/0121821 A1 | 5/2018 | Parsons et al. |
| 2018/0124992 A1 | 5/2018 | Koch et al. |
| 2018/0128933 A1 | 5/2018 | Koch et al. |
| 2018/0129879 A1 | 5/2018 | Achtelik et al. |
| 2018/0132422 A1 | 5/2018 | Hassanzadeh et al. |
| 2018/0136664 A1 | 5/2018 | Tomita et al. |
| 2018/0146612 A1 | 5/2018 | Sauder et al. |
| 2018/0146624 A1 | 5/2018 | Chen et al. |

(56) References Cited

U.S. PATENT DOCUMENTS

| | | |
|---|---|---|
| 2018/0153084 A1 | 6/2018 | Calleija et al. |
| 2018/0177125 A1 | 6/2018 | Takahara et al. |
| 2018/0177136 A1 | 6/2018 | Reimann et al. |
| 2018/0181893 A1 | 6/2018 | Basso |
| 2018/0196438 A1 | 7/2018 | Newlin et al. |
| 2018/0196441 A1 | 7/2018 | Muench et al. |
| 2018/0211156 A1 | 7/2018 | Guan et al. |
| 2018/0232674 A1 | 8/2018 | Bilde |
| 2018/0242523 A1 | 8/2018 | Kirchbeck et al. |
| 2018/0249641 A1 | 9/2018 | Lewis et al. |
| 2018/0257657 A1 | 9/2018 | Blank et al. |
| 2018/0271015 A1 | 9/2018 | Redden et al. |
| 2018/0279599 A1 | 10/2018 | Struve |
| 2018/0295771 A1 | 10/2018 | Peters |
| 2018/0310474 A1 | 11/2018 | Posselius et al. |
| 2018/0317381 A1 | 11/2018 | Bassett |
| 2018/0317385 A1 | 11/2018 | Wellensiek et al. |
| 2018/0325012 A1 | 11/2018 | Ferrari et al. |
| 2018/0325014 A1 | 11/2018 | Debbaut |
| 2018/0332767 A1 | 11/2018 | Muench et al. |
| 2018/0338422 A1 | 11/2018 | Brubaker |
| 2018/0340845 A1 | 11/2018 | Rhodes et al. |
| 2018/0359917 A1 | 12/2018 | Blank et al. |
| 2018/0359919 A1 | 12/2018 | Blank et al. |
| 2018/0364726 A1 | 12/2018 | Foster et al. |
| 2019/0021226 A1 | 1/2019 | Dima et al. |
| 2019/0025175 A1 | 1/2019 | Laugwitz |
| 2019/0041813 A1 | 2/2019 | Horn et al. |
| 2019/0050948 A1 | 2/2019 | Perry et al. |
| 2019/0057460 A1 | 2/2019 | Sakaguchi et al. |
| 2019/0066234 A1 | 2/2019 | Bedoya et al. |
| 2019/0069470 A1 | 3/2019 | Pfeiffer et al. |
| 2019/0075727 A1 | 3/2019 | Duke et al. |
| 2019/0085785 A1 | 3/2019 | Abolt |
| 2019/0090423 A1 | 3/2019 | Escher et al. |
| 2019/0098825 A1 | 4/2019 | Neitemeier et al. |
| 2019/0104722 A1 | 4/2019 | Slaughter et al. |
| 2019/0108413 A1 | 4/2019 | Chen et al. |
| 2019/0114847 A1 | 4/2019 | Wagner et al. |
| 2019/0124819 A1 | 5/2019 | Madsen et al. |
| 2019/0129430 A1 | 5/2019 | Madsen et al. |
| 2019/0136491 A1 | 5/2019 | Martin et al. |
| 2019/0138962 A1 | 5/2019 | Ehlmann et al. |
| 2019/0147094 A1 | 5/2019 | Zhan et al. |
| 2019/0147249 A1 | 5/2019 | Kiepe et al. |
| 2019/0150357 A1 | 5/2019 | Wu et al. |
| 2019/0156255 A1 | 5/2019 | Carroll |
| 2019/0174667 A1 | 6/2019 | Gresch et al. |
| 2019/0183047 A1 | 6/2019 | Dybro et al. |
| 2019/0191617 A1 | 6/2019 | Hoffmann et al. |
| 2019/0200522 A1 | 7/2019 | Hansen |
| 2019/0230855 A1 | 8/2019 | Reed et al. |
| 2019/0239416 A1 | 8/2019 | Green et al. |
| 2019/0261550 A1 | 8/2019 | Damme et al. |
| 2019/0261559 A1 | 8/2019 | Heitmann et al. |
| 2019/0261560 A1 | 8/2019 | Jelenkovic |
| 2019/0313570 A1 | 10/2019 | Owechko |
| 2019/0327889 A1 | 10/2019 | Borgstadt |
| 2019/0327892 A1 | 10/2019 | Fries et al. |
| 2019/0335662 A1 | 11/2019 | Good et al. |
| 2019/0335674 A1 | 11/2019 | Basso |
| 2019/0343035 A1 | 11/2019 | Smith et al. |
| 2019/0343043 A1 | 11/2019 | Bormann et al. |
| 2019/0343044 A1 | 11/2019 | Bormann et al. |
| 2019/0343048 A1 | 11/2019 | Farley et al. |
| 2019/0351765 A1 | 11/2019 | Rabusic |
| 2019/0354081 A1 | 11/2019 | Blank et al. |
| 2019/0364733 A1 | 12/2019 | Laugen et al. |
| 2019/0364734 A1 | 12/2019 | Kriebel et al. |
| 2020/0000006 A1 | 1/2020 | McDonald et al. |
| 2020/0008351 A1 | 1/2020 | Zielke et al. |
| 2020/0015416 A1 | 1/2020 | Barther et al. |
| 2020/0019159 A1 | 1/2020 | Kocer et al. |
| 2020/0024102 A1 | 1/2020 | Brill et al. |
| 2020/0029488 A1 | 1/2020 | Bertucci et al. |
| 2020/0034759 A1 | 1/2020 | Dumstorff et al. |
| 2020/0037491 A1 | 2/2020 | Schoeny et al. |
| 2020/0053961 A1 | 2/2020 | Dix et al. |
| 2020/0064144 A1 | 2/2020 | Tomita et al. |
| 2020/0064863 A1 | 2/2020 | Tomita et al. |
| 2020/0074023 A1 | 3/2020 | Nizami et al. |
| 2020/0084963 A1 | 3/2020 | Gururajan et al. |
| 2020/0084966 A1 | 3/2020 | Corban et al. |
| 2020/0090094 A1 | 3/2020 | Blank |
| 2020/0097851 A1 | 3/2020 | Alvarez et al. |
| 2020/0113142 A1 | 4/2020 | Coleman et al. |
| 2020/0117173 A1 | 4/2020 | Terres et al. |
| 2020/0125822 A1 | 4/2020 | Yang et al. |
| 2020/0128732 A1 | 4/2020 | Chaney |
| 2020/0128733 A1 | 4/2020 | Vandike et al. |
| 2020/0128734 A1 | 4/2020 | Brammeier et al. |
| 2020/0128735 A1 | 4/2020 | Bonefas et al. |
| 2020/0128737 A1 | 4/2020 | Anderson et al. |
| 2020/0128738 A1 | 4/2020 | Suleman et al. |
| 2020/0128740 A1 | 4/2020 | Suleman |
| 2020/0133262 A1 | 4/2020 | Suleman et al. |
| 2020/0141784 A1 | 5/2020 | Lange et al. |
| 2020/0146203 A1 | 5/2020 | Deng |
| 2020/0150631 A1 | 5/2020 | Frieberg et al. |
| 2020/0154639 A1 | 5/2020 | Takahara et al. |
| 2020/0163277 A1 | 5/2020 | Cooksey et al. |
| 2020/0183406 A1 | 6/2020 | Borgstadt |
| 2020/0187409 A1 | 6/2020 | Meyer Zu Helligen |
| 2020/0193589 A1* | 6/2020 | Peshlov ............... G06V 10/955 |
| 2020/0196526 A1 | 6/2020 | Koch et al. |
| 2020/0202127 A1 | 6/2020 | Chen et al. |
| 2020/0202596 A1 | 6/2020 | Kitahara et al. |
| 2020/0214281 A1* | 7/2020 | Koch ................... A01M 21/046 |
| 2020/0221632 A1 | 7/2020 | Strnad et al. |
| 2020/0221635 A1 | 7/2020 | Hendrickson et al. |
| 2020/0221636 A1 | 7/2020 | Boydens et al. |
| 2020/0236836 A1 | 7/2020 | Barrick et al. |
| 2020/0265527 A1 | 8/2020 | Rose et al. |
| 2020/0278680 A1 | 9/2020 | Schultz et al. |
| 2020/0317114 A1 | 10/2020 | Hoff |
| 2020/0319632 A1 | 10/2020 | Desai et al. |
| 2020/0319655 A1 | 10/2020 | Desai et al. |
| 2020/0323133 A1 | 10/2020 | Anderson et al. |
| 2020/0323134 A1 | 10/2020 | Darr et al. |
| 2020/0326674 A1 | 10/2020 | Palla et al. |
| 2020/0326727 A1 | 10/2020 | Palla et al. |
| 2020/0333278 A1 | 10/2020 | Locken et al. |
| 2020/0337232 A1 | 10/2020 | Blank et al. |
| 2020/0342225 A1 | 10/2020 | Schumann et al. |
| 2020/0352099 A1 | 11/2020 | Meier et al. |
| 2020/0359547 A1 | 11/2020 | Sakaguchi et al. |
| 2020/0359549 A1 | 11/2020 | Sakaguchi et al. |
| 2020/0363256 A1 | 11/2020 | Meier et al. |
| 2020/0375083 A1 | 12/2020 | Anderson et al. |
| 2020/0375084 A1 | 12/2020 | Sakaguchi et al. |
| 2020/0378088 A1 | 12/2020 | Anderson |
| 2020/0404842 A1 | 12/2020 | Dugas et al. |
| 2021/0015041 A1 | 1/2021 | Bormann et al. |
| 2021/0029877 A1 | 2/2021 | Vandike et al. |
| 2021/0129853 A1 | 5/2021 | Appleton et al. |
| 2021/0149406 A1 | 5/2021 | Javault |
| 2021/0176916 A1 | 6/2021 | Sidon et al. |
| 2021/0176918 A1 | 6/2021 | Franzen et al. |
| 2021/0243936 A1 | 8/2021 | Vandike et al. |
| 2021/0243938 A1 | 8/2021 | Blank et al. |
| 2021/0289687 A1 | 9/2021 | Heinold et al. |
| 2021/0315163 A1 | 10/2021 | Brewin |
| 2021/0321554 A1 | 10/2021 | Liu et al. |
| 2021/0321567 A1 | 10/2021 | Sidon et al. |
| 2022/0110252 A1 | 4/2022 | Vandike et al. |
| 2022/0151156 A1 | 5/2022 | Bidram et al. |
| 2022/0167547 A1 | 6/2022 | Vandike et al. |
| 2022/0183267 A1 | 6/2022 | Janssen et al. |
| 2022/0327815 A1 | 10/2022 | Picon Ruiz |
| 2023/0225238 A1 | 7/2023 | Blank et al. |

(56) References Cited

U.S. PATENT DOCUMENTS

FOREIGN PATENT DOCUMENTS

| | | |
|---|---|---|
| AU | 20100224431 A1 | 4/2011 |
| BR | MU6800140 U | 12/1989 |
| BR | PI0502658 A | 2/2007 |
| BR | PI0802384 A2 | 3/2010 |
| BR | PI1100258 A2 | 3/2014 |
| BR | 102014007178 | 8/2016 |
| BR | 102014007178 A2 | 8/2016 |
| CA | 1165300 A | 4/1984 |
| CA | 2283767 A1 | 3/2001 |
| CA | 2330979 A1 | 8/2001 |
| CA | 2629555 A1 | 11/2009 |
| CA | 135611 S | 5/2011 |
| CN | 2451633 Y | 10/2001 |
| CN | 1614392 A | 5/2005 |
| CN | 101236188 A | 8/2008 |
| CN | 100416590 C | 9/2008 |
| CN | 101303338 A | 11/2008 |
| CN | 101363833 A | 2/2009 |
| CN | 201218789 Y | 4/2009 |
| CN | 101839906 A | 9/2010 |
| CN | 101929166 A | 12/2010 |
| CN | 102080373 A | 6/2011 |
| CN | 102138383 A | 8/2011 |
| CN | 102277867 B | 12/2011 |
| CN | 202110103 U | 1/2012 |
| CN | 202119772 U | 1/2012 |
| CN | 202340435 U | 7/2012 |
| CN | 103088807 A | 5/2013 |
| CN | 103181263 A | 7/2013 |
| CN | 203053961 U | 7/2013 |
| CN | 203055121 U | 7/2013 |
| CN | 203206739 U | 9/2013 |
| CN | 102277867 B | 10/2013 |
| CN | 203275401 U | 11/2013 |
| CN | 203613525 U | 5/2014 |
| CN | 203658201 U | 6/2014 |
| CN | 103954738 A | 7/2014 |
| CN | 203741803 U | 7/2014 |
| CN | 204000818 U | 12/2014 |
| CN | 204435344 U | 7/2015 |
| CN | 204475304 U | 7/2015 |
| CN | 105205248 A | 12/2015 |
| CN | 204989174 U | 1/2016 |
| CN | 105432228 A | 3/2016 |
| CN | 105741180 A | 7/2016 |
| CN | 106053330 A | 10/2016 |
| CN | 106198877 A | 12/2016 |
| CN | 106198879 A | 12/2016 |
| CN | 106226470 A | 12/2016 |
| CN | 106248873 A | 12/2016 |
| CN | 106290800 A | 1/2017 |
| CN | 106327349 A | 1/2017 |
| CN | 106644663 A | 5/2017 |
| CN | 206330815 U | 7/2017 |
| CN | 206515118 U | 9/2017 |
| CN | 206515119 U | 9/2017 |
| CN | 206616118 U | 11/2017 |
| CN | 206696107 | 12/2017 |
| CN | 206696107 U | 12/2017 |
| CN | 107576674 | 1/2018 |
| CN | 107576674 A | 1/2018 |
| CN | 206906093 U | 1/2018 |
| CN | 206941558 | 1/2018 |
| CN | 206941558 U | 1/2018 |
| CN | 107736088 A | 2/2018 |
| CN | 107795095 A | 3/2018 |
| CN | 207079558 | 3/2018 |
| CN | 107941286 A | 4/2018 |
| CN | 107957408 A | 4/2018 |
| CN | 108009542 A | 5/2018 |
| CN | 108304796 A | 7/2018 |
| CN | 207567744 U | 7/2018 |
| CN | 108614089 A | 10/2018 |
| CN | 208013131 U | 10/2018 |
| CN | 108881825 A | 11/2018 |
| CN | 208047351 U | 11/2018 |
| CN | 109357804 A | 2/2019 |
| CN | 109485353 A | 3/2019 |
| CN | 109633127 A | 4/2019 |
| CN | 109763476 A | 5/2019 |
| CN | 109961024 | 7/2019 |
| CN | 109961024 A | 7/2019 |
| CN | 110135341 A | 8/2019 |
| CN | 110262287 A | 9/2019 |
| CN | 110582198 A | 12/2019 |
| CN | 110720302 A | 1/2020 |
| CN | 111201879 A | 5/2020 |
| CN | 210585958 U | 5/2020 |
| CN | 111406505 A | 7/2020 |
| CS | 247426 B1 | 12/1986 |
| CS | 248318 B1 | 2/1987 |
| CZ | 17266 U1 | 2/2007 |
| CZ | 20252 U1 | 11/2009 |
| DE | 441597 C | 3/1927 |
| DE | 504035 C | 7/1930 |
| DE | 2354828 A1 | 5/1975 |
| DE | 152380 A1 | 11/1981 |
| DE | 3728669 A1 | 3/1989 |
| DE | 4431824 C1 | 5/1996 |
| DE | 19509496 A1 | 9/1996 |
| DE | 19528663 A1 | 2/1997 |
| DE | 19718455 A1 | 11/1997 |
| DE | 19705842 A1 | 8/1998 |
| DE | 19828355 A1 | 1/2000 |
| DE | 10050224 A1 | 4/2002 |
| DE | 10120173 A1 | 10/2002 |
| DE | 202004015141 U1 | 12/2004 |
| DE | 102005000770 B3 | 7/2006 |
| DE | 102005000771 A1 | 8/2006 |
| DE | 102008021785 A1 | 11/2009 |
| DE | 102009041646 A1 | 3/2011 |
| DE | 102010004648 A1 | 7/2011 |
| DE | 102010038661 A1 | 2/2012 |
| DE | 102011005400 A1 | 9/2012 |
| DE | 202012103730 U1 | 10/2012 |
| DE | 102011052688 A1 | 2/2013 |
| DE | 102012211001 A1 | 1/2014 |
| DE | 102012220109 | 5/2014 |
| DE | 102012223768 | 6/2014 |
| DE | 102013212151 A1 | 12/2014 |
| DE | 102013019098 B3 | 1/2015 |
| DE | 102014108449 A1 | 2/2015 |
| DE | 2014201203 A1 | 7/2015 |
| DE | 102014208068 A1 | 10/2015 |
| DE | 102015006398 B3 | 5/2016 |
| DE | 102015109799 A1 | 12/2016 |
| DE | 112015002194 T5 | 1/2017 |
| DE | 102017204511 A1 | 9/2018 |
| DE | 102019206734 A1 | 11/2020 |
| DE | 102019114872 A1 | 12/2020 |
| EP | 0070219 B1 | 10/1984 |
| EP | 0355049 A2 | 2/1990 |
| EP | 845198 B2 | 6/1998 |
| EP | 0532146 B1 | 8/1998 |
| EP | 1444879 A1 | 8/2004 |
| EP | 1473673 A2 | 11/2004 |
| EP | 1219159 B1 | 6/2005 |
| EP | 1219153 B1 | 2/2006 |
| EP | 1692928 A2 | 8/2006 |
| EP | 1574122 B1 | 2/2008 |
| EP | 1943877 A2 | 7/2008 |
| EP | 1598586 B1 | 9/2009 |
| EP | 1731983 B1 | 9/2009 |
| EP | 2146307 A2 | 1/2010 |
| EP | 0845198 B2 | 2/2010 |
| EP | 2186389 A1 | 5/2010 |
| EP | 2267566 A2 | 12/2010 |
| EP | 3491192 A2 | 12/2010 |
| EP | 2057884 B1 | 1/2011 |
| EP | 2146307 B1 | 5/2012 |
| EP | 2446732 A1 | 5/2012 |
| EP | 2524586 A2 | 11/2012 |

(56) References Cited

FOREIGN PATENT DOCUMENTS

| | | |
|---|---|---|
| EP | 2529610 A1 | 12/2012 |
| EP | 2243353 B1 | 3/2013 |
| EP | 2174537 B1 | 5/2013 |
| EP | 2592919 A1 | 5/2013 |
| EP | 1674324 B2 | 5/2014 |
| EP | 2759829 A1 | 7/2014 |
| EP | 2764764 B1 | 8/2014 |
| EP | 2267566 A3 | 12/2014 |
| EP | 2191439 B1 | 3/2015 |
| EP | 2586286 B1 | 3/2015 |
| EP | 2592919 B1 | 9/2015 |
| EP | 2921042 A1 | 9/2015 |
| EP | 2944725 A1 | 11/2015 |
| EP | 2764764 B1 | 12/2015 |
| EP | 2510777 B1 | 3/2016 |
| EP | 2997805 A1 | 3/2016 |
| EP | 3000302 A1 | 3/2016 |
| EP | 2868806 B1 | 7/2016 |
| EP | 3085221 A1 | 10/2016 |
| EP | 3095310 A1 | 11/2016 |
| EP | 3097759 A1 | 11/2016 |
| EP | 2452551 B1 | 5/2017 |
| EP | 3175691 A1 | 6/2017 |
| EP | 3195719 A1 | 7/2017 |
| EP | 3195720 A1 | 7/2017 |
| EP | 3259976 A1 | 12/2017 |
| EP | 3262934 A1 | 1/2018 |
| EP | 3491192 A1 | 1/2018 |
| EP | 3287007 A1 | 2/2018 |
| EP | 3298876 A1 | 3/2018 |
| EP | 3300579 A1 | 4/2018 |
| EP | 3315005 A1 | 5/2018 |
| EP | 3316208 A1 | 5/2018 |
| EP | 2829171 B1 | 6/2018 |
| EP | 2508057 | 7/2018 |
| EP | 2508057 B1 | 7/2018 |
| EP | 3378298 A1 | 9/2018 |
| EP | 3378299 A1 | 9/2018 |
| EP | 2997805 A1 | 10/2018 |
| EP | 3384754 A1 | 10/2018 |
| EP | 3289853 B1 | 3/2019 |
| EP | 3456167 A1 | 3/2019 |
| EP | 3466239 A1 | 4/2019 |
| EP | 3469878 A1 | 4/2019 |
| EP | 3289852 B1 | 6/2019 |
| EP | 3491192 A1 | 6/2019 |
| EP | 3494770 A1 | 6/2019 |
| EP | 3498074 A1 | 6/2019 |
| EP | 3000302 B1 | 8/2019 |
| EP | 3533314 A1 | 9/2019 |
| EP | 3569049 A1 | 11/2019 |
| EP | 3000307 B1 | 12/2019 |
| EP | 3586592 A2 | 1/2020 |
| EP | 3593613 A1 | 1/2020 |
| EP | 3593620 A1 | 1/2020 |
| EP | 3613272 A1 | 2/2020 |
| EP | 3243374 B1 | 3/2020 |
| EP | 3626038 A1 | 3/2020 |
| EP | 3259976 B1 | 4/2020 |
| EP | 3635647 A1 | 4/2020 |
| EP | 3378298 B1 | 5/2020 |
| EP | 3646699 A1 | 5/2020 |
| EP | 3662741 A1 | 6/2020 |
| EP | 3685648 A1 | 7/2020 |
| EP | 2995191 B2 | 10/2020 |
| ES | 2116215 A1 | 7/1998 |
| ES | 2311322 A1 | 2/2009 |
| FI | 5533 A | 11/1913 |
| FR | 1451480 A | 1/1966 |
| FR | 2817344 A1 | 5/2002 |
| FR | 2901291 A | 11/2007 |
| FR | 2901291 A1 | 11/2007 |
| GB | 901081 A | 7/1962 |
| GB | 201519517 A1 | 5/2017 |
| IN | 1632DE2014 | 8/2016 |
| IN | 1632DE2014 A | 8/2016 |
| IN | 01632DE2014 A | 8/2016 |
| IN | 201641027017 A | 10/2016 |
| IN | 202041039250 A | 9/2020 |
| JP | 7079681 A | 11/1982 |
| JP | S60253617 A | 12/1985 |
| JP | S63308110 A | 12/1988 |
| JP | H02196960 A | 8/1990 |
| JP | H02215311 A | 8/1990 |
| JP | H0779681 A | 3/1995 |
| JP | H1066436 A | 3/1998 |
| JP | H10191762 A | 7/1998 |
| JP | 2000352044 A | 12/2000 |
| JP | 2001057809 A | 3/2001 |
| JP | 2002186348 A | 7/2002 |
| JP | 2005227233 A | 8/2005 |
| JP | 2006166871 A | 6/2006 |
| JP | 2011205967 A | 10/2011 |
| JP | 2015070812 A | 4/2015 |
| JP | 2015151826 A | 8/2015 |
| JP | 2015219651 A | 12/2015 |
| JP | 2016071726 A | 5/2016 |
| JP | 2016160808 A | 9/2016 |
| JP | 6087258 B2 | 3/2017 |
| JP | 2017136035 A | 8/2017 |
| JP | 2017137729 A | 8/2017 |
| JP | 2017195804 A | 11/2017 |
| JP | 2018068284 A | 5/2018 |
| JP | 2018102154 A | 7/2018 |
| JP | 2018151388 A | 9/2018 |
| JP | 2019004796 A | 1/2019 |
| JP | 2019129744 A | 8/2019 |
| JP | 2019146506 A | 9/2019 |
| JP | 2019216744 A | 12/2019 |
| JP | 2020018255 A | 2/2020 |
| JP | 2020031607 A | 3/2020 |
| JP | 2020113062 A | 7/2020 |
| JP | 2020127405 A | 8/2020 |
| KR | 100974892 | 8/2010 |
| KR | 100974892 B1 | 8/2010 |
| KR | 20110018582 A | 2/2011 |
| KR | 101067576 B | 9/2011 |
| KR | 101067576 B1 | 9/2011 |
| KR | 101134075 B1 | 4/2012 |
| KR | 101447197 B1 | 10/2014 |
| KR | 101653750 | 9/2016 |
| KR | 20170041377 A | 4/2017 |
| KR | 200485051 Y | 11/2017 |
| KR | 200485051 Y1 | 11/2017 |
| KR | 101873657 B | 8/2018 |
| MX | GT06000012 A | 1/2008 |
| NL | 2022612 B1 | 8/2020 |
| PL | 178299 B1 | 4/2000 |
| RO | 130713 | 11/2015 |
| RU | 1791767 C | 1/1993 |
| RU | 2005102554 A | 7/2006 |
| RU | 2421744 C | 6/2011 |
| RU | 2421744 C1 | 6/2011 |
| RU | 2447640 C1 | 4/2012 |
| RU | 2502047 C | 12/2013 |
| RU | 2502047 C1 | 12/2013 |
| RU | 164128 | 8/2016 |
| RU | 2017114139 A | 4/2017 |
| RU | 2017114139 A | 10/2018 |
| RU | 2017114139 A3 | 5/2019 |
| SU | 834514 A1 | 5/1981 |
| SU | 887717 A1 | 12/1981 |
| SU | 1052940 A1 | 11/1983 |
| SU | 1134669 A1 | 1/1985 |
| SU | 1526588 A1 | 12/1989 |
| SU | 1540053 A1 | 1/1991 |
| SU | 1761864 A | 9/1992 |
| WO | 1986005353 A1 | 9/1986 |
| WO | 2001052160 A1 | 7/2001 |
| WO | 2002015673 A1 | 2/2002 |
| WO | 2003005803 A1 | 1/2003 |
| WO | 2007050192 A2 | 5/2007 |
| WO | 2009156542 A1 | 12/2009 |
| WO | 2010003421 A1 | 1/2010 |

(56) References Cited

FOREIGN PATENT DOCUMENTS

| | | |
|---|---|---|
| WO | 2011104085 A1 | 9/2011 |
| WO | 2012041621 A1 | 4/2012 |
| WO | 2012110508 A1 | 8/2012 |
| WO | 2012110544 A1 | 8/2012 |
| WO | 2013063106 A2 | 5/2013 |
| WO | 2013079247 A1 | 6/2013 |
| WO | 2013086351 A1 | 6/2013 |
| WO | 2013087275 A1 | 6/2013 |
| WO | 2014046685 A1 | 3/2014 |
| WO | 2014093814 A1 | 6/2014 |
| WO | 2014195302 A1 | 12/2014 |
| WO | WO 2014195302 A1 | 12/2014 |
| WO | 2015038751 A1 | 3/2015 |
| WO | 2015153809 A1 | 10/2015 |
| WO | 16020595 A1 | 2/2016 |
| WO | 2016020595 A1 | 2/2016 |
| WO | 2016118686 A1 | 7/2016 |
| WO | 2017008161 A1 | 1/2017 |
| WO | WO2017004074 A1 | 1/2017 |
| WO | WO 2017008161 A1 | 1/2017 |
| WO | 2017060168 A1 | 4/2017 |
| WO | 2017077113 A1 | 5/2017 |
| WO | 2017096489 A1 | 6/2017 |
| WO | 2017099570 A1 | 6/2017 |
| WO | WO 2017092905 A1 | 6/2017 |
| WO | 2017116913 A1 | 7/2017 |
| WO | WO 2017116913 A1 | 7/2017 |
| WO | 2017170507 A1 | 10/2017 |
| WO | 2017205406 A1 | 11/2017 |
| WO | 2017205410 A1 | 11/2017 |
| WO | 2018043336 A1 | 3/2018 |
| WO | 2018073060 A1 | 4/2018 |
| WO | 2018081759 A1 | 5/2018 |
| WO | 2018112615 | 6/2018 |
| WO | 2018116772 A1 | 6/2018 |
| WO | 2018142768 A1 | 8/2018 |
| WO | 2018200870 A1 | 11/2018 |
| WO | 2018206587 A1 | 11/2018 |
| WO | WO2018204409 A1 | 11/2018 |
| WO | 2018220159 A1 | 12/2018 |
| WO | 2018226139 A1 | 12/2018 |
| WO | 2018235486 A1 | 12/2018 |
| WO | 2018235942 A1 | 12/2018 |
| WO | WO18235486 | 12/2018 |
| WO | WO18235486 A1 | 12/2018 |
| WO | 2019034213 A1 | 2/2019 |
| WO | 2019079205 A1 | 4/2019 |
| WO | 2019081349 A1 | 5/2019 |
| WO | 2019091535 A1 | 5/2019 |
| WO | 2019109191 A1 | 6/2019 |
| WO | 2019124174 A1 | 6/2019 |
| WO | 2019124217 A1 | 6/2019 |
| WO | 2019124225 A1 | 6/2019 |
| WO | 2019124273 A1 | 6/2019 |
| WO | 2019129333 A1 | 7/2019 |
| WO | 2019129334 A1 | 7/2019 |
| WO | 2019129335 A1 | 7/2019 |
| WO | 2019215185 A1 | 11/2019 |
| WO | 2019230358 A1 | 12/2019 |
| WO | 2020026578 A1 | 2/2020 |
| WO | 2020026650 A1 | 2/2020 |
| WO | 2020026651 A1 | 2/2020 |
| WO | 2020031473 A1 | 2/2020 |
| WO | 2020038810 A1 | 2/2020 |
| WO | 2020039312 A1 | 2/2020 |
| WO | 2020039671 A1 | 2/2020 |
| WO | 2020044726 A1 | 3/2020 |
| WO | 2020082182 A1 | 4/2020 |
| WO | 2020100810 A1 | 5/2020 |
| WO | 2020110920 A1 | 6/2020 |
| WO | 2020195007 A1 | 10/2020 |
| WO | 2020206941 A1 | 10/2020 |
| WO | 2020206942 A1 | 10/2020 |
| WO | 2020210607 A1 | 10/2020 |
| WO | WO 2020201046 A1 | 10/2020 |
| WO | 2020221981 A1 | 11/2020 |

OTHER PUBLICATIONS

Gayle. J. Somerville, Bo Melander, Per Kudsk, Solvejg K Mathiassen, Modelling annual grass weed seed dispersal in winter wheat, when influenced by hedges and directional wind, Ecological Modelling, vol. 410, Aug. 7, 2019, pp. 1-12 https://www.sciencedirect.com/science/article/pii/S0304380019302297 (Year: 2019).*

Thompson SE, Assouline S, Chen L, Trahktenbrot A, Svoray T, Katul GG. Secondary dispersal driven by overland flow in drylands: Review and mechanistic model development. Mov Ecol. Apr. 17, 2014, pp. 1-13 https://www.ncbi.nlm.nih.gov/pmc/articles/PMC4267596/ (Year: 2017).*

Gayle J. Somerville, et al., How do spatial heterogeneity and dispersal in weed population models affect predictions of herbicide resistance evolution?, Ecological Modelling, 2017, pp. 37-53 https://www.sciencedirect.com/science/article/pii/S0304380017303551 (Year: 2017).*

Thompson et al., "Secondary dispersal driven by overland flow in drylands: Review and mechanistic model development", 2014, Movement Ecology, pp. 1-13 (Year: 2014).*

German Search Report issued in application No. DE102021200028.2 dated Aug. 17, 2021 (10 pages).

U.S. Appl. No. 17/067,383 Final Office Action dated Feb. 21, 2023, 40 pages.

Lamsal et al. "Sugarcane Harvest Logistics in Brazil" Iowa Research Online, Sep. 11, 2013, 27 pages.

Jensen, "Algorithms for Operational Planning of Agricultural Field Operations", Mechanical Engineering Technical Report ME-TR-3, Nov. 9, 2012, 23 pages.

Chauhan, "Remote Sensing of Crop Lodging", Nov. 16, 2020, 16 pages.

Martin et al. Breakage Susceptibiltiy and Hardness of Corn Kernels of Various Sizes and Shapes, vol. 3(): May 1087, 10 pages. https://pdfs.semanticscholar.org/e579/1b5363b6a78efd44adfb97755a0cdd14f7ca.pdf.

Hoff, "Combine Adjustments" (https://smallfarmersjournal.com/combine-adjustments/), Mar. 1943, 9 pages.

Optimizing Crop Profit Across Multiple Grain Attributes and Stover, Electronic Publication Date May 26, 2009, 17 pages.

Unglesbee, Soybean Pod Shatter—Bad Enough to Scout Before Harvest—DTN, Oct. 17, 2018, 11 pages. Susceptibility to shatter (https://agfax.com/2018/10/17/soybean-pod-shatter-bad-enough-to-scout-before-harvest-dtn/).

GIS Maps for Agricultural, accessed on May 10, 2022, 7 pages. https://www.satimagingcorp.com/services/geographic-information-systems/gis-maps-agriculture-mapping.

https://wingtra.com/drone-mapping-applications/use-of-drones-in-agriculture, accessed on May 10, 2022, 19 pages.

Energy Requirement Model for a Combine Harvester: Part 1: Development of Component Models, Published online Dec. 22, 2004, 17 pages.

Energy Requirement Model for a Combine Harvester, Part 2: Integration of Component Models, Published online Jan. 18, 2005, 11 pages.

Pioneer on reducing soybean harvest losses including combine adjustments (last accessed Jul. 23, 2020) (https://www.pioneer.com/us/agronomy/reducing_harvest_losses_in_soybeans.html), 5 pages.

Non-Final Office Action for U.S. Appl. No. 16/783,511, dated Jun. 8, 2022, 21 pages.

Colbach, N., Busset, H., Roger-Estrade, J. and Caneill, J., 2014. Predictive modelling of weed seed movement in response to superficial tillage tools. Soil and tillage research, 138, pp. 1-8.

Application and Drawings for U.S. Appl. No. 16/175,993, filed Oct. 31, 2018, 28 pages.

Application and Drawings for U.S. Appl. No. 16/380,623, filed Apr. 10, 2019, 36 pages.

Application and Drawings for U.S. Appl. No. 16/783,511, filed Feb. 6, 2020, 55 pages.

(56) References Cited

OTHER PUBLICATIONS

Martin et al., "Breakage Susceptibility and Harness of Corn Kernels of Various Sizes and Shapes", May 1987, 10 pages.
Jones et al., "Brief history of agricultural systems modeling" Jun. 21, 2016, 15 pages.
Dan Anderson, "Brief history of agricultural systems modeling" 1 pages. Aug. 13, 2019.
A.Y. Şeflek, "Determining the Physico-Mechanical Characteristics of Maize Stalks Fordesigning Harvester", The Journal of Animal & Plant Sciences, 27(3): 2017, p. 855-860 ISSN: 1018-7081, Jun. 1, 2017.
Carmody, Paul, "Windrowing and harvesting", 8 pages Date: Feb. 3, 2010.
Dabney, et al., "Forage Harvest Representation in RUSLE2", Published Nov. 15, 2013, 17 pages.
John Deere S-Series Combines S760, S770, S780, S790 Brochure, 44 pages, Nov. 15, 2017.
Sekhon et al., "Stalk Bending Strength is Strongly Assoicated with Maize Stalk Lodging Incidence Across Multiple Environments", Jun. 20, 2019, 23 pages.
Thomison et al. "Abnormal Corn Ears", Apr. 28, 2015, 1 page.
Anderson, "Adjust your Combine to Reduce Damage to High Moisture Corn", Aug. 13, 2019, 11 pages.
Sumner et al., "Reducing Aflatoxin in Corn During Harvest and Storage", Reviewed by John Worley, Apr. 2017, 6 pages.
Sick, "Better understanding corn hybrid characteristics and properties can impact your seed decisions", 8 pages, Sep. 21, 2018.
TraCI/Change Vehicle State—SUMO Documentation, 10 pages, Retrieved Dec. 11, 2020.
Arnold, et al., Chapter 8. "Plant Growth Component", Jul. 1995, 41 pages.
Humburg, Chapter: 37 "Combine Adjustments to Reduce Harvest Losses", 2019, South Dakota Board of Regents, 8 pages.
Hoff, "Combine Adjustments", Cornell Extension Bulletin 591, Mar. 1943, 10 pages.
University of Wisconsin, Corn Agronomy, Originally written Feb. 1, 2006 | Last updated Oct. 18, 2018, 2 pages.
University of Nebraska-Lincoln, "Combine Adjustments for Downed Corn—Crop Watch", Oct. 27, 2017, 5 pages.
"Combine Cleaning: Quick Guide to Removing Resistant Weed Seeds (Among Other Things)", Nov. 2006, 5 pages.
Dekalb, "Corn Drydown Rates", 7 pages, Aug. 4, 2020.
Mahmoud et al. Iowa State University, "Corn Ear Orientation Effects on Mechanical Damage and Forces on Concave", 1975, 6 pages.
Sindelar et al., Kansas State University, "Corn Growth & Development" Jul. 17, 2017, 9 pages.
Pannar, "Manage the Growth Stages of the Maize Plant With Pannar", Nov. 14, 2016, 7 pages.
He et al., "Crop residue harvest impacts wind erodibility and simulated soil loss in the Central Great Plains", Sep. 27, 2017, 14 pages.
Blanken, "Designing a Living Snow Fence for Snow Drift Control", Jan. 17, 2018, 9 pages.
Jean, "Drones give aerial boost to ag producers", Mar. 21, 2019, 4 pages.
Zhao et al., "Dynamics modeling for sugarcane sucrose estimation using time series satellite imagery", Jul. 27, 2017, 11 pages.
Brady, "Effects of Cropland Conservation Practices on Fish and Wildlife Habitat", Sep. 1, 2007, 15 pages.
Jasa, et al., "Equipment Adjustments for Harvesting Soybeans at 13%-15% Moisture", Sep. 15, 2017, 2 pages.
Bendig et al., "Estimating Biomass of Barley Using Crop Surface Models (CSMs) Derived from UAV-Based RGB Imaging", Oct. 21, 2014, 18 pages.
Robertson, et al., "Maize Stalk Lodging: Morphological Determinants of Stalk Strength", Mar. 3, 2017, 10 pages.
MacGowan et al. Purdue University, Corn and Soybean Crop Depreciation by Wildlife, Jun. 2006, 14 pages.
Martinez-Feria et al., Iowa State University, "Corn Grain Dry Down in Field From Maturity to Harvest", Sep. 20, 2017, 3 pages.
Wrona, "Precision Agriculture's Value" Cotton Physiology Today, vol. 9, No. 2, 1998, 8 pages.
Zhang et al., "Design of an Optical Weed Sensor Using Plant Spectral Characteristics" Sep. 2000, 12 pages.
Hunt, et al., "What Weeds Can Be Remotely Sensed?", 5 pages, May 2016.
Pepper, "Does an Adaptive Gearbox Really Learn How You Drive?", Oct. 30, 2019, 8 pages.
Eggerl, "Optimization of Combine Processes Using Expert Knowledge and Methods of Artificial Intelligence", Oct. 7, 1982, 143 pages.
Sheely et al., "Image-Based, Variable Rate Plant Growth Regulator Application in Cotton at Sheely Farms in California", Jan. 6-10, 2003 Beltwide Cotton Conferences, Nashville, TN, 17 pages.
Kovacs et al., "Physical characteristics and mechanical behaviour of maize stalks for machine development", Apr. 23, 2019, 1- pages.
Anonymously, "Optimizing Crop Profit Across Multiple Grain Attributes and Stover", ip.com, May 26, 2009, 17 pages.
Breen, "Plant Identification: Examining Leaves", Oregon State University, 2020, 8 pages.
Caglayan et al., A Plant Recognition Approach Using Shape and Color Features in Leaf Images, Sep. 2013, 11 pages.
Casady et al., "Precision Agriculture Yield Monitors" University of Missouri-System, 4 pages, 1998.
Apan et al., "Predicting Grain Protein Content in Wheat Using Hyperspectral Sensing of In-season Crop Canopies and Partial Least Squares Regression" 18 pages, 2006.
Xu et al., "Prediction of Wheat Grain Protein by Coupling Multisource Remote Sensing Imagery and ECMWF Data", Apr. 24, 2020, 21 pages.
Day, "Probability Distributions of Field Crop Yields," American Journal of Agricultural Economics, vol. 47, Issue 3, Aug. 1965, Abstract Only, 1 page.
Butzen, "Reducing Harvest Losses in Soybeans", Pioneer, Jul. 23, 2020, 3 pages.
Martin et al., "Relationship between secondary variables and soybean oil and protein concentration", Abstract Only, 1 page., 2007.
Torres, "Precision Planting of Maize" Dec. 2012, 123 pages.
7 Combine Tweaks to Boost Speed (https://www.agriculture.com/machinery/harvest-equipment/7-combine-tweaks-to-boost-speed_203-ar33059) 8 pages, Aug. 19, 2018.
Managing corn harvest this fall with variable corn conditions (https://www.ocj.com/2019/10/managing-corn-harvest-this-fall-with-variable-corn-conditions/), 4 pages, Oct. 10, 2019.
Reducing Aflatoxin in Corn During Harvest and Storage (https://extension.uga.edu/publications/detail.html?number=B1231&title=Reducing%20Aflatoxin%20in%20Corn%20During%20Harvest%20and%20Storage), 9 pages, Published with Full Review on Apr. 19, 2017.
Variable Rate Applications to Optimize Inputs (https://www.cotton.org/tech/physiology/cpt/miscpubs/upload/CPT-v9No2-98-REPOP.pdf), 8 pages, Nov. 2, 1998.
Robin Booker, VIDEO: Canadian cage mill teams up with JD (https://www.producer.com/2019/12/video-canadian-cage-mill-teams-up-with-jd/), 6 pages, Dec. 19, 2019.
Jarnevich, et al. "Forecasting Weed Distributions using Climate Data: A GIS Early Warning Tool", Invasive Plant Science and Management, 11 pages, Jan. 20, 2017.
Burks, "Classification of Weed Species Using Color Texture Features and Discriminant Analysis" (http://citeseerx.ist.psu.edu/viewdoc/download?doi=10.1.1.468.5833&rep=rep1&type=pdf), 8 pages, 2000.
John Deere, https://www.youtube.com/watch?v=1Gq77CfdGI4&list=PL1KGsSJ4CWk4rShNb3-sTMOliL8meHBL5 (last accessed Jul. 14, 2020), Jun. 15, 2020, 5 pages.
Combine Adjustments (http://corn.agronomy.wisc.edu/Management/L036.aspx), 2 pages, Originally written Feb. 1, 2006; last updated Oct. 18, 2018.
Ardekani, "Off- and on-ground GPR techniques for field-scale soil moisture mapping" Jun. 2013, 13 pages.

(56) References Cited

OTHER PUBLICATIONS

Does an Adaptive Gearbox Really Learn How You Drive? (https://practicalmotoring.com.au/voices/does-an-adaptive-gearbox-really-learn-how-you-drive/), Oct. 30, 2019, 8 pages.
https://www.researchgate.net/publication/222527694_Energy_Requirement_Model_for_a_Combine_Harvester_Part_I_Development_of_Component_Models, Abstract Only, Jan. 2005.
http://canola.okstate.edu/cropproduction/harvesting, 8 pages, Aug. 2011.
"Tips and Tricks of Harvesting High Moisture Grain", https://www.koenigequipment.com/blog/tips-and-tricks-of-harvesting-highmoisture-grain, 5 pages, last accessed Feb. 11, 2021.
Hoff, Combine Adjustements, Mar. 1943, 8 pages.
Haung et al., "Accurate Weed Mapping and Prescription Map Generation Based onFully Convolutional Networks Using UAV Imagery", 14 pages, Oct. 1, 2018.
Thompson, "Morning glory can make it impossible to harvest corn", Feb. 19, 2015, 4 pages.
Huang, Z., Chen, J., Dong, J., Li, Y. and Zhan, Z., Sep. 2010. Research of the combine harvester load feedback control system using multi-signal fusion method and fuzzy algorithm. In 2010 World Automation Congress (pp. 57-61). IEEE.
Hermann, D., Bilde, M.L., Andersen, N.A. and Ravn, O., 2017, August. On-the-go throughput prediction in a combine harvester using sensor fusion. In 2017 IEEE Conference on Control Technology and Applications (CCTA) (pp. 67-72). IEEE.
Notice of Allowance for U.S. Appl. No. 16/171,978 dated Dec. 15, 2020, 8 pages.
Extended European Search Report and Written Opinion issued in European Patent Application No. 22161407.6, dated Sep. 16, 2022, in 12 pages.
"Automated Weed Detection With Drones" dated May 25, 2017, retrieved at: <<https://www.precisionhawk.com/blog/media/topic/automated-weed-identification-with-drones>>, retrieved on Jan. 21, 2020, 4 pages.
F. Forcella, "Estimating the Timing of Weed Emergence", Site-Specific Management Guidelines, retrieved at: <<http://www.ipni.net/publication/ssmg.nsf/0/D26EC9A906F9B8C9852579E500773936/$FILE/SSMG-20.pdf>>, retrieved on: Jan. 21, 2020, 4 pages.
Chauhan et al., "Emerging Challenges and Opportunities for Education and Research in Weed Science", frontiers in Plant Science, Published online Sep. 5, 2017, 22 pages.
Apan, A., Wells, N., Reardon-Smith, K., Richardson, L., McDougall, K, and Basnet, B.B., 2008. Predictive mapping of blackberry in the Condamine Catchment using logistic regression and spatial analysis. In Proceedings of the 2008 Queensland Spatial Conference: Global Warning: What's Happening in Paradise. Spatial Sciences Institute.
Jarnevich, C.S., Holcombe, T.R., Barnett, D.T., Stohlgren, T.J. and Kartesz, J.T., 2010. Forecasting weed distributions using climate data: a GIS early warning tool. Invasive Plant Science and Management, 3(4), pp. 365-375.
Sa et al., "WeedMap: A Large-Scale Semantic Weed Mapping Framework Using Aerial Multispectral Imaging and Deep Neural Network for Precision Farming", Sep. 6, 2018, 25 pages.
Pflanz et al., "Weed Mapping with UAS Imagery and a Bag of Visual Words Based Image Classifier", Published Sep. 24, 2018, 28 pages.
Fernandez-Quintanilla et al., "Is the current state of the art of weed monitoring suitable for site-specific weed management in arable crops?", First Published May 1, 2018, 4 pages.
Provisional Application and Drawings for U.S. Appl. No. 62/928,964, filed Oct. 31, 2019, 14 pages.
Pioneer Estimator, "Corn Yield Estimator" accessed on Feb. 13, 2018, 1 page. retrieved from: https://www.pioneer.com/home/site/us/tools-apps/growing-tools/corn-yield-estimator/.
Guindin, N. "Estimating Maize Grain Yield From Crop Biophysical Parameters Using Remote Sensing", Nov. 4, 2013, 19 pages.
EP Application No. 19203883.4-1004 Office Action dated May 3, 2021, 4 pages.
Iowa State University Extension and Outreach, "Harvest Weed Seed Control", Dec. 13, 2018, 6 pages. https://crops.extension.iastate.edu/blog/bob-hartzler/harvest-weed-seed-control.
Getting Rid of WeedsThrough Integrated Weed Management, accessed on Jun. 25, 2021, 10 pages. https://integratedweedmanagement.org/index.php/iwm-toolbox/the-harrington-seed-destructor.
The Importance of Reducing Weed Seeds, Jul. 2018, 2 pages. https://www.aphis.usda.gov/plant_health/soybeans/soybean-handouts.pdf.
Alternative Crop Guide, Published by the Jefferson Institute, "Buckwheat", Revised Jul. 2002. 4 pages.
Extended European Search Report and Written Opinion issued in European Patent Application No. 20208171.7, dated May 11, 2021, in 05 pages.
Cordoba, M.A., Bruno, C.I. Costa, J.L. Peralta, N.R. and Balzarini, M.G., 2016, Protocol for multivariate homegeneous zone delineation in precision agriculture, biosystems engineering, 143, pp. 95-107.
Non-Final Office Action for U.S. Appl. No. 17/066,444 dated Oct. 25, 2022, 39 pages.
Non-Final Office Action for U.S. Appl. No. 17/066,442 dated Aug. 4, 2022, 8 pages.
Notice of Allowance for U.S. Appl. No. 16/171,978 dated Oct. 28, 2020, 5 pages.
K.R. Manjunath et al., "Developing Spectral Library of Major Plant Species of Western Himalayas Using Ground Observations", J Indian Soc Remote Sen (Mar. 2014) 42(a):201-216, 17 pages.
U.S. Appl. No. 16/380,550, filed Apr. 10, 2019, Application and Drawings, 47 pages.
U.S. Appl. No. 16/380,531 Application and Drawings as filed on Apr. 10, 2019, 46 pages.
U.S. Appl. No. 16/380,564 Application and Drawings as filed on Apr. 10, 2019, 55 pages.
S. Veenadhari et al., "Machine Learning Approach For Forecasting Crop Yield Based on Climatic Parameters", 2014 International Conference on Computer Communication and Informatics (ICCCI-2014) Jan. 3-5, 2014, Coimbatore, INDIA, 5 pages.
Non-Final Office Action for U.S. Appl. No. 16/380,531 dated Oct. 21, 2020, 10 pages.
Notice of Allowance for U.S. Appl. No. 16/171,978, dated Aug. 7, 2020, 9 pages.
Shih, Mei-Ju, Guan-Yu Lin, and Hung-Yu Wei. "Two paradigms in cellular Internet-of-Things access for energy-harvesting machine-to-machine devices: Push-based versus pull-based." IET Wireless Sensor Systems 6.4 (2016): 121-129.
Liu, Yi, et al. "An efficient MAC protocol with adaptive energy harvesting for machine-to-machine networks." IEEE access 3 (2015): 358-367.
European Search Report issued in European Patent Application No. 19203883.4 dated Mar. 23, 2020 (10 pages).
European Search Report issued in European Patent Application No. 19205142.3 dated Feb. 28, 2020 (6 pages).
Dionysis Bochtis et al. "Field Operations Planning for Agricultural Vehicles: A Hierarchical Modeling Framework." Agricultural Engineering International: the CIGR Ejournal. Manuscript PM 06 021. vol. IX. Feb. 2007, pp. 1-11.
Application and Drawings for U.S. Appl. No. 16/432,557, filed Jun. 5, 2019, 61 pages.
Application and Drawings for U.S. Appl. No. 17/066,442, filed Oct. 8, 2020, 65 pages.
Application and Drawings for U.S. Appl. No. 17/067,383, filed Oct. 9, 2020, 61 pages.
Application and Drawings for U.S. Appl. No. 17/066,444, filed Oct. 8, 2020, 102 pages.
Application and Drawings for U.S. Appl. No. 17/066,999, filed Oct. 9, 2020, 67 pages.
Extended Search Report for European Patent Application No. 20167930.5 dated Sep. 15, 2020, 8 pages.
Extended Search Report for European Patent Application No. 19205901.2 dated Mar. 17, 2020, 6 pages.
Application and Drawings for U.S. Appl. No. 17/067,483, filed Oct. 9, 2020, 63 pages.

(56) References Cited

OTHER PUBLICATIONS

Ma, X., Wei, Z., Chai, Y. and Xie, K., 2008, July. Integrating map services and location-based services for geo-referenced individual data collection. In IGARSS 2008-2008 IEEE International Geoscience and Remote Sensing Symposium (vol. 5, pp. V-81). IEEE, 4 pages.
Non-Final Office Action for U.S. Appl. No. 17/066,999, dated Aug. 18, 2022, 8 pages.
Non-Final Office Action for U.S. Appl. No. 17/067,383 dated Nov. 2, 2022, 38 pages.
Benvenuti, S., 2007. Weed seed movement and dispersal strategies in the agricultural environment. Weed biology and management, 7, pp. 141-157.
Chantre, G.R., Vigna, M.R., Renzi, J.P. and Blanco, A.M., 2018. A flexible and practical approach for real-time weed emergence prediction based on Artificial Neural Networks. Biosystems engineering, 170, pp. 51-60.
Final Office Action for U.S. Appl. No. 16/783,511 dated Nov. 4, 2022, 19 pages.
Apan et al., "Predictive Mapping of Blackberry in the Condamine Catchment Using Logistic Regressiona dn Spatial Analysis", Jan. 2008, 12 pages.
Robson, "Remote Sensing Applications for the Determination of Yield, Maturity and Aflatoxin Contamination in Peanut", Oct. 2007, 275 pages.
Bhattarai et al., "Remote Sensing Data to Detect Hessian Fly Infestation in Commercial Wheat Fields", Apr. 16, 2019, 8 pages.
Towery, et al., "Remote Sensing of Crop Hail Damage", Jul. 21, 1975, 31 pages.
Sa et al., "WeedMap: A Large-Scale Semantic Weed Mapping Framework Using Aerial Multispectral Imaging and Deep Neural Network for Precision Farming", Sep. 7, 2018, 25 pages.
Mathyam et al., "Remote Sensing of Biotic Stress in Crop Plants and Its Applications for Pest Management", Dec. 2011, 30 pages.
Martinez-Feria et al., "Evaluating Maize and Soybean Grain Dry-Down In The Field With Predictive Algorithms and Genotype-by-Environmental Analysis", May 9, 2019, 13 pages.
"GIS Maps for Agriculture", Precision Agricultural Mapping, Retrieved Dec. 11, 2020, 6 pages.
Paul, "Scabby Wheat Grain? Increasing Your Fan Speed May Help", https://agcrops.osu.edu/newsletter/corn-newsletter/2015-20/scabby-wheat-grain-increasing-yourfan-speed-may-help, C.O.R.N Newsletter//2015-20, 3 pages.
Clay et al., "Scouting for Weeds", SSMG-15, 4 pages, 2002.
Taylor et al., "Sensor-Based Variable Rate Application for Cotton", 8 pages, 2010.
Christiansen et al., "Designing and Testing a UAV Mapping System for Agricultural Field Surveying", Nov. 23, 2017, 19 pages.
Haung et al., "AccurateWeed Mapping and Prescription Map Generation Based on Fully Convolutional Networks Using UAV Imagery", Oct. 1, 2018, 12 pages.
Ma et al., Identification of Fusarium Head Blight in Winter Wheat Ears Using Continuous Wavelet Analysis, Dec. 19, 2019, 15 pages.
Morrison, "Should You Use Tillage to Control Resistant Weeds", Aug. 29, 2014, 9 pages.
Morrison, "Snow Trapping Snars Water", Oct. 13, 2005, 3 pages.
"Soil Zone Index", https://www.satimagingcorp.com/applications/natural-resources/agricultu . . . , Retrieved Dec. 11, 2020, 5 pages.
Malvic, "Soybean Cyst Nematode", University of Minnesota Extension, Oct. 19, 2020, 3 pages.
Unglesbee, "Soybean Pod Shatter—Bad Enough to Scout Before Harvest?—DTN", Oct. 17, 2018, 4 pages.
Tao, "Standing Crop Residue Can Reduce Snow Drifting and Increase Soil Moisture", 2 pages, last accessed Jul. 14, 2020.
Berglund, et al., "Swathing and Harvesting Canola", Jul. 2019, 8 pages.
Bell et al., "Synthetic Aperture Radar and Optical Remote Sensing of Crop Damage Attributed to Severe Weather in the Central United States", Jul. 25, 2018, 1 page.
Rosencrance, "Tabletop Grapes in India to Be Picked by Virginia Tech Robots", Jul. 23, 2020, 8 pages.
Lofton, et al., The Potential of Grazing Grain Sorghum Residue Following Harvest, May 13, 2020, 11 pages.
Beal et al., "Time Shift Evaluation to Improve Yield Map Quality", Published in Applied Engineering in Agriculture vol. 17(3): 385-390 (@ 2001 American Society of Agricultural Engineers ), 9 pages.
"Tips and Tricks of Harvesting High Moisture Grain", https://www.koenigequipment.com/blog/tips-and-tricks-of-harvesting-highmoisture-grain, 7 pages, last accessed Jul. 14, 2020.
Ransom, "Tips for Planting Winter Wheat and Winter Rye (for Grain) (Aug. 15, 2019)", 2017, 3 pages.
AgroWatch Tree Grading Maps, "The Grading Maps and Plant Count Reports", https://www.satimagingcorp.com/applications/natural-resources/agricultu . . . , Retrieved Dec. 11, 2020, 4 pages.
Ackley, "Troubleshooting Abnormal Corn Ears", Jul. 23, 2020, 25 pages.
Smith, "Understanding Ear Flex", Feb. 25, 2019, 17 pages.
Carroll et al., "Use of Spectral Vegetation Indicies Derived from Airborne Hyperspectral Imagery for Detection of European Corn Borer Infestation in Iowa Corn Plots", Nov. 2008, 11 pages.
Agriculture, "Using drones in agriculture and capturing actionable data", Retrieved Dec. 11, 2020, 18 pages.
Bentley et al., "Using Landsat to Identify Thunderstorm Damage in Agricultural Regions", Aug. 28, 2001, 14 pages.
Duane Grant and the Idaho Wheat Commission, "Using Remote Sensing to Manage Wheat Grain Protein", Jan. 2, 2003, 13 pages.
Zhang et al., "Using satellite multispectral imagery for damage mapping of armyworm (*Spodoptera frugiperda*) in maize at a regional scale", Apr. 10, 2015, 14 pages.
Booker, "VIDEO: Canadian cage mill teams up with JD", Dec. 19, 2019, 6 pages.
AgTalk Home, "Best Combine to Handle Weeds", Posted Nov. 23, 2018, 9 pages.
"Volunteer corn can be costly for soybeans", Jun. 2, 2016, 1 page.
Pflanz, et al., "Weed Mapping with UAS Imagery and a Bag of Visual Words Based Image Classifier", Published Sep. 24, 2018, 17 pages.
Hartzler, "Weed seed predation in agricultural fields", 9 pages, 2009.
Sa et al., "Weedmap: A Large-Scale Sematnic Weed Mapping Framework Using Aerial Multispectral Imaging and Deep Neural Netowrk for Precision Farming", Sep. 6, 2018, 25 pages.
Nagelkirk, Michigan State University-Extension, "Wheat Harvest: Minimizing the Risk of Fusarium Head Scab Losses", Jul. 11, 2013, 4 pages.
Saskatchewan, "Wheat: Winter Wheat", (https://www.saskatchewan.ca/business/agriculture-natural-resources-and-industry/agribusiness-farmers-and-ranchers/crops-and-irrigation/field-crops/cereals-barley-wheat-oats-triticale/wheat-winter-wheat) 5 pages, last accessed Jul. 14, 2020.
Quora, "Why would I ever use sport mode in my automatic transmission car? Will this incrase fuel efficiency or isit simply a feature that makes form more fun when driving?", Aug. 10, 2020, 5 pages.
Wade, "Using a Drone's Surface Model to Estimate Crop Yields & Assess Plant Health", Oct. 19, 2015, 14 pages.
Mathyam et al., "Remote Sensing of Biotic Stress in Crop Plants and Its Applications for Pest Stress", Dec. 2011, 30 pages.
"Four Helpful Weed-Management Tips for Harvest Time", 2 pages, Sep. 4, 2019.
Franz et al., "The role of topography, soil, and remotely sensed vegetation condition towards predicting crop yield", University of Nebraska—Lincoln, Mar. 23, 2020, 44 pages.
Peiffer et al., The Genetic Architecture of Maize Stalk Strength:, Jun. 20, 2013, 14 pages.
Application and Drawings for U.S. Appl. No. 16/171,978, filed Oct. 26, 2018, 53 pages.
Notice of Allowance for U.S. Appl. No. 16/432,557 dated Mar. 22, 2021, 9 pages.
Zhao, L., Yang, J., Li, P. and Zhang, L., 2014. Characteristics analysis and classification of crop harvest patterns by exploiting

(56) References Cited

OTHER PUBLICATIONS high-frequency multipolarization SAR data. IEEE Journal of Selected Topics in Applied Earth Observations and Remote Sensing, 7(9), pp. 3773-3783.
Feng-jie, X., Er-da, W. and Feng-yuan, X., Crop area yield risk evaluation and premium rates calculation-Based on nonparametric kernel density estimation. In 2009 International Conference on Management Science and Engineering, 7 pages.
Liu, R. and Bai, X., 2014, May. Random fuzzy production and distribution plan of agricultural products and its PSO algorithm. In 2014 IEEE International Conference on Progress in Informatics and Computing (pp. 32-36). IEEE.
Notice of Allowance for U.S. Appl. No. 16/171,978 dated Mar. 31, 2021, 6 pages.
Notice of Allowance for U.S. Appl. No. 16/783,511 dated Jan. 19, 2023, 7 pages.
Application and Drawings for U.S. Appl. No. 18/158,005, filed Jan. 23, 2023, 62 pages.
Notice of Allowance for U.S. Appl. No. 17/066,999 dated Jan. 26, 2023, 6 pages.
Extended European Search Report and Written Opinion issued in European Patent Application No. 21151611.7, dated Jun. 28, 2021, in 09 pages.
Extended European Search Report and Written Opinion issued in European Patent Application No. 21151666.1, dated Jul. 1, 2021, in 10 pages.
Application and Drawings for U.S. Appl. No. 16/783,475, filed Feb. 6, 2020, 55 pages.
U.S. Appl. No. 17/067,483 Application and Drawings as filed on Oct. 9, 2020, 63 pages.
U.S. Appl. No. 17/066,442 Application and Drawings as filed on Oct. 8, 2020, 65 pages.
U.S. Appl. No. 17/066,999 Application and Drawings as filed on Oct. 9, 2020, 67 pages.
U.S. Appl. No. 17/066,444 Application and Drawings as filed on Oct. 8, 2020, 102 pages.
Notice of Allowance for U.S. Appl. No. 16/171,978, dated Dec. 15, 2020, 21 pages.
Zhigen et al., "Research of the Combine Harvester Load Feedback Control System Using Multi-Signal Fusion Method and Duzzy Algorithm," 2010, Publisher: IEEE.
Dan et al., "On-the-go Througout Prediction in a Combine Harvester Using Sensor Fusion," 2017, Publisher: IEEE.
Fernandez-Quintanilla et al., "Is the current state of the art of weed monitoring sutible for site-specific weed management in arable crops?", First Published May 1, 2018, 4 pages.
U.S. Appl. No. 16/432,557, filed Jun. 5, 2019, 61 pages.
European Search Report issued in counterpart European Patent Application No. 19205142.3 dated Feb. 28, 2020 (6 pages).
Mei-Ju et al., "Two paradigms in cellular Internet-of-Things access for energy-harvesting machine-to-machine devices: push-based versus pull-based," 2016, vol. 6.
Yi et al., "An Efficient MAC Protocol With Adaptive Energy Harvesting for Machine-to-Machine Networks," 2015, vol. 3, Publisher: IEEE.
S. Veenadhari et al., "Machine Learning Approach for Forecasting Crop Yield Based on Climatic Parameters", 2014 International Conference on Computer Communication and Informatics (ICCCI-2014) Jan. 3-6, 2014, Coimbatore, India, 5 pages.
Prosecution History for U.S. Appl. No. 16/380,691 including: Notice of Allowance dated Mar. 10, 2021 and Application and Drawings filed Apr. 10, 2019, 46 pages.
U.S. Appl. No. 16/831,216 Application and Drawings filed Mar. 26, 2020, 56 pages.
Notice of Allowance for U.S. Appl. No. 16/380,531 dated Apr. 5, 2021, 5 pages.
Leu et al., Grazing Corn Residue Using Resources and Reducing Costs, Aug. 2009, 4 pages.
"No-Till Soils", Soil Heath Brochure, 2 pages, last accessed Jul. 14, 2020.
Strickland et al., "Nitrate Toxicity in Livestock" Oklahoma State University, Feb. 2017, 2 pages.
Strickland et al., "Nitrate Toxicity in Livestock" Oklahoma State University, 8 pages, Feb. 2017.
Brownlee, "Neural Networks are Function Approximation Algorithms", Mar. 18, 2020, 13 pages.
Thompson, "Morning glory can make it impossible to harvest corn", Feb. 19, 2015, 3 pages.
Tumlison, "Monitoring Growth Development and Yield Estimation of Maize Using Very High-Resolution Uavimages in Gronau, Germany", Feb. 2017, 63 pages.
Hunt, "Mapping Weed Infestations Using Remote Sensing", 8 pages, Jul. 19, 2005.
Wright, et al., "Managing Grain Protein in Wheat Using Remote Sensing", 12 pages, 2003.
"Malting Barley in Pennsylvania", Agronomy Facts 77, 6 pages, Code EE0179 06/16.
"Green stem syndrome in soybeans", Agronomy eUpdate Issue 478 Oct. 10, 2014, 3 pages.
"Keep Weed Seed Out of Your Harvest", Aug. 8, 2019, 1 pages.
Hodrius et al., "The Impact of Multi-Sensor Data Assimilation on Plant Parameter Retrieval and Yield Estimation for Sugar Beet", The International Archives of the Photogrammetry, Remote Sensing and Spatial Information Sciences, vol. XL-7/W3, 2015, 36th International Symposium on Remote Sensing of Environment, May 11-15, 2015, Berlin, Germany, 7 pages.
Fernandez-Quintanilla et al., "Is the current state of the art of weed monitoring suitable for site-specific weed management in arable crops?", Feb. 2018, 35 pages.
Anonymously, "Improved System and Method for Controlling Agricultural Vehicle Operation Using Historical Data", Dec. 16, 2009, 8 pages.
Anonymously, "System and Method for Controlling Agricultural Vehicle Operation Using Historical Data", Jun. 30, 2009, 8 pages.
"Leafsnap, a new mobile app that identifies plants by leaf shape, is launched by Smithsonian and collaborators", May 2, 2011, 5 pages.
Insect Gallery, Department of Entomology, Kansas State University, Oct. 19, 2020, 8 pages.
Licht, "Influence of Corn Seeding Rate, Soil Attributes, and Topographic Characteristics on Grain Yield, Yield Components, and Grain Composition", 2015, 107 pages.
"Notice of Retraction Virtual simulation of plant with individual stem based on crop growth model", Mar. 5, 2017, 7 pages.
Leland, "Who Did that? Identifying Insect Damage", Apr. 1, 2015, 4 pages.
"How to improve maize protein content" https://www.yara.co.uk/crop-nutrition/forage-maize/improving-maize-protein-content, Sep. 30, 2020, 10 pages.
Hafemeister, "Weed control at harvest, combines are ideal vehicles for spreading weed seeds", Sep. 25, 2019, 3 pages.
"Harvesting Tips", Northern Pulse Growers Association, 9 pages, Jan. 31, 2001.
Wortmann et al., "Harvesting Crop Residues", Aug. 10, 2020, 8 pages.
"Harvesting", Oklahoma State University, Canola Swathing Guide, 2010, 9 pages, last accessed Jul. 14, 2020.
Hanna, "Harvest Tips for Lodged Corn", Sep. 6, 2011, 3 pages.
"Green Weeds Complicate Harvest", Crops, Slider, Sep. 26, 2012, 2 pages.
"Agrowatch Green Vegetation Index", Retrieved Dec. 11, 2020, 4 pages.
"Grazing Corn Residues" (http://www.ca.uky.edu), 3 pages, Aug. 24, 2009.
Jarnevich et al., Forecasting Weed Distributions Using Climate Data: A GIS Early Warning Tool, Downloaded on Jul. 13, 2020, 12 pages.
Combine Cutting and Feeding Mechanisms in the Southeast, by J-K Park, Agricultural Research Service, U.S. Dept. of Agriculture, 1963, 1 page.
Hartzler, "Fate of weed seeds in the soil", 4 pages, Jan. 31, 2001.
Digman, "Combine Considerations for a Wet Corn Harvest", Extension SpecialistUW—Madison, 3 pages, Oct. 29, 2009.

(56) References Cited

OTHER PUBLICATIONS

S-Series Combine and Front End Equipment Optimization, John Deere Harvester Works, 20 pages Date: Oct. 9, 2017.
Determining yield monitoring system delay time with geostatistical and data segmentation approaches (https://www.ars.usda.gov/ARSUserFiles/50701000/cswq-0036-128359.pdf) Jul. 2002, 13 pages.
Precision Agriculture: Yield Monitors (dated Nov. 1998—metadata; last accessed Jul. 16, 2020) (https://extensiondata.missouri.edu/pub/pdf/envqual/wq0451.pdf) 4 pages.
Paul et al., "Effect of soil water status and strength on trafficability" (1979) (https://www.nrcresearchpress.com/doi/pdfplus/10.4141/cjss79-035), 12 pages, Apr. 23, 1979.
Sick, "Better understanding corn hybrid characteristics and properties can impact your seed decisions" (https://emergence.fbn.com/agronomy/corn-hybrid-characteristics-and-properties-impact-seed-decisions) by Steve Sick, FBN Breeding Project Lead | Sep. 21, 2018, 8 pages.
Robertson et al., "Maize Stalk Lodging: Morphological Determinants of Stalk Strength" Mar. 2017, 10 pages.
Martin, et al., "Breakage Susceptibility and Hardness of Corn Kernels of Various Sizes and Shapes", May 1987, 10 Pages.
U.S. Appl. No. 17/066,444 Non Final Office Action dated Jul. 25, 2023, 37 pages.
U.S. Appl. No. 17/066,444 Office Action dated Nov. 27, 2023, 34 pages.
U.S. Appl. No. 17/067,383 Office Action dated Nov. 27, 2023, 36 pages.
Extended European Search Report and Written Opinion issued in European Patent Application No. 23154796.9, dated Sep. 12, 2023, in 10 pages.
Wang et al., A real-time, embedded, weed-detection system for use in wheat fields, Biosystems Engineering, Elsevier, Amsterdam, NL, vol. 98, No. 3, Oct. 23, 2007, pp. 276-285, XP022332194, ISSN: 1537-5110.

* cited by examiner

PRE-EMERGENCE WEED DETECTION AND MITIGATION SYSTEM

FIELD OF THE DESCRIPTION

The present description generally relates to agricultural machines. More specifically, but not by limitation, the present description relates to pre-emergence weed detection and mitigation.

BACKGROUND

There are a wide variety of different types of farming techniques. One such technique is referred to as precision farming. Precision farming, or precision agriculture, is also referred to as site-specific crop management. The technique uses observation and measurement of variations of different criteria at specific sites, from field-to-field, and even within a single field. The observation and measurement of the variation in the different criteria can then be acted on in different ways.

The effectiveness of precision farming depends, at least in part, upon the timely gathering of information at a site-specific level, so that information can be used to make better decisions in treating and managing the crop. This type of information can include information that is indicative of plant emergence characteristics (such as maturity, emergence uniformity, etc.) pest presence, disease, water and nutrient levels, weed stresses, etc. Management techniques for weeds, which reduce crop yields, include the application of a chemical (e.g., herbicide) to the field to mitigate weed growth.

The discussion above is merely provided for general background information and is not intended to be used as an aid in determining the scope of the claimed subject matter.

SUMMARY

A computer-implemented method includes obtaining a weed map of a field including a crop, the weed map representing weed plant locations on the field, identifying, based at least in part on the weed map, weed seed locations that represent presence of weed seeds on the field, and generating a control signal for a pre-emergence weed mitigation operation based on the weed seed locations.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

The present description generally relates to agricultural machines. More specifically, but not by limitation, the present description relates to pre-emergence weed detection and mitigation. As noted above, some weed management techniques including the application of a chemical (e.g., herbicide) to an agricultural field to mitigate weed growth. For sake of the present discussion, a "weed" or "weed plant" refers to any plant other than a target crop plant type of the subject field. This can include non-crop plants as well as crop plants of a different crop type. To illustrate, in a corn field to be harvested by a corn harvester, "weeds" can include common non-crop plants (e.g., giant ragweed, common ragweed, horseweed (marestail), johnsongrass, palmer amaranth, ryegrass, waterhemp, etc.) and crop plants other than corn (e.g., soybeans, etc.). That is, it includes plant types other corn plants.

Unfortunately, over time some types of weeds have developed herbicide-resistance which results in decreased effectiveness of the herbicide application. For instance, examples of weeds that have developed glyphosate resistance include, but are not limited to, those mentioned above. At best, the herbicide-resistance requires an excessive application of the herbicide and, at worst, the herbicide-resistance renders the herbicide application ineffective. Further, excessive application of herbicide has drawbacks. For instance, in addition to a significant increase in costs involved (e.g., machine operating costs, herbicide costs, etc.), excessive herbicide application may be harmful to the crop and/or is otherwise undesirable.

One pre-emergence application technique utilizes weed maps and an expected timing of emergence to determine when to apply a pre-emergence herbicide. These maps are obtained from weed growing locations from prior year growing seasons or harvest, to predict where the weeds will emerge for the current year. This is often inaccurate, which can result in incorrect herbicide application doses and/or the application of herbicide to the incorrect areas of the field.

The present disclosure provides a system for an agricultural environment that processes weed plant location information, such as weed maps, that supports pre-emergence mitigation. The weed plant data can be obtained from any of a wide variety of sources, such as remote sensing data obtained from image data sources. Examples of image data sources include, but are not limited to, manned aircraft cameras, unmanned aerial vehicle (UAV or drone) cameras, stationary mounted or on-board cameras, etc. For sake of illustration, as discussed below an agricultural harvester or combine identifies the locations of weed seeds, which can be utilized to control on-board weed seed mitigators. Alternatively, or in addition, weed seed maps can be generated and utilized to perform pre-emergence weed mitigation post-harvest. In either case, the system can mitigate even herbicide-resistance weeds.

Figure 1:
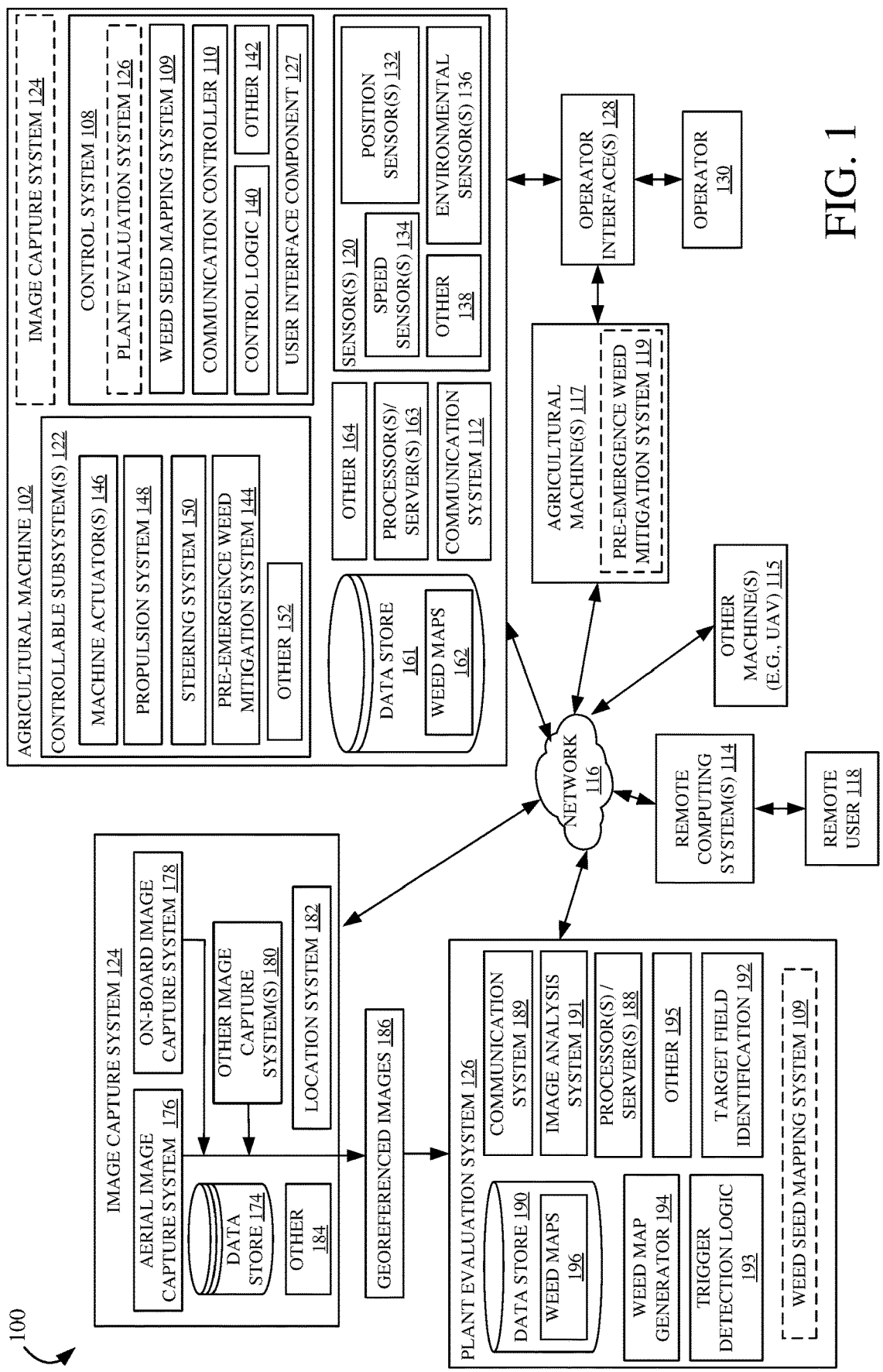
FIG. 1 illustrates one example of an agricultural architecture for pre-emergence weed mitigation.

FIG. 1 illustrates one example of an agricultural architecture 100 for pre-emergence weed mitigation. Architecture 100 includes an agricultural machine 102 configured to generate pre-emergence weed seed location information that represents the presence of weed seeds in a field and/or perform a pre-emergence weed mitigation operation using that weed seed location information. It is noted that machine 102 can be any of a wide variety of different types of agricultural machines. For instance, in examples described below machine 102 comprises an agricultural harvesting machine (also referred to as a "harvester" or "combine"). In other examples, machine 102 can comprise a sprayer, cultivator, to name a few. Also, while machine 102 is illustrated with a single box in FIG. 1, machine 102 can comprise multiple machines (e.g., a towed implement towed by a towing machine). In this example, the elements of machine 102 illustrated in FIG. 1 can be distributed across a number of different machines.

Machine 102 includes a control system 108 configured to control other components and systems of architecture 100. For instance, control system 108 includes a weed seed mapping system 109, which is discussed in further detail below. Also, control system 108 includes a communication controller 110 configured to control communication system 112 to communicate between components of machine 102 and/or with other machines or systems, such as remote computing system 114 and/or machine(s) 115, either directly or over a network 116. Also, machine 102 can communicate with other agricultural machine(s) 117 as well. Agricultural machine(s) 117 can be a similar type of machine as machine 102, and they can be different types of machines as well. Network 116 can be any of a wide variety of different types of networks such as the Internet, a cellular network, a local area network, a near field communication network, or any of a wide variety of other networks or combinations of networks or communication systems.

A remote user 118 is illustrated interacting with remote computing system 114. Remote computing system 114 can be a wide variety of different types of systems. For example, remote system 114 can be a remote server environment, remote computing system that is used by remote user 118. Further, it can be a remote computing system, such as a mobile device, remote network, or a wide variety of other remote systems. Remote system 114 can include one or more processors or servers, a data store, and it can include other items as well.

Communication system 112 can include wired and/or wireless communication logic, which can be substantially any communication system that can be used by the systems and components of machine 102 to communicate information to other items, such as between control system 108, sensors 120, controllable subsystems 122, image capture system 124, and plant evaluation system 126. In one example, communication system 112 communicates over a controller area network (CAN) bus (or another network, such as an Ethernet network, etc.) to communicate information between those items. This information can include the various sensor signals and output signals generated by the sensor variables and/or sensed variables.

Control system 108 includes a user interface component 127 configured to control interfaces, such as operator interface(s) 128 that include input mechanisms configured to receive input from an operator 130 and output mechanisms that render outputs to operator 130. The user input mechanisms can include mechanisms such as hardware buttons, switches, joysticks, keyboards, etc., as well as virtual mechanisms or actuators such as a virtual keyboard or actuators displayed on a touch sensitive screen. The output mechanisms can include display screens, speakers, etc.

Sensor(s) 120 can include any of a wide variety of different types of sensors. In the illustrated example, sensors 120 include position sensor(s) 132, speed sensor(s) 134, environmental sensor(s) 136, and can include other types of sensors 138 as well. Position sensor(s) 132 are configured to determine a geographic position of machine 102 on the field, and can include, but are not limited to, a Global Navigation Satellite System (GNSS) receiver that receives signals from a GNSS satellite transmitter. It can also include a Real-Time Kinematic (RTK) component that is configured to enhance the precision of position data derived from the GNSS signal. Speed sensor(s) 134 are configured to determine a speed at which machine 102 is traveling the field during the spraying operation. This can include sensors that sense the movement of ground-engaging elements (e.g., wheels or tracks) and/or can utilize signals received from other sources, such as position sensor(s) 132.

Control system 108 includes control logic 140, and can include other items 142 as well. As illustrated by the dashed box in FIG. 1, control system 108 can include some or all of plant evaluation system 126, which is discussed in further detail below. Also, machine 102 can include some or all of image capture system 124. Control logic 140 is configured to generate control signals to control sensors 120, controllable subsystems 122, communication system 112, or any other items in architecture 100. Controllable subsystems 122 include a pre-emergence weed mitigation system 144, machine actuators 146, a propulsion subsystem 148, a steering subsystem 150, and can include other items 152 as well.

Machine 102 includes a data store 161 configured to store data for use by machine 102, such as field data. Examples include, but are not limited to, field location data that identifies a location of the field to be operated upon by a machine 102, field shape and topography data that defines a shape and topography of the field, crop location data that is indicative of a location of crops in the field (e.g., the location of crop rows), or any other data. In the illustrated example, data store 161 stores weed maps 162 that are generated by machine 102 or otherwise obtained by machine 102, such as from plant evaluation system 126. Of course, data store 161 can store other data as well.

Machine 102 is illustrated as including one or more processors or servers 163, and it can include other items 164 as well.

As illustrated by the dashed boxes in FIG. 1, machine 102 can include some or all components of image capture system 124 and/or plant evaluation system 126, both of which are discussed in further detail below. Also, agricultural machine(s) 117 can include a pre-emergence weed mitigation system 119, which can be similar to, or different from, system 144.

Image capture system 124 includes image capture components configured to capture one or more images of the area under consideration (i.e., the portions of the field to be operated upon by machine 102) and image processing components configured to process those images. The captured images represent a spectral response captured by image capture system 124 that are provided to plant evaluations system 126 and/or stored in data store 174. A spectral imaging system illustratively includes a camera that takes spectral images of the field under analysis. For instance, the camera can be a multispectral camera or a hyperspectral camera, or a wide variety of other devices for capturing spectral images. The camera can detect visible light, infrared radiation, or otherwise.

In one example, the image capture components include a stereo camera configured to capture a still image, a time series of images, and/or a video of the field. An example stereo camera captures high definition video at thirty frames per second (FPS) with one hundred and ten degree wide-angle field of view. Of course, this is for sake of example only.

Illustratively, a stereo camera includes two or more lenses with a separate image sensor for each lens. Stereo images (e.g., stereoscopic photos) captured by a stereo camera allow for computer stereo vision that extracts three-dimensional information from the digital images. In another example, a single lens camera can be utilized to acquire images (referred to as a "mono" image).

Image capture system 124 can include one or more of an aerial image capture system 176, an on-board image capture system 178, and/or other image capture system 180. An example of aerial image capture system 124 includes a camera or other imaging component carried on an unmanned aerial vehicle (UAV) or drone (e.g., block 115). An example of on-board image capture system 178 includes a camera or other imaging component mounted on, or otherwise carried by, machine 102 (or 104). An example of image capture system 180 includes a satellite imaging system. System 124 also includes a location system 182, and can include other items 184 as well. Location system 182 is configured to generate a signal indicative of geographic location associated with the captured image. For example, location system 182 can output GPS coordinates that are associated with the captured image to obtain geo-referenced images 186 that are provided to plant evaluation system 126.

Plant evaluation system 126 illustratively includes one or more processors 188, a communication system 189, a data store 190, an image analysis system 191, target field identification logic 192, trigger detection logic 193, a weed map generator 194, and can include other items 195 as well. Communication system 189, in one example, is substantially similar to communication system 112, discussed above.

Target field identification logic 192 is configured to identify a target or subject field for which a weed map is to be generated by weed map generator 194. The target field identification is correlated to the weed maps 196, which are generated by weed map generator 194 and can be stored in data store 190.

Trigger detection logic 193 is configured to detect a triggering criterion that triggers generation (or updating) of a weed map by generator 194. For example, in response to detection of a triggering criteria, logic 193 can communication instructions to image capture system 124 to capture images of the target field. These images are then processed by image analysis system 191, and the results of the image analysis are utilized by weed map generator 194 to generate weed maps 196.

Figure 2:
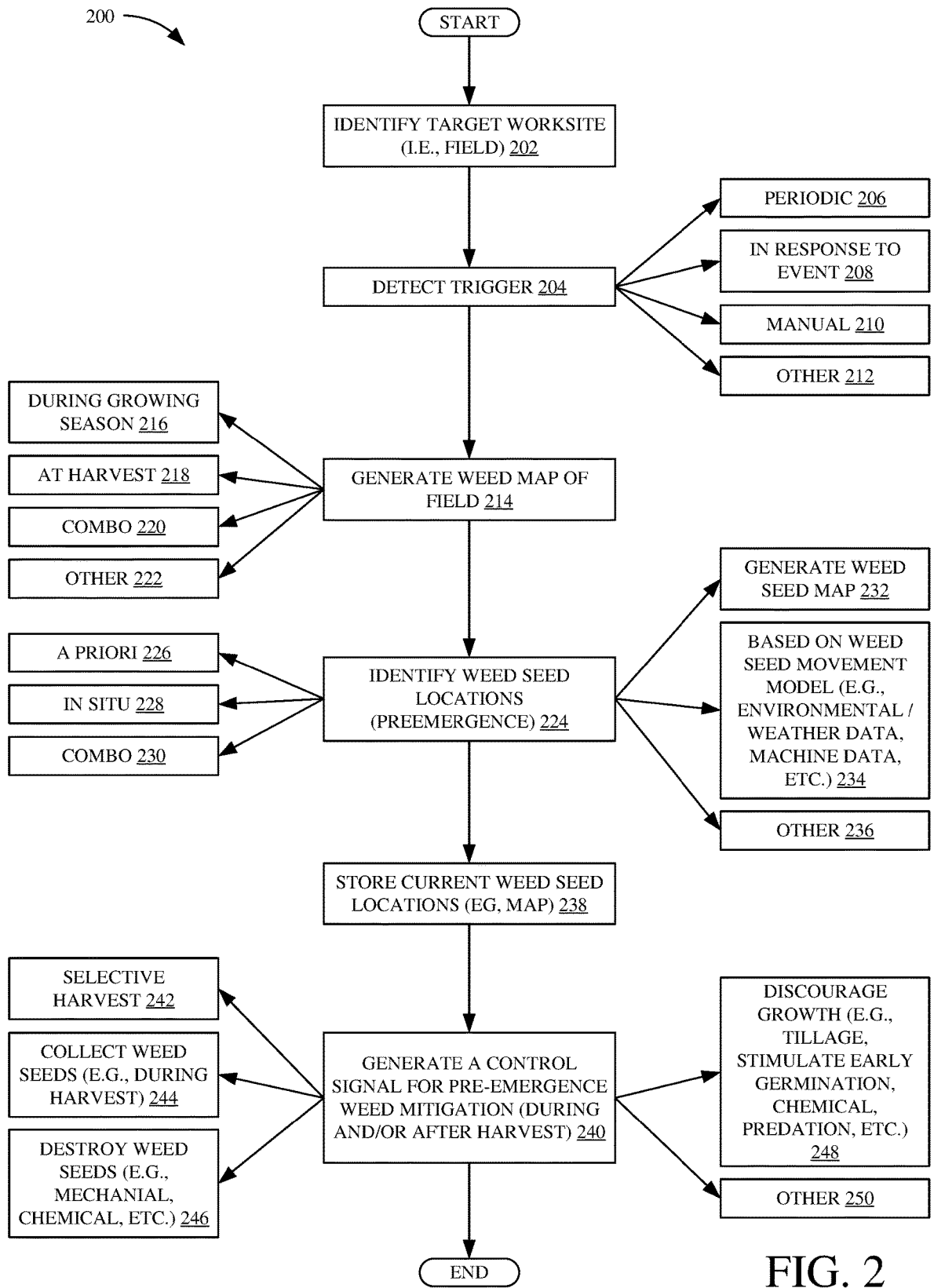
FIG. 2 is a flow diagram illustrating an example operation of an agricultural architecture that identifies weed seed locations and performing a pre-emergence weed mitigation operation.

FIG. 2 is a flow diagram 200 illustrating an example operation of architecture 100 in identifying weed seed locations and performing a pre-emergence weed mitigation operation.

At block 202, logic 192 identifies a target worksite (i.e., a field to be harvested). At block 204, logic 193 detects a trigger for triggering generation (or updating) of a weed map for the identified field. For instance, this can be done periodically (block 206), in response to an event (block 208), and/or manually in response to a user input (block 210). Of course, the trigger can be detected in other ways as well. This is represented by block 212.

At block 214, a weed map of the field is generated. It is noted that the weed map can be generated at any of a variety of different times. For example, the weed map can be generated during the growing season, before harvest while the crops (and weeds) are growing. This is represented by block 216. In another example, the weed map can be generated at harvest time, when a harvesting machine is performing a harvesting operation in the field. This is represented by block 218. In another example, the weed map can be generated by a combination of inputs during the growing season and at harvest time. This is represented by block 220. Of course, the weed map can be generated in other ways as well. This is represented by block 222. In one example, the weed map can include two (or more) plant classifications, i.e., crop and weed. Alternatively, or in addition, the weed map can include multiple non-crop plant classifications based on, for example but not by limitation, species, size, maturity, vigor, etc.

In one example, image capture system 124 captures spectral images of the field under analysis, as well as video images. Geographic location information is associated with those images, and they are provided to plant evaluation system 126. System 126 identifies evaluation zones in the field under analysis and analyzes the spectral images received from system 124 to identify weed plants in the evaluation zones. This can be done in any of a number of ways. For instance, the images can be processed to identify areas that correspond to weed plants. In another example, system 126 can identify areas in the evaluation zones that represent crop plants and subtract those areas out of the images to obtain a remaining image portion that represents the weeds or non-crop plants.

In one example, the image capture system includes a camera, such as a multispectral camera or a hyperspectral camera, or a wide variety of other devices for capturing images. A video imaging system can be utilized that includes a camera that captures images in the visible or thermal image range. For example, it can be a visible light video camera with a wide angle lens, or a wide variety of other video imaging systems.

Additionally, plant density information can be generated and associated with the weed map. That is, in addition to the weed map identifying areas of the field that contain weeds, a density metric can be associated with those areas. For instance, the density metric can indicate a percentage of the plants within the area that are weed plants versus crop plants. In another instance, it can be weeds/unit area.

In one example, image analysis system 191 includes spectral analysis logic that performs spectral analysis to evaluate the plants in the images. In one example, this includes identifying areas in the image that have a spectral signature that corresponds to ground versus plants. For instance, this can be a green/brown comparison. Image segmentation logic can perform image segmentation to segment or divide the image into different portions for processing. This can be based on ground and/or plant area identifications by ground/plant identification logic, and crop classification performed by crop classification logic. Briefly, this can identify areas of an image that represent ground and areas of an image that represent plants, for example using the spatial and spectral analysis. Crop classification logic can use a crop classifier, that is trained using crop training data, to identify areas in the image that represent crop plants and/or areas that represent weed plants.

In addition to identifying the location of the plant relative to the surface plane of the field (e.g., x/y coordinates), a height of the weed plants can be identified (e.g., how high the plant rises from the terrain in the z direction).

At block 224, weed seed locations are identified. The weed seed locations identify the location of the weed seeds pre-emergence, that is before the seeds germinate and emerge as visible plants. The weed seed locations can be identified in any of a number of ways. For example, the weed seed locations can be identified based on a priori data (block 226), in situ data (block 228), or a combination of a priori and in situ data (block 230). For instance, the weed seed locations can be based on an a priori weed map generated during the growing season at block 216. Alternatively, or in addition, the weed seed locations can be identified based on in situ data collected by on-board sensors.

As illustrated at block 232, the identified weed seed locations can be utilized to generate a weed seed map that maps the locations of the weed seeds to the field under analysis. An example weed seed map identifies regions of the field that are determined to have a number of weed seeds above a threshold, which can be defined in any of a number of ways. For example, the threshold can be pre-defined, set by an operator, dynamically determined, etc.

As illustrated at block 234, the weed seed locations are identified based on the weed map, generated at block 294, which maps locations of the weeds in the field, taking into account a weed seed movement model. This model projects the likely location of a weed plant's seeds given the location of that weed plant and external factors that affect movement of the seed from the weed plant location. For instance, the model can take into account weather or other environmental data. For instance, the location of the weed seeds on the field can be determined based on the direction and/or speed of the wind as detected by sensors on machine 102 or otherwise obtained from a remote weather data source. In another example, the weed seed model can identify terrain conditions, such as slope or topography, precipitation, among other factors which can contribute to the displacement of the seeds from a weed plant.

Alternatively, or in addition, the weed seed movement model can model machine data that processes the weed plants. For example, in the case of an agricultural harvesting machine, the machine data can be utilized to compensate for machine delays caused by the processing through the combine. That is, the machine delay models the distance (with respect to the field surface) between when the weed plant is cut by the header of the combine and the weed seeds are discharged by a chaff spreader. This delay can be dynamically determined based on machine settings (header speed, thresher settings, chaff settings, etc.) that may vary the time that it takes for the seed to travel through the combine and be discharged onto the field. As used herein, chaff refers to any material (also referred to a "residue") that is ejected from the harvesting machine (typically from the rear of the machine), even though it may contain some crop material. That is, during operation of the combine, it is often the case that some crop material ends up in the non-crop material flow, and vice versa. Of course, the weed seed locations can be identified in other ways as well. This is represented by block 236.

At block 238, the current weed seed locations (e.g., the weed seed map generated at block 232) is stored. The weed seed locations can be stored locally (e.g., in data store 161), can be sent to another agricultural machine (e.g., machine 117), and/or can be sent to a remote computing system (e.g., system 114).

At block 240, a control signal is generated for a pre-emergence weed mitigation operation. This can be performed during and/or after a harvesting operation. For example, a mitigation operation performed during the harvesting operation comprises a selective harvest. This is represented by block 242. For instance, the harvesting machine can be controlled to selectively harvest different areas of the field based on the weed seed locations. That is, an area of high weed seed occurrence can be ignored, and then mitigated after the harvesting operation. In another example, the harvesting operation can selectively harvest areas of high weed seed presence in a single harvesting operation (so all of the material is collected together in the material repository) and then can be subsequently processed. These, of course, are for sake of example only.

In another example, the weed seeds are collecting during the harvesting operation. For instance, a collector or other apparatus is positioned to collect the discharge from the combine and prevent the weed seeds from being ejected back onto the field. Alternatively, or in addition, a mitigator can be utilized to destroy or otherwise devitalize the weed seeds, inhibiting further germination or promulgation of the weed seeds. This can include mechanical mitigators, chemical mitigators, irradiation mitigators, etc. Examples of this are discussed in further detail below. Briefly, however, an example mitigator (mechanical, chemical, or otherwise) includes a device that interacts with the weed seed such that the weed seed has a lower ability to promulgate or germinate in a subsequent growing season.

Also, the pre-emergence weed mitigation operation can discourage growth of the weed seeds. This is represented by block 248. For example, a tiller machine can be utilized to till the area, post-harvest, to bury the weed seeds at a threshold depth (e.g., twelve inches or greater) at which the weed seeds are unlikely to germinate. In another example, early germination of the weed seeds can be stimulated (i.e., during the fall) so that the germinated weeds are exposed to the cold fall/winter weather which is likely to destroy the weed plants. In another example, a chemical can be applied to the weed seeds to discourage their spring germination and/or increase predation (e.g., being consumed by predator animals).

Of course, the pre-emergence weed mitigation operation can comprise other types of operations as well. This is represented by block 250.

Figure 3:
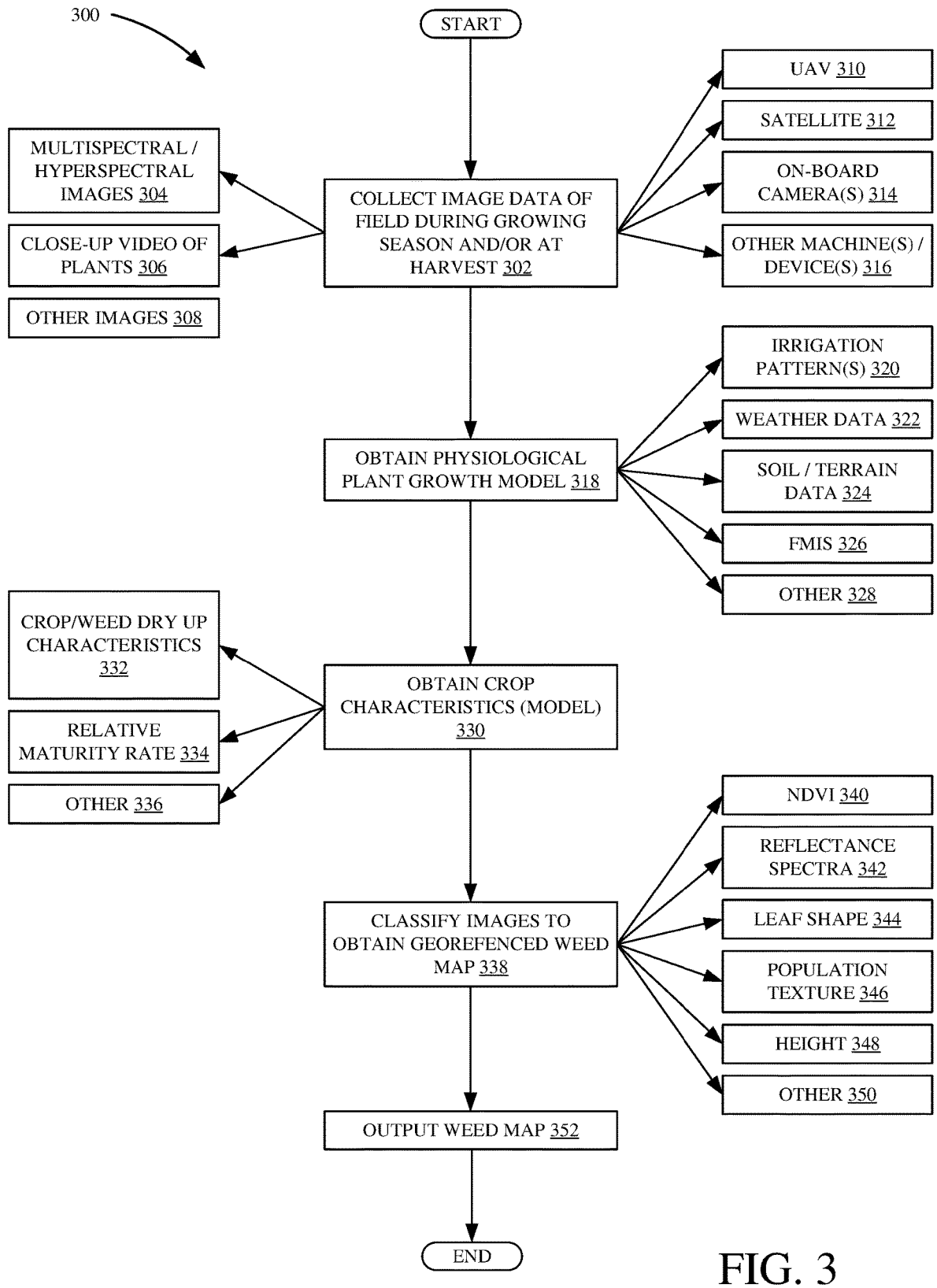
FIG. 3 is a flow diagram illustrating an example operation for generating weed map(s).

FIG. 3 is a flow diagram 300 illustrating an example operation for generating weed map(s). For sake of illustration, but not by limitation, FIG. 3 will be described in the context of systems 124 and 126 generating weed maps 196 for use by machine 102.

A block 302, image data of the field is collected during the growing season and/or at harvest. As discussed above, this can include multispectral and/or hyperspectral images, represented by block 304. Alternatively, or in addition, closeup video of the plants can be obtained at block 306. Of course, other images can be obtained as well. This is represented by block 308.

Also, the image data can be collected from a wide variety of different sources, for example, the image data can be collected from a UAV (block 310), a satellite system (block 312), on-board cameras (block 314) that are on board machine 102, and/or from other machines or devices (block 316).

A physiological plant growth model can be obtained at block 318. Illustratively, a plant growth model can be used to understand what weed/crop maturity stage(s) to expect at a given time and location in the field. This can facilitate improvement of classifier results, especially if the characteristics change significantly during the growth cycle (i.e. less misclassification, better ability to differentiate). The model can represent irrigation patterns of the field (block 320), weather data (block 322), and/or soil/terrain data (block 324). The weather data at block 322 can represent precipitation during the growing season and the soil/terrain data 324 can indicate soil characteristics, such as moisture, etc., as well as terrain topology data, such as the slope of the field.

Also, the plant growth model can be generated based on data from a farm management information system (FMIS). This is represented by block 326. An example FMIS system provides information on the type and/or variety of the planted crop, plant date of the crop, treatments that have been applied to the crop (e.g., before or during the growing season). Of course, the model can be obtained using other data as well. This is represented by block 328.

At block 330, crop characteristics are obtained. In one example, this models where the crop maturity should be given the growth model. For instance, the crop characteristics obtained at block 330 can indicate that the crop and/or weeds should be at a particular emergence stage. In one example, this can represent crop/weed dry up characteristics prior to harvest. This can be utilized to differentiate crops and weeds, and is represented by block 332. In another example, relative maturity rate data can be obtained at block 334. In one example, this is utilized to find zones of similar agronomic behavior that can be utilized to classify weeds versus crops in smaller areas of the field, rather than across the entire field collectively.

Of course, other crop characteristics can be obtained as well. This is represented by block 336. At block 338, the images collected at block 332 are classified to obtain a georeferenced weed map. For example, the classification can utilize a normalized difference vegetation index (NDVI). In one example, a crop mask is applied on the NDVI to obtain better crop development monitoring.

In another example, weed/crop identifying characteristics can include reflectance spectra (block 342), leaf shape information (block 344), population texture (block 346), plant height (block 348), etc. Of course, the images can be classified in other ways as well. This is represented by block 350.

At block 352, the weed map is output. For example, the weed map can be output to control system 108 for use by weed seed mapping system 109 to control pre-emergence weed mitigation system 144. In another example, the weed map can be output for storage and/or display to remote user 118 and/or operator 130 using a display device.

Figure 4:
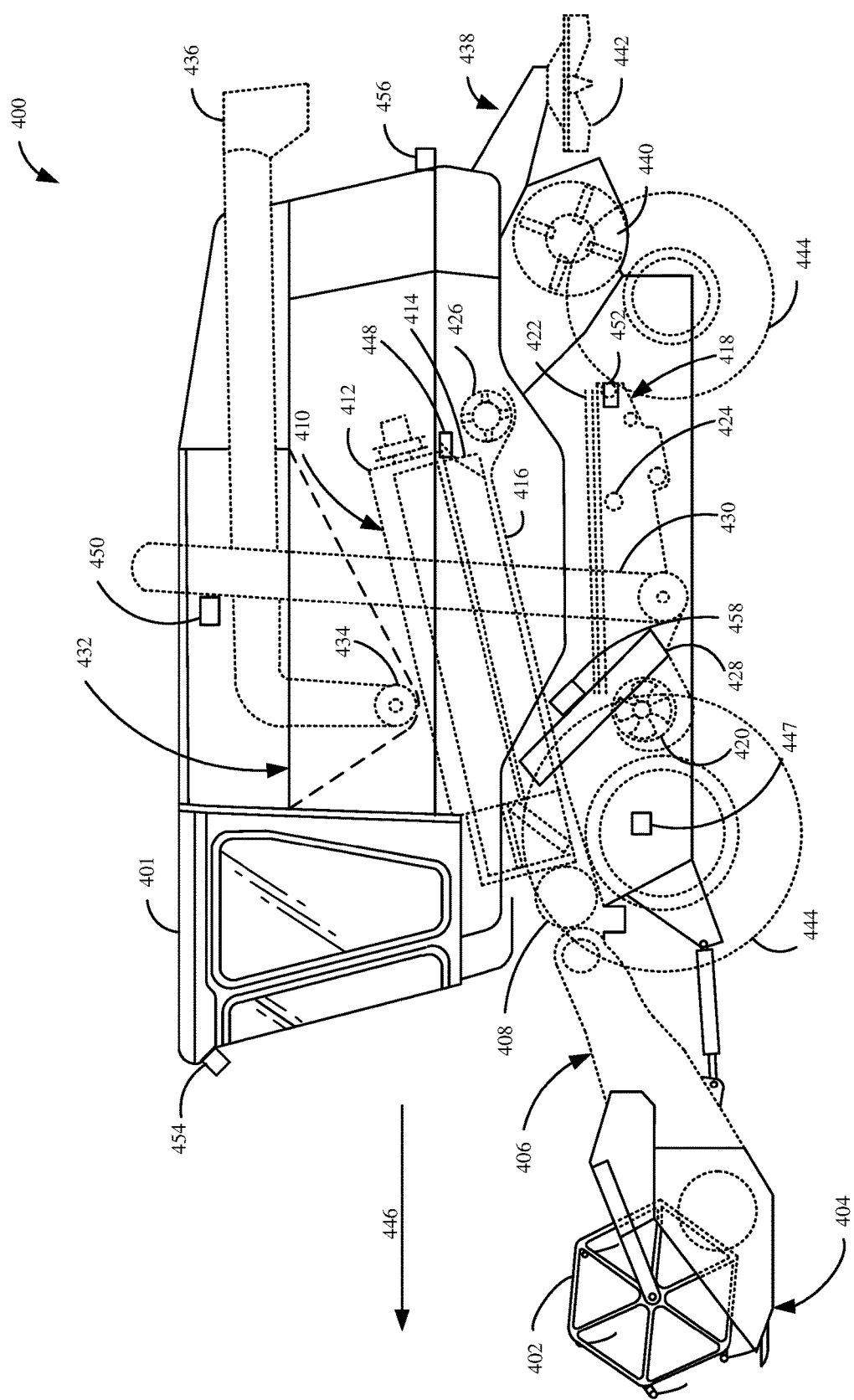
FIG. 4 is a partial pictorial, partial schematic, illustration of one example of an agricultural machine.

As noted above, one example of agricultural machine 102 is a harvester or combine, such as that shown in FIG. 4 which is a partial pictorial, partial schematic, illustration of an agricultural harvesting machine 400 (or combine). It can be seen in FIG. 4 that combine 400 illustratively includes an operator compartment 401, which can have a variety of different operator interface mechanisms, for controlling combine 400, as will be discussed in more detail below. Combine 400 can include a set of front end equipment that can include header 402, and a cutter generally indicated at 404. It can also include a feeder house 406, a feed accelerator 408, and a thresher generally indicated at 410. Thresher 410 illustratively includes a threshing rotor 412 and a set of concaves 414. Further, combine 400 can include a separator 416 that includes a separator rotor. Combine 400 can include a cleaning subsystem (or cleaning shoe) 418 that, itself, can include a cleaning fan 420, chaffer 422 and sieve 424. The material handling subsystem in combine 400 can include (in addition to a feeder house 406 and feed accelerator 408) discharge beater 426, tailings elevator 428, clean grain elevator 430 (that moves clean grain into clean grain tank 432) as well as unloading auger 434 and spout 436. Combine 400 can further include a residue subsystem 438 that can include chopper 440 and spreader 442. Combine 400 can also have a propulsion subsystem that includes an engine that drives ground engaging wheels 444 or tracks, etc. It will be noted that combine 400 may also have more than one of any of the subsystems mentioned above (such as left and right cleaning shoes, separators, etc.).

In operation, and by way of overview, combine 400 illustratively moves through a field in the direction indicated by arrow 446. As it moves, header 402 engages the crop to be harvested and gathers it toward cutter 404. After it is cut, it is moved through a conveyor in feeder house 406 toward feed accelerator 408, which accelerates the crop into thresher 410. The crop is threshed by rotor 412 rotating the crop against concave 414. The threshed crop is moved by a separator rotor in separator 416 where some of the residue is moved by discharge beater 426 toward the residue subsystem 438. It can be chopped by residue chopper 440 and spread on the field by spreader 442. In other implementations, the residue is simply dropped in a windrow, instead of being chopped and spread.

Grain falls to cleaning shoe (or cleaning subsystem) 418. Chaffer 422 separates some of the larger material from the grain, and sieve 424 separates some of the finer material from the clean grain. Clean grain falls to an auger in clean grain elevator 430, which moves the clean grain upward and deposits it in clean grain tank 432. Residue can be removed from the cleaning shoe 418 by airflow generated by cleaning fan 420. That residue can also be moved rearwardly in combine 400 toward the residue handling subsystem 438.

Tailings can be moved by tailings elevator 428 back to thresher 410 where they can be re-threshed. Alternatively, the tailings can also be passed to a separate re-threshing mechanism (also using a tailings elevator or another transport mechanism) where they can be re-threshed as well.

FIG. 4 also shows that, in one example, combine 400 can include ground speed sensor 447, one or more separator loss sensors 448, a clean grain camera 450, one or more cleaning shoe loss sensors 452, forward looking camera 454, rearward looking camera 456, a tailings elevator camera 458, and a wide variety of other cameras or image/video capture devices. Ground speed sensor 446 illustratively senses the travel speed of combine 400 over the ground. This can be done by sensing the speed of rotation of the wheels, the drive shaft, the axel, or other components. The travel speed can also be sensed by a positioning system, such as a global positioning system (GPS), a dead reckoning system, a LORAN system, or a wide variety of other systems or sensors that provide an indication of travel speed. In one example, optical sensor(s) capture images and optical flow is utilized to determine relative movement between two (or more) images taken at a given time spacing.

Cleaning shoe loss sensors 452 illustratively provide an output signal indicative of the quantity of grain loss. In one example, this includes signal(s) indicative of the quality of grain loss by both the right and left sides of the cleaning shoe 418. In one example, sensors 452 are strike sensors which count grain strikes per unit of time (or per unit of distance traveled) to provide an indication of the cleaning shoe grain loss. The strike sensors for the right and left sides of the cleaning shoe can provide individual signals, or a combined or aggregated signal. In one example, sound-based sensors across an area of the cleaning shoe and/or rotor can be utilized to obtain a count of grain strikes and a spatial distribution associated with the count. It will be noted that sensors 452 can comprise only a single sensor as well, instead of separate sensors for each shoe.

Separator loss sensor 448 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 448 may also comprise only a single sensor, instead of separate left and right sensors.

Cameras 450, 454, 456 and 458 illustratively capture video or still images that can be transmitted to, and displayed on, a display in operator compartment 401 or a remote device (shown in more detail below) in near real time. Clean grain camera 450, for instance, generates a video feed showing grain passing into clean grain tank 432 (or through clean grain elevator 430). Camera 454 can illustratively generate a video feed showing a view forward of operator compartment 401, such as showing header 402 and/or the crop in front of header 402. Cameras 456 and 458 illustratively generate a video feed showing the tailings in elevator 458 and the discharge beater 442 and an area of the field behind combine 400, respectively. Alternatively, or in addition to a video feed, captured images can be augmented and presented to the operator, for example in a manner aimed to reduce cognitive load on the operation. These are examples only, and additional or different cameras can be used and/or they can be devices that capture still images or other visual data.

Figure 5:
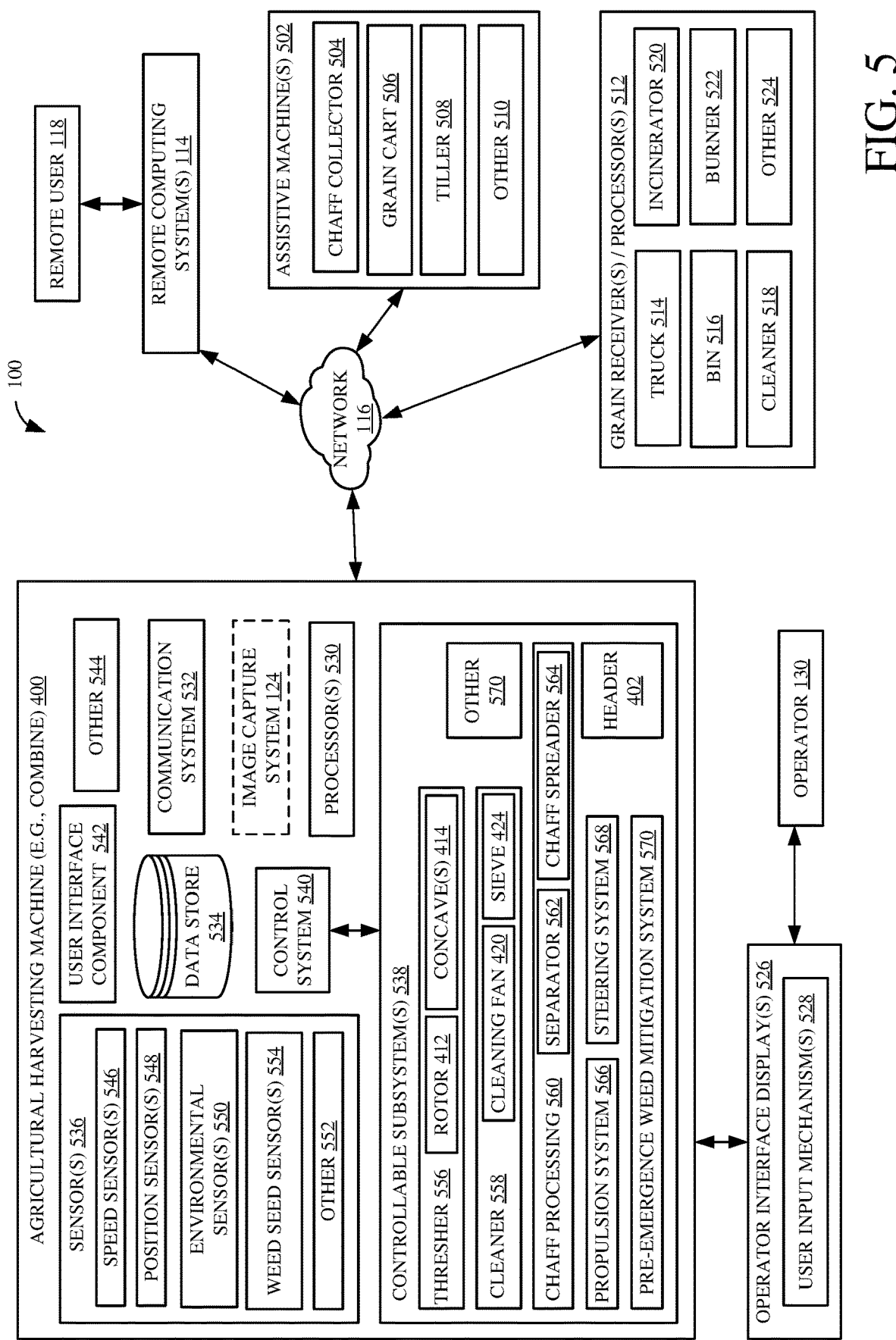
FIG. 5 is a block diagram showing one example of an agricultural machine.

FIG. 5 is a block diagram showing one example of machine 400 deployed in architecture 100. As illustrated, combine 400 is configured to communicate over network 116 with remote computing system(s) 114, as well as a set of assistive machines 502, which can include a chaff collector 504, a grain cart 506, a tiller 508, and/or other machines 510. Machine 400 can also communicate with one or more grain receivers/processors 512. This can include a grain truck 514, a grain bin 516, a cleaner 518, an incinerator 520, a burner 522, and it can include other items 524 as well.

As shown in FIG. 5, combine 400 can generate operator interface displays 526 with user input mechanisms 528 for interaction by operator 130. Operator 130 is illustratively a local operator of combine 400, in the operator's compartment 401, and can interact with user input mechanisms 528 in order to control and manipulate combine 400.

Combine 400 includes one or more processors or servers 530, communication system 532, a data store 534, sensors 536, controllable subsystems 538, a control system 540, a user interface component 542, and can include other items 544 as well. In one example, some or all of these components are similar to the components discussed above with respect to machine 102 shown in FIG. 1.

User interface component 542 can include one or more display devices, audio devices, one or more haptic devices, and it can include other items, such as a steering wheel, one or more joysticks, pedals, levers, buttons, keypads, etc. Where the user interface mechanisms include a user interface display, then user input mechanisms 528 can include buttons, icons, actuatable links, or other items that can be actuated by operator 130. When control system 540 or other items on machine 400 use speech recognition, and/or speech synthesis, then user interface mechanisms 528 can include a microphone, a speaker, etc.

Sensors 536, in one example, includes one or more sensors 120 discussed above. That is, sensors 536 can include speed sensor(s) 546, position sensor(s) 548, environmental sensor(s) 550, and can include other sensor(s) 552 as well. In the illustrated example, combine 400 includes weed seed sensor(s) 554 configured to sense the presence of weed seeds within combine 400. This is discussed in further detail below. Briefly, however, sensors 554 can comprise a wide variety of different types of sensors. For instance, sensors 554 can include electromagnetic sensors, capacitive sensors, impact sensors, to name a few. In any case, sensors 554 are configured to detect the presence of weed seeds that are distinguished from crop or other material being processed through combine 400.

Control system 540 can include logic and actuators or other items that can perform various types of processing and generate control signals to control controllable subsystems 538. The control signals can be generated based on user inputs, they can be generated automatically based on sensor inputs, based on detected events or otherwise. They can also be generated based on remote control inputs received from remote computing system 114.

Controllable subsystems 538 illustratively includes thresher 556, which includes rotor 412, concave(s) 414, etc. Also, controllable subsystems 538 can include cleaner 558, which includes cleaning shoe and/or fan 420, sieve 424, etc. Subsystems 538 also include chaff processing system 560, which includes chaff separator 562, chaff spreader 564, etc. Controllable subsystems 538 also includes header 402, a propulsion system 566 (e.g., system 148), steering system 568 (e.g., system 150), pre-emergence weed mitigation system 570 (e.g., system 144), and can include other items 572 as well.

It is noted that, in one example, machine 400 is deployed in a fleet of harvesting machines (which can be the same and/or different than machine 400) that harvest a field or group of fields. The fleet of harvesting machines can be paired with one or more mitigators (e.g., 502, 512) that perform weed seed mitigation operations (e.g., seed collection, devitalization, etc.) for the entire fleet of machines. Accordingly, each harvesting machine can send weed seed location information to the mitigator(s) (or to another system that is accessed by the mitigator(s)) which then perform the mitigation operations in the field(s).

Figure 6:
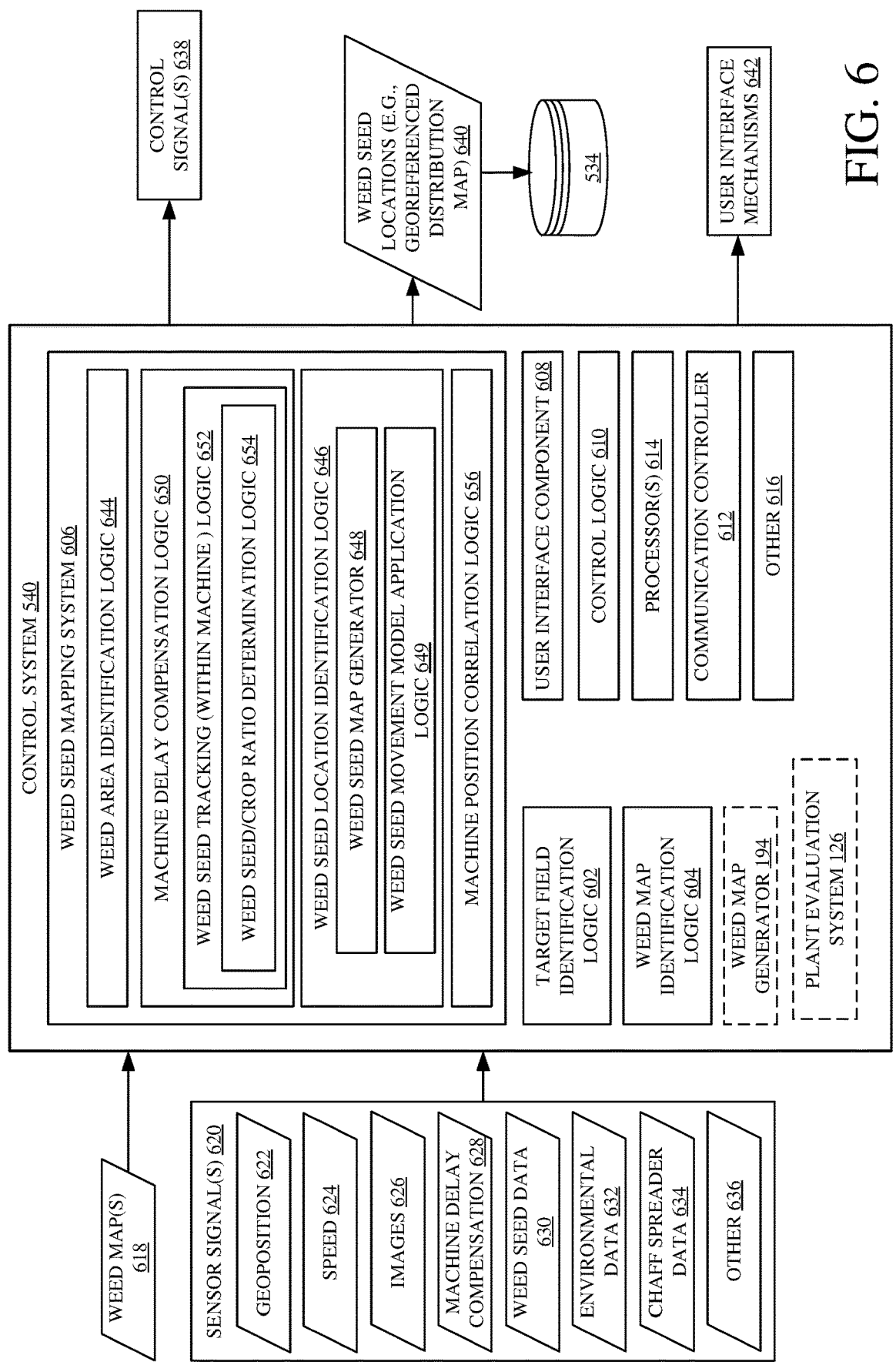
FIG. 6 is a block diagram illustrating one example of a control system.

FIG. 6 is a block diagram illustrating one example of control system 540. System 540 illustratively includes target field identification logic 602, weed map identification logic 604, a weed seed mapping system 606, a user interface component 608, control logic 610, a communication controller 612, one or more processors 614, and can include other items 616 as well. In the illustrated example, control system 540 can also include weed map generator 194, discussed above with respect to FIG. 1.

Control system 540 is illustrated as receiving a number of inputs including, but not limited to, weed maps 618 and sensor signal(s) 620. Sensor signal(s) 620 can include geoposition sensor signals 622, speed signals 624, images 626, machine delay compensation signals 628, weed seed data 630, environmental data 632, chaff spreader data 634, and can include other sensor signals as well (represented by block 636). Control system 540 is also illustrated as generated a number of outputs including, but not limited to, control signal(s) 638, weed seed location 640 (which can be stored in data store 534), and user interface mechanisms 642.

Target field identification logic 602 is configured to identify the field under consideration. This can be done based on user input from operator 130, remote user 118, or otherwise. Weed map identification logic 604 is configured to identify the weed map for the corresponding field identified by logic 602. For instance, logic 604 can receive weed maps 618 generated external to control system 540. In another example, the weed maps identified by logic can be generated by weed map generator 194 on control system 540.

Weed seed mapping system 606 includes weed area identification logic 644 configured to identify weed areas based on the weed map, and includes weed seed location identification logic 646 configured to identify those locations on the field. For example, this can include a weed seed map generator 648 generating a weed seed map that maps the locations of weed seeds (and can include corresponding density information) to locations in the field. Logic 646 illustratively includes weed seed movement model application logic configured to apply a movement model that models movement of weed seeds to the weed seed areas. As described herein, this can be based on environmental data (e.g., weather, etc.), terrain data (e.g., slope, soil conditions, etc.), and/or machine data (e.g., chaff spreader settings, machine speed, etc.).

In one example, machine delay compensation logic 650 is configured to compensate for delays in the processing of the plant material in machine 400, in generating the weed seed locations from the weed maps. For instance, this can include weed seed tracking logic 652 that tracks movements of the seed within machine 400. For instance, weed seed data 630 can be received from weed seed sensors that detect the weed seeds and their movement through machine 400. In one example, logic 652 includes crop/weed ratio determination logic 652 configured to detect the ration of weed seeds to crop material being harvested.

System 606 also includes machine position correlation logic 656 configured to correlate the position of machine 400 to the weed seed areas to generate weed seed location 640 and/or control signals 638.

Figure 7:
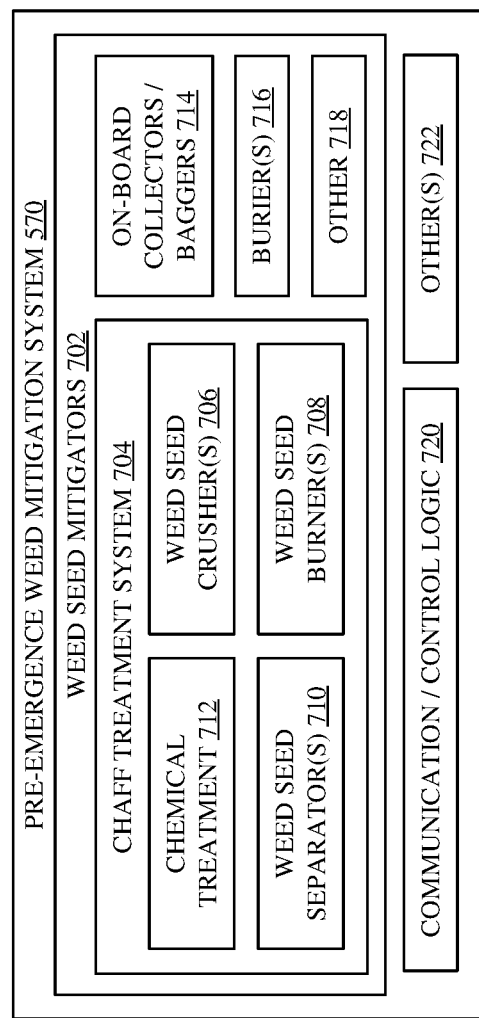
FIG. 7 is a block diagram illustrating one example of a pre-emergence weed mitigation system.

FIG. 7 is a block diagram illustrating one example of pre-emergence weed mitigation system 570. In the illustrated example, system 570 includes one or more weed seed mitigators 702. Illustratively, mitigator 702 includes a chaff treatment system 704 having weed seed crusher(s) 706, weed seed burner(s) 708, weed seed separators 710, and/or chemical treatment mechanisms 712, and can include other types of mitigators as well.

Weed seed crusher(s) 706 are configured to mechanically contact (e.g., crush) the weed seeds to devitalize the weed seeds which prevents, or at least discourages, germination of the weed seeds. Similarly, weed seed burner(s) 708 are configured to thermally heat the weed seeds to a temperature that destroys the weed seeds. Chemical treatment mechanisms 712 are configured to chemically treat the weed seeds. Also, an irradiation device can irradiate the weed seeds.

Mitigators 702 can also include on-board collectors and/or baggers 714 that are configured to collect the weed seeds. In one example, collectors 714 operate some or all of the chaff being ejected from combine 400, which would otherwise be placed on the ground.

In any case, collectors 714 collects the material that is being released from the crop processing components of combine 400.

Mitigators 702 can also include burier(s) 716 that are configured to bury the weed seeds to a threshold depth in the ground. For instance, a burier can be attached to, pulled by, or otherwise supported by combine 400. The burier follows the chaff ejection components which can either spread the chaff on the ground, drop the chaff in a windrow, or otherwise. The buriers operate to bury the ejected chaff, and thus the weed seeds, to a threshold depth in the ground (e.g., twelve inches or deeper) which inhibits germination of the weed seeds. Also, it is noted that a burier can comprise a separate machine that follows combine 400. Seed mitigators 702 can include other types of mitigators as well. This is represented by block 718.

System 570 is also illustrated as including communication/control logic 720 configured to communicate with other items in combine 400 and/or generate control signals to control weed seed mitigators 702. Of course, system 570 can include other items 722 as well.

Figure 8A:
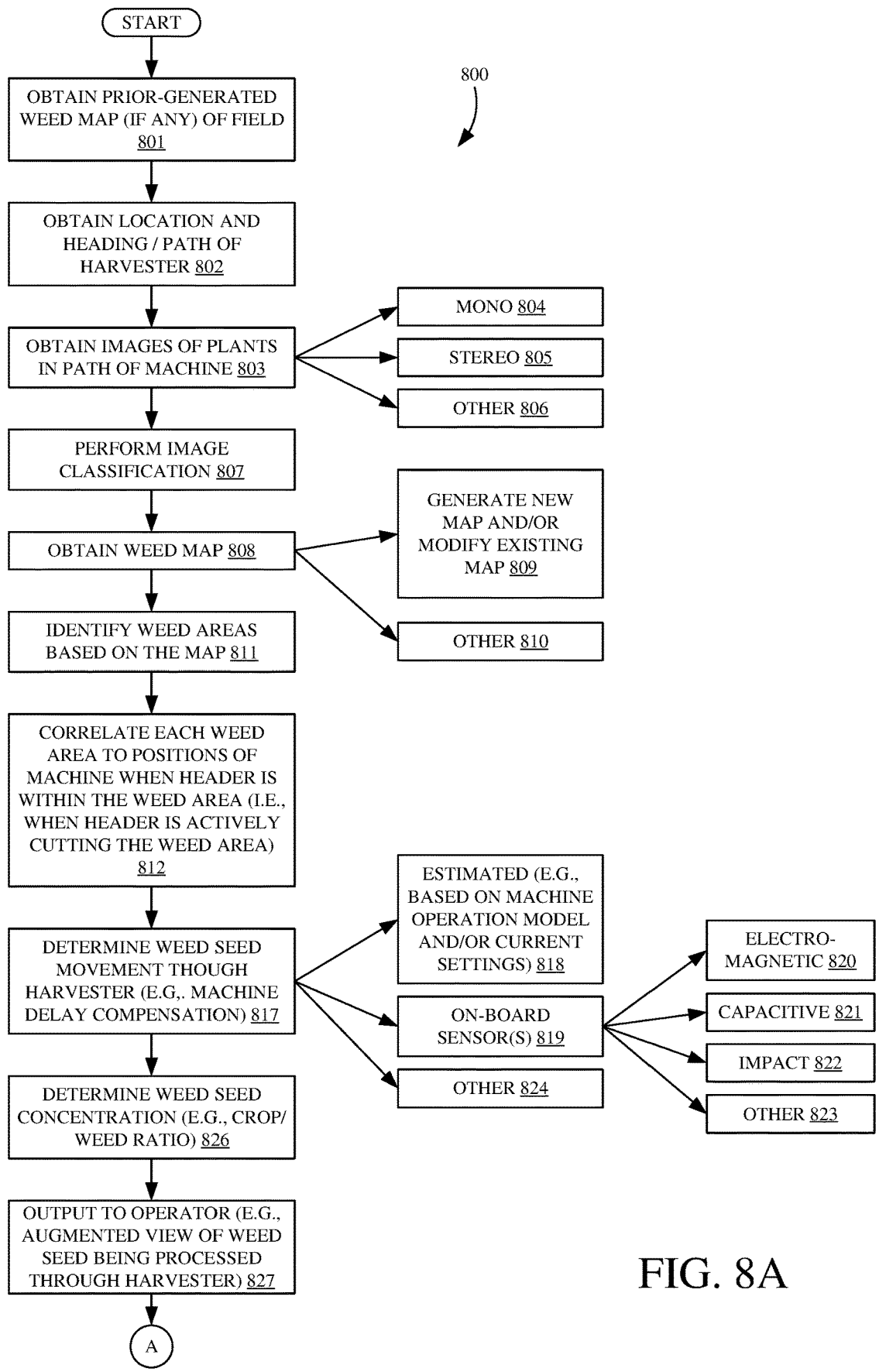
FIGS. 8A and 8B is a flow diagram illustrating an example operation of a pre-emergence weed mitigation system.
Figure 8B:
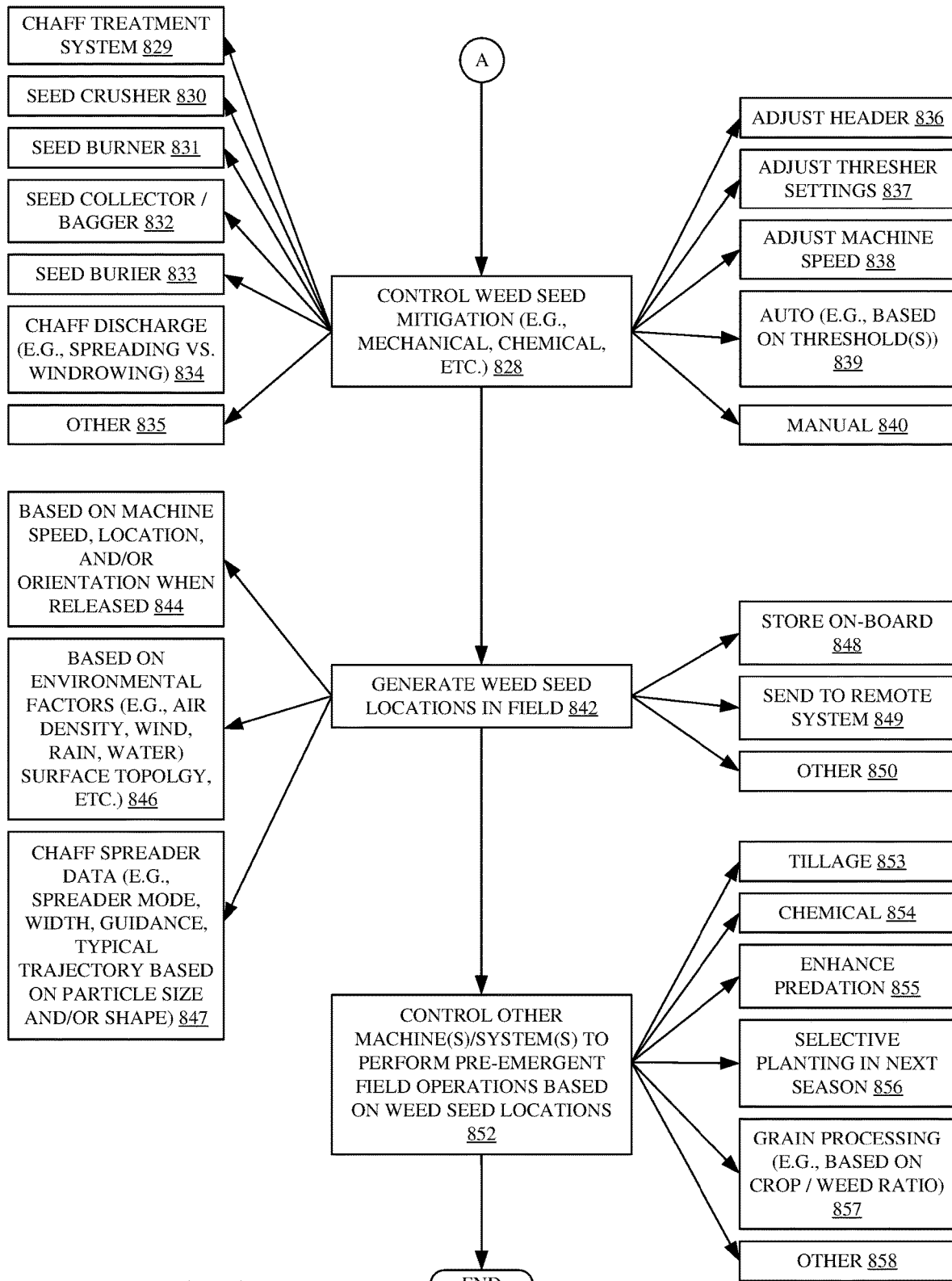

FIGS. 8A and 8B (collectively referred to as FIG. 8) is a flow diagram 800 illustrating an example operation to generate weed seed locations and perform pre-emergent mitigation during a harvesting operation. For sake of illustration, but not by limitation, FIG. 8 will be described in the context of combine 400 illustrated in FIGS. 4 and 5.

At block 801, a prior generated weed map of the target field (if any) is obtained. For example, this can include receiving weed map 618 shown in FIG. 6. At block 802, a location and/or heading/path of combine 400 is obtained. For instance, this can be based on the sensor signals 620 which illustrate a current position and direction of combine 400.

At block 803, images of plants in the path of combine 400 (e.g., forthcoming plants that are expected to reach the crop processing functionality of the combine) are obtained. For instance, this can include mono images (block 804), stereo images (block 805), or other images (block 806). For example, the images obtained at block 803 can be received as images 626 from image capture system 124 that is on-board combine 400 and/or carried on a separate machine, such as UAV that operates ahead of combine 400 in the field.

At block 807, image classification is performed on the images obtained at block 803. Examples of image classification are discussed above. Briefly, however, the image classification performed at block 807 classifies areas of the image as representing weed plants, crop plants, etc. Based on this, a weed map is obtained at block 808. As represented at block 809, the weed map can include the generation of a new weed map and/or the modification of an existing map. For example, the image classification performed at block 807 can be utilized to modify the weed map obtained at block 801. The weed map can be obtained in other ways as well. This is represented at block 810.

At block 811, weed areas are identified based on the weed map obtained at block 808. The identified weed areas can include a spatial boundary that identifies its relative position on the field, as well as weed density information that identifies the density of the weeds within the weed area.

At block 812, each weed area is correlated to positions of the machine when the header 102 is within the weed area (i.e., when the header is actively cutting within the weed area).

Figure 9:
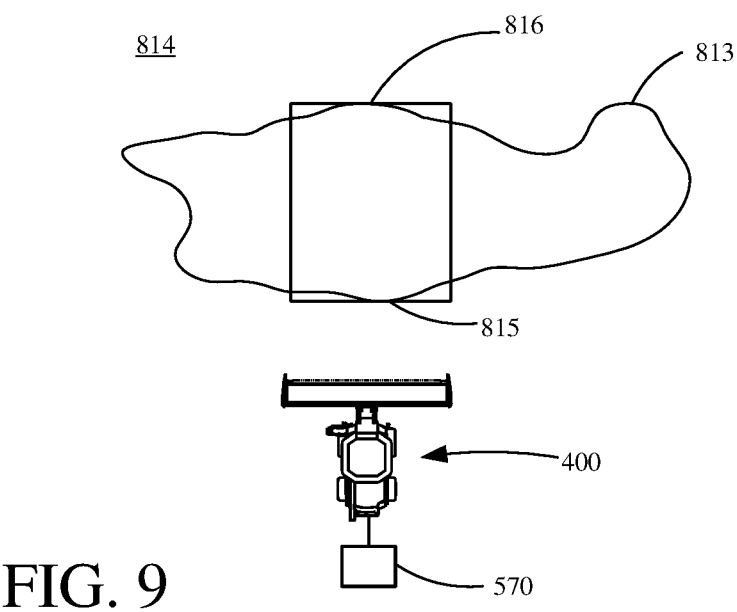
FIG. 9 illustrates an example weed area on a field being harvested by a combine.

For sake of illustration, FIG. 9 illustrates an example weed area 813 on a field 814 being harvested by combine 400. The correlation at block 812 identifies the position of combine 400 when the header first reaches the beginning edge 815 of weed area 813 until the header passes the trailing edge 816. A treatment zone is defined between edges 815 and 816 (and corresponding to the width of the header). Thus, for machine positions in which the header is within the treatment zone, the header is cutting the weed area, and is thus gathering weed seeds along with crop plants from that area of the field.

As also shown, mitigation system 570 follows combine 400 (e.g., is attached to the combine 400, is pulled by combine 400, is pulled/carried by a separate machine, etc.) and is configured to perform a weed seed mitigation operation. For example, system 570 can include a trailer or container that is configured to collect the chaff or residue ejected from the rear of combine 400, bury the chaff, burn the chaff, chemically treat the chaff, etc. In one example, a bagger collects the chaff into bags that are deposited or dropped on the field and later collected. System 570 can tag (e.g., with markings, barcodes, radio-frequency identification (RFID) tags, the bags with information on the collected chaff (e.g., location, type of material, quantity, weed seed composition, etc.). This information can be read from the tags during subsequent processing.

Referring again to FIG. 8, at block 817, weed seed movement through the combine is determined. As discussed above, this, in one example, is based on machine delay compensation that represents the amount of time that it takes the weed seeds to move from a given point in the combine (e.g., the header cutting in the treatment zone) to a weed seed mitigator (e.g., collector, crusher, burner, etc.). This machine delay compensation is utilized by control system 540 to determine when to activate the corresponding mitigator to minimize operation of the mitigator. In other words, this operates to prevent or at least reduce operation of the mitigator during times when the mitigator is receiving material that does not include weed seeds or has weed seeds below a threshold. Thus, the mitigator is activated based on the spatial location of mitigator relative to the weed seed area. This can operate to reduce the associated costs of operating the mitigator. That is, some mitigators, such as seed crushers, have high operating costs in terms of power consumption, reduced efficiencies, wear and tear on the components, etc.

In one example, the weed movement within combine 400 is estimated, for example based on the machine operation model and/or current settings (e.g., settings of thresher 556, cleaner 558, chaff processing 560, etc.). This is represented by block 818. Alternatively, or in addition, weed seed movement can be detected based on signals received from on-board sensors. This is represented by block 819. For example, on-board sensors such as electromagnetic sensors (block 820), capacitive sensors (block 821), impact sensors (block 822), or other types of sensors (block 823) can be utilized.

In some examples, chaff material such as leaves, stalks, or other residue material are typically less dense than weed seeds and have lower concentrations of protein and/or oil. Leaves and stalks are typically composed of only carbohydrates, and possibly a small amount of chlorophyll and water. This information can be leveraged from the signals received from on-board sensors 819 to determine the presence of weed seeds in the material flow.

Figure 10A:
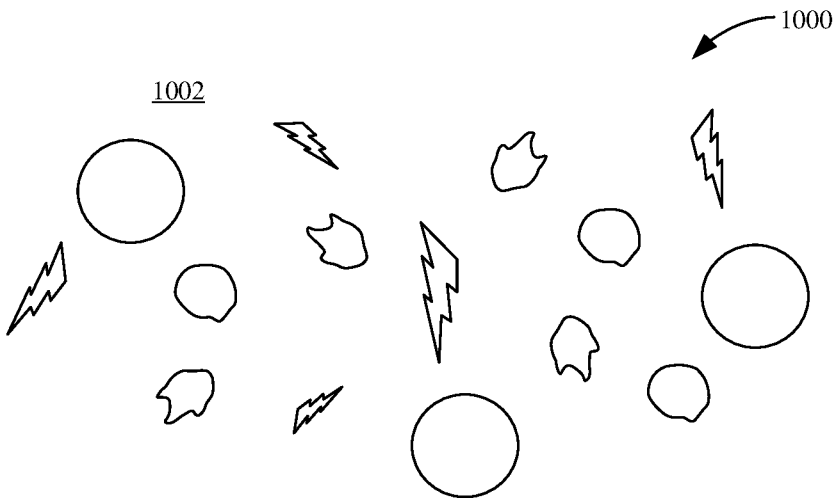
FIGS. 10A and 10B illustrates an example image from an electromagnetic sensor that senses components of a material flow in an agricultural harvesting machine.
Figure 10B:
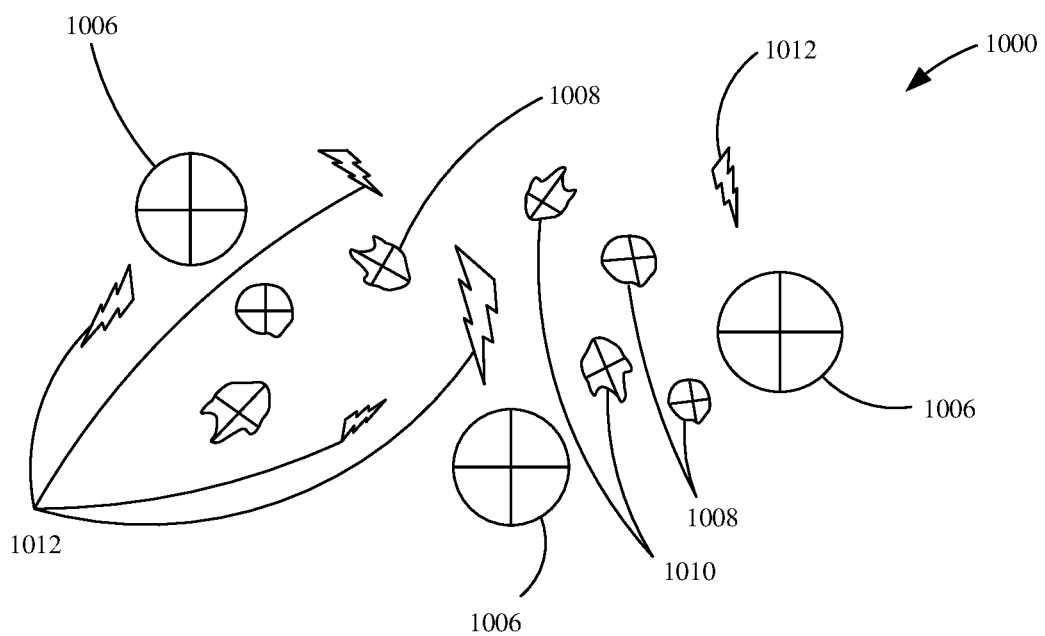

Referring to FIGS. 10A and 10B (collectively referred to as FIG. 10), an example image 1000 is received from an electromagnetic sensor that uses electromagnetic radiation that is reflected, scattered, transmitted, or absorbed by components of the material flow. In one example, image 1000 includes a grayscale image of the electromagnetic transmission through a material flow 1002.

Due to their differences in composition (e.g., as noted above, seeds typically have higher concentrations of oil and protein), chaff and seeds can have different electromagnetic responses that can be detected and utilized to identify weed seeds in material flow 1002. Because seeds are denser than chaff, they show up darker in image 1000. Similarly, size can be determined from the image and/or attenuation of the electromagnetic source signal (e.g., darker portions of the image can represent thicker material).

FIG. 10B shows image 1000 after gray objects have been classified as soybean seed (identified by reference numeral 1006). Similarly, palmer amaranth is identified at reference numeral 1008 and common ragweed seed is identified at reference numeral 1010 using shape and size information. In one example, texture as well as non-visible spectra is utilized to determine density and/or reflectance difference. Alternatively, or in addition, active (modulated/pulsed) illumination is reposed in different spectral bands. In one example of FIG. 10B, chaff material represented at reference numeral 1012 is ignored.

It is noted that any type of classifier can be utilized for classifying the material in material flow 1002. For example, a rules-based classifier can classify weed seeds based on size, shape, and/or color. In another example, a neural network can be trained to identify seeds.

Referring again to FIG. 8, at block 826 weed seed mapping system 606 determines a concentration of weed seed within the plant material. That is, one example, block 826 determines the ratio of crops to weeds within the harvested material. At block 827, control logic 610 can control user interface mechanism 642 to output an indication of the weed seed processing to operator 130. For instance, an augmented view of the weed seed can be provided.

At block 828, one or more weed seed mitigators are controlled by control logic 610 generating control signals 638 to weed mitigation system 570. As noted above, this can include any of a wide variety of operations performed by combine 400. For example, the chaff treatment system can be controlled at block 829. Alternatively, or in addition, a seed crusher is controlled at block 830, a seed burner is controlled at block 831, a seed collector/bagger is controlled at block 832, a seed burier is controlled at block 833, and/or chaff discharge can be controlled at block 834.

For example, the chaff discharge 834 can be switched from a spreading mode to a windrowing mode. For instance, when high concentrations of weed seeds are about to be discharged from combine 400, the discharge settings can be set to place the material in a windrow for subsequent burning, burying, and/or pickup (by combine 400 or another machine).

Of course, other types of weed seed mitigators can be controlled as well. This is represented by block 835.

In one example, the control at block 828 includes adjusting header 402 of combine 400. This is represented at block 836. For example, in response to detecting the presence of weed plants in the path of the header, header 402 can be lowered to ensure that the crops are cut and processed through combine 400, so their seeds do not remain on the field. Alternatively, header can be raised so that the weed area is not harvested. The weed area can be treated on-site (e.g., mechanically) to minimize weed seed spread.

In another example, the thresher settings can be adjusted at block 837. Alternatively, or in addition, the machine speed can be adjusted at block 838. For example, it may be that seed crusher 830 performs better at lower machine speeds.

Thus, the machine can be controlled to a desired speed during operation of the weed seed mitigator.

Also, it is noted that the control at block 828 can be automatic, for example based on weed seed concentration thresholds. This is represented at block 839. For example, the weed seed concentration determined at block 826 can be compared against one or more thresholds and, if a particular threshold is met, one of weed seed mitigators 702 can be activated. Alternatively, or in addition, the control at block 828 can be manual, for example based on operator input. This is represented by block 840.

At block 842, the weed seed locations in the field are generated. For example, the weed seed locations can be generated based on one or more factors that affect the movement of the weed seeds once they are released from combine 400. For instance, this can be based on the machine speed, location and/or orientation when released. This is represented by block 844. Alternatively, or in addition, the locations of the weed seed can be determined based on environmental factors, such as air density, wind, rain, surface water, surface topology, etc. This is represented at block 846. Also, the weed seed locations can be generated based on chaff spreader data (e.g., data 634). This is represented at block 847.

The weed seed locations generated at block 842 can be stored on-board combine 400 (block 848) in data store 534. Alternatively, or in addition, the weed seed locations can be sent to a remote system, such as system 114, other agricultural machines 117, and/or another machine/system (block 849). Of course, the weed seed locations can be generated and utilized in other ways as well. This is represented by block 850.

At block 852, other machines are controlled to perform pre-emergent field operations based on the weed seed locations. For instance, a tilling machine can be controlled to perform a tilling operation in treatment areas of the field that correspond to the weed seed locations. This is represented by block 853. In another example, a chemical application machine (e.g., a sprayer) is controlled to chemically treat the weed seed locations to destroy the seeds, stimulate early germination, etc. This is represented by block 854. In another example, at block 855, predation can be enhanced by an application of a substance to the weed seeds. In another example, selective planting can be performed in the next growing season. This is represented by block 856. For instance, different crop planting prescriptions can be utilized based on the identification of weed seed areas in the field and/or their corresponding weed seed densities.

In another example, operation of a grain processor can be controlled based on the crop/weed ratio. This is represented by block 857. For example, when a grain cart is filled by combine 400, the weed seed concentration information determined at block 826 can be utilized to determine a subsequent grain processing operation to remove the weed seeds.

Of course, pre-emergent operations can be performed in other ways as well. This is represented by block 858.

As noted above, in some examples weed plants include a second crop intercropped with a first crop and undergoing simultaneous harvest. In accordance with one example of FIG. 8, the weed areas identified at block 811 (e.g., based on the prior-generated weed map obtained at block 801, the weed map obtained at block 808, etc.) identify areas of the field that contain the second crop. For instance, the weed seed locations 640 (shown in FIG. 6) represent second crop locations and can include as-planted maps, crop maps from aerial images, etc.

Further, the operations controlled at blocks 828 and/or 852 can be configured to nondestructively collect and segregate the second crop ("the weed") from the first crop. For sake of illustration, at block 832 a seed collector/bagger is configured to segregate and collect the second crop. In another example, adjustments can be made (e.g., blocks 836, 837, etc.) to collect and keep both crops together for later separation with minimal (or at least reduced) harvest losses in the field.

In one example, the seed collector/bagger is equipped with a crop sensor for measuring the yield or other attributes (e.g., moisture, oil, protein, starch, etc.) of the second crop. These yield and crop attribute measurements can be displayed to an operator (in place of or in addition to the those of the first crop), georeferenced and stored on a map, and/or used for machine control.

It can thus be seen that the present system provides a number of advantages. For example, but not by limitation, the present system provides site-specific agricultural operations to mitigate weeds by identifying, before emergence, the locations of the weed seeds. Further, the weed seed locations can be accurately determined by taking into account machine data, environmental data, and/or any other data utilized to model weed seed movement. Using those weed seed locations, the weeds (including herbicide resistant varieties) can be mitigated. This can increase yields, while reducing the application of chemicals to the fields and/or machine operations (e.g., sprayer operation over the field to chemically treat weeds post-emergence. This, in turn, can decrease power/fuel consumption, reduced machine wear and tear, and/or otherwise increase efficiencies/productively of the agricultural operations.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors, processing systems, controllers and/or servers. In one example, these can include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 11:
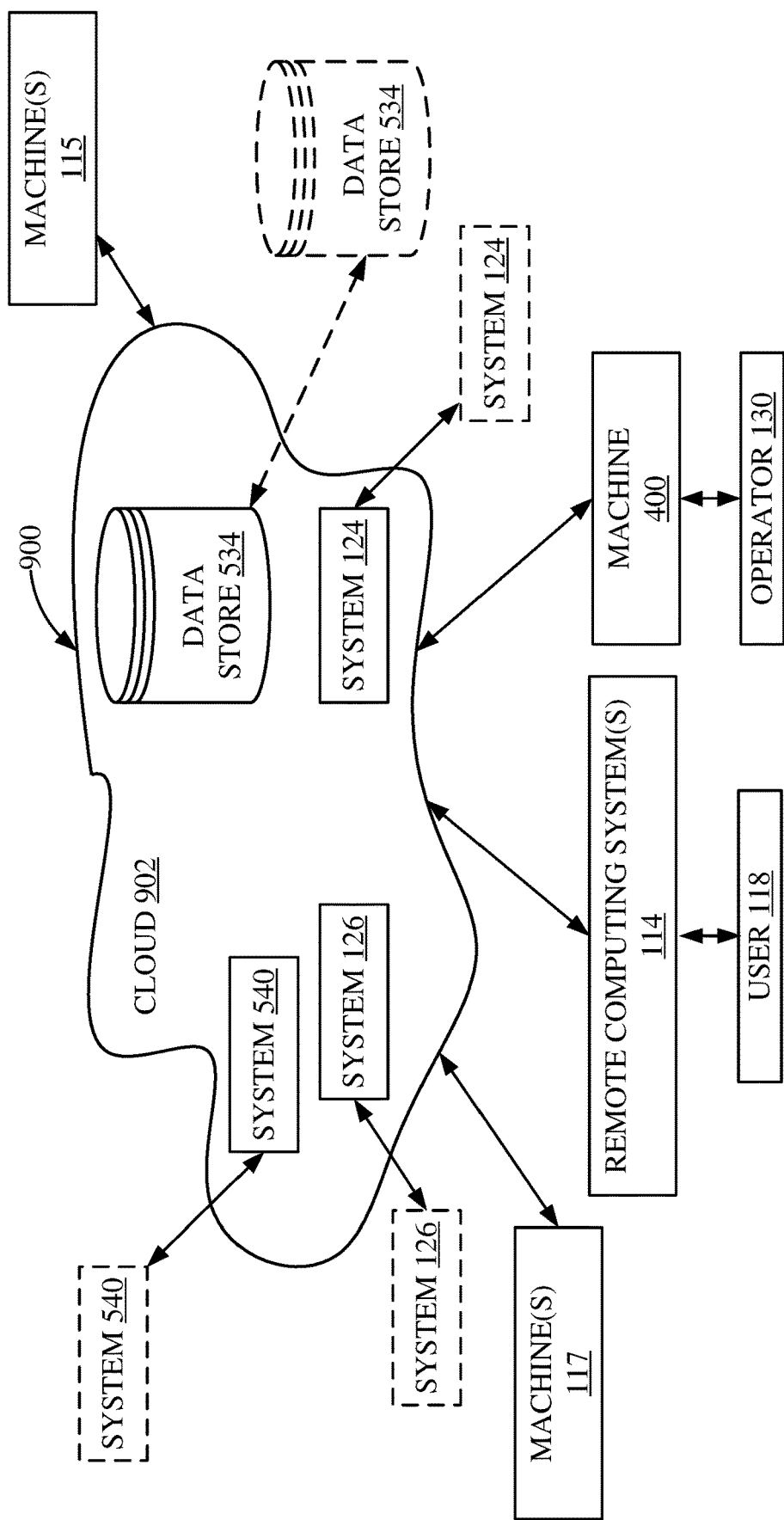
FIG. 11 is a block diagram showing one example of the architecture illustrated in FIG. 3, deployed in a remote server architecture.

FIG. 11 is a block diagram of one example of the architecture shown in FIG. 5, where machine 400 communicates with elements in a remote server architecture 900. In an example, remote server architecture 900 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 5 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 11, some items are similar to those shown in FIG. 5 and they are similarly numbered. FIG. 11 specifically shows that system 124, system 126, system 540, and/or data store 534 can be located at a remote server location 902. Therefore, agricultural machine 400, machine(s) 115, machine(s) 117, and/or system(s) 114 access those systems through remote server location 902.

FIG. 11 also depicts another example of a remote server architecture. FIG. 11 shows that it is also contemplated that some elements of FIG. 5 are disposed at remote server location while others are not. By way of example, data store 534 can be disposed at a location separate from location 902, and accessed through the remote server at location 902. Alternatively, or in addition, one or more of systems 124, 126, and 540 can be disposed at location(s) separate from location 902, and accessed through the remote server at location 902.

Regardless of where they are located, they can be accessed directly by agricultural machine 400, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the agricultural machine comes close to the fuel truck for fueling, the system automatically collects the information from the machine or transfers information to the machine using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the agricultural machine until the agricultural machine enters a covered location. The agricultural machine, itself, can then send and receive the information to/from the main network.

It will also be noted that the elements of FIG. 5, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 12:
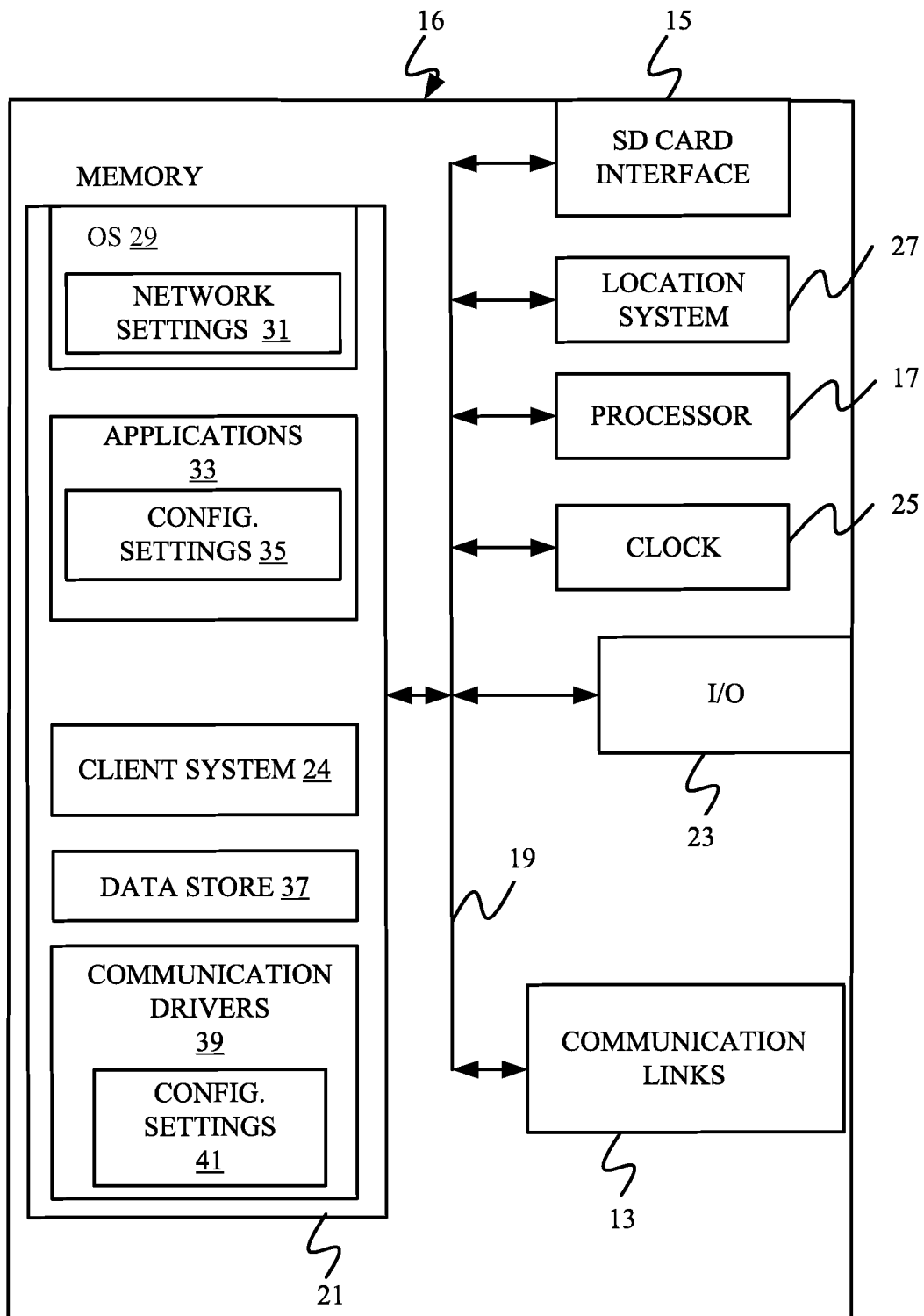
FIGS. 12-14 show examples of mobile devices that can be used in the architectures shown in the previous figures.
Figure 13:
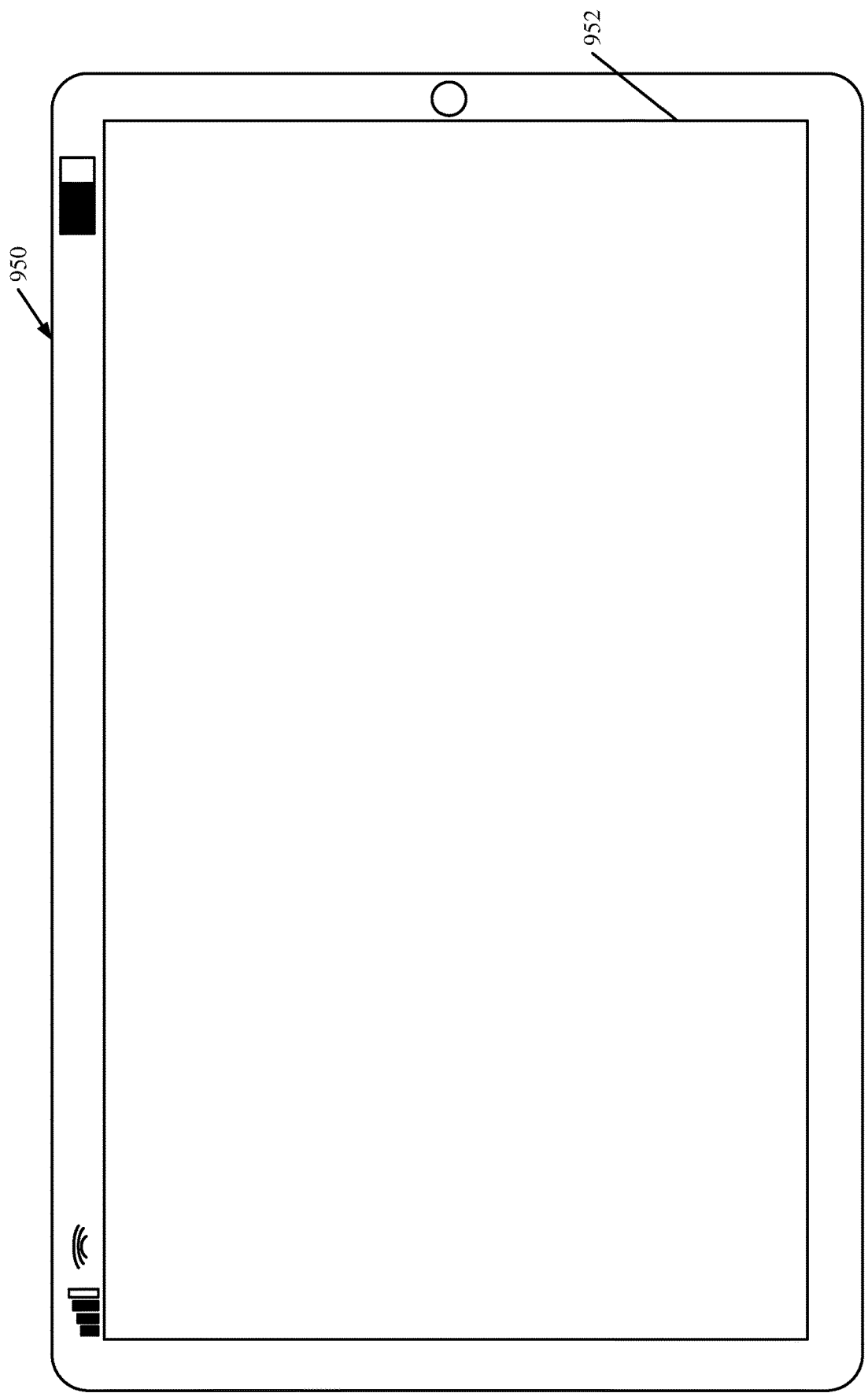
Figure 14:
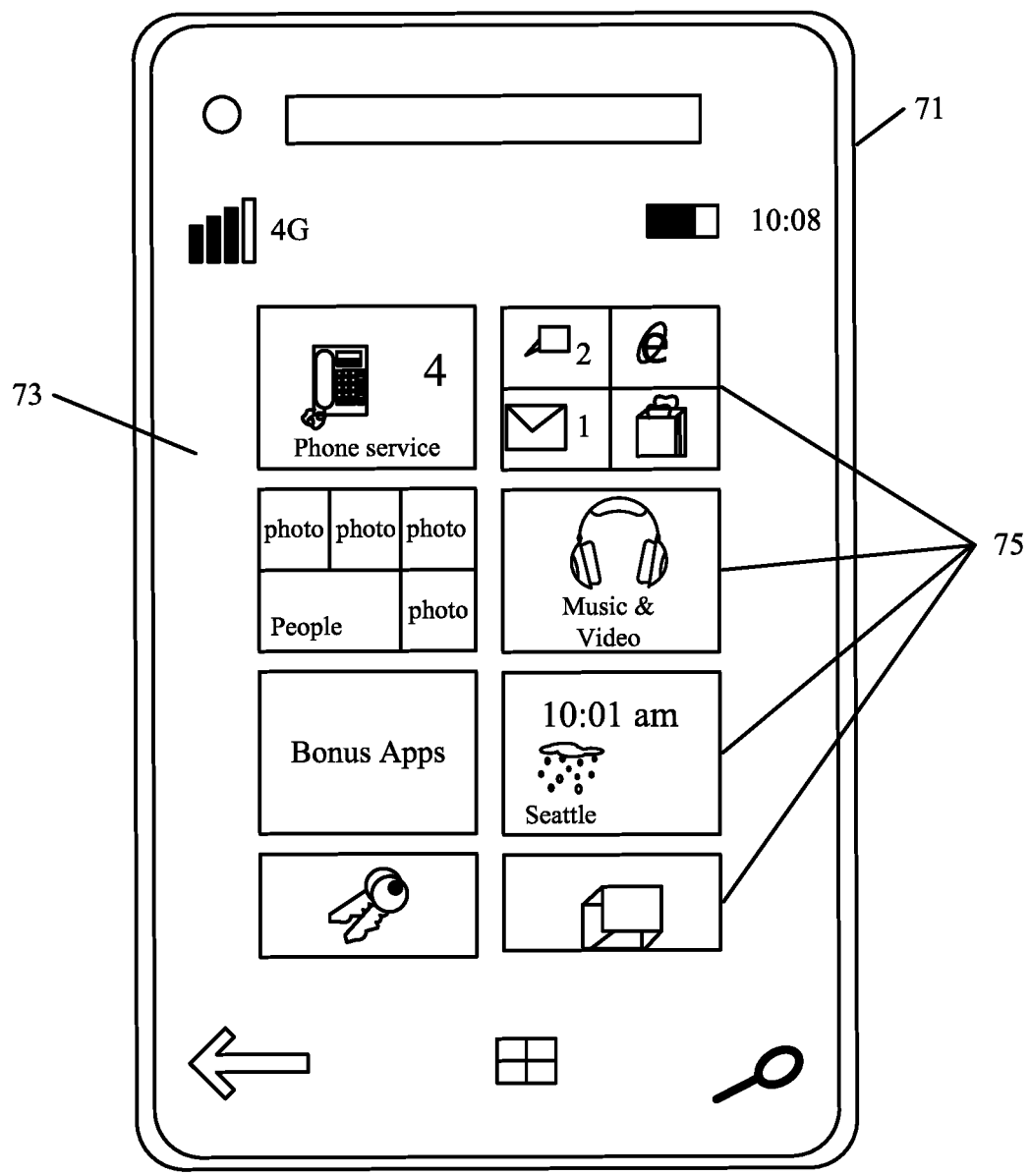

FIG. 12 is a simplified block diagram of one illustrative example of a handheld or mobile computing device that can be used as a user's or client's handheld device 16, in which the present system (or parts of it) can be deployed. For instance, a mobile device can be deployed in the operator compartment of agricultural machine 400 or as remote computing system 114. FIGS. 13-14 are examples of handheld or mobile devices.

FIG. 12 provides a general block diagram of the components of a client device 16 that can run some components shown in FIG. 5, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock and location system 27.

I/O components 23, in one example, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system.

It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 13 shows one example in which device 16 is a tablet computer 950. In FIG. 13, computer 950 is shown with user interface display screen 952. Screen 952 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 950 can also illustratively receive voice inputs as well.

FIG. 14 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 15:
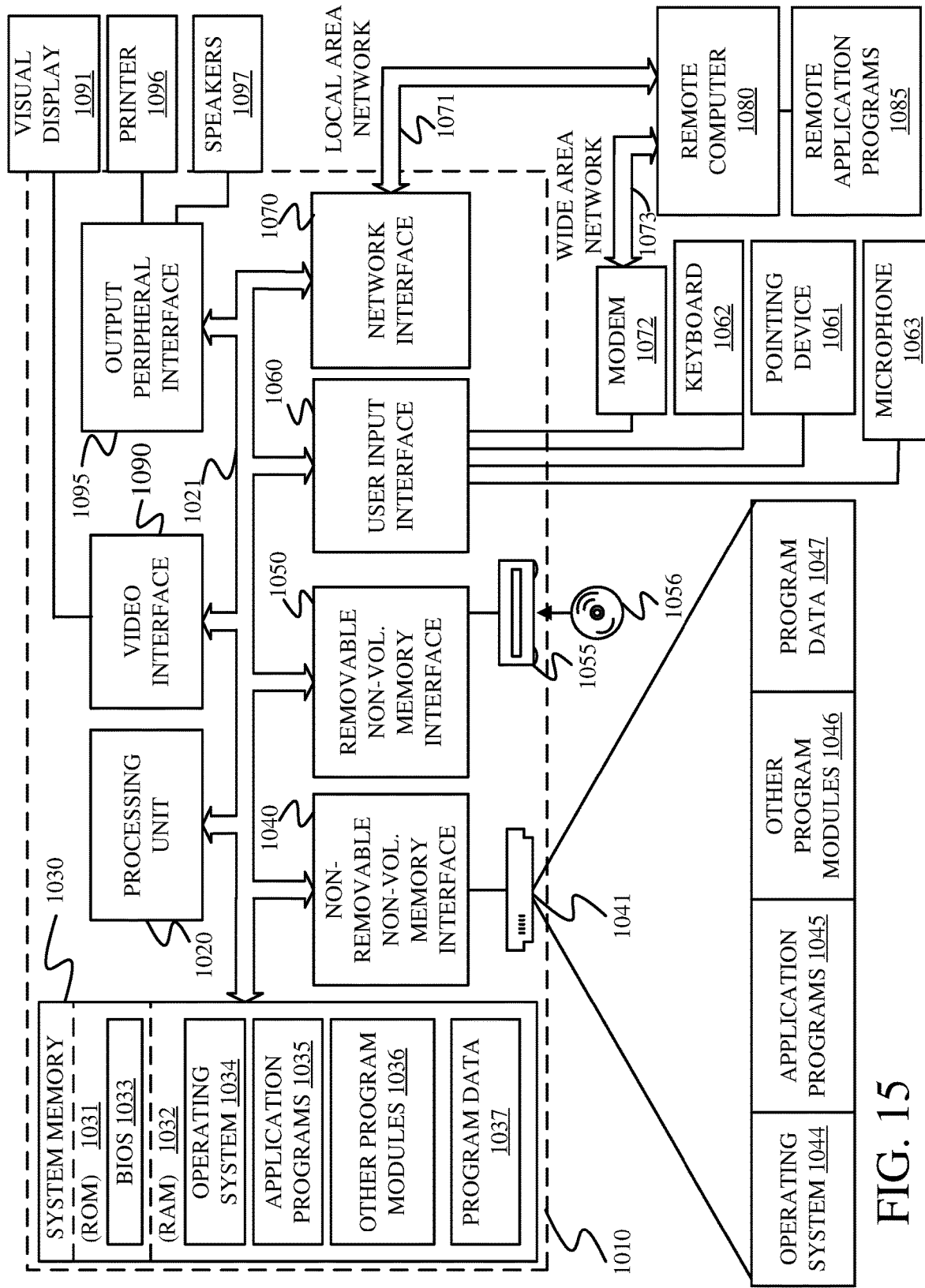
FIG. 15 is a block diagram showing one example of a computing environment that can be used in the architectures shown in the previous figures.

FIG. 15 is one example of a computing environment in which elements of FIG. 5, or parts of it, (for example) can be deployed. With reference to FIG. 15, an example system for implementing some embodiments includes a computing device in the form of a computer 1010. Components of computer 1010 may include, but are not limited to, a processing unit 1020 (which can comprise processors or servers from previous FIGS.), a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. Memory and programs described with respect to FIG. 5 can be deployed in corresponding portions of FIG. 15.

Computer 1010 typically includes a variety of computer readable media. Computer readable media can be any available media that can be accessed by computer 1010 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1010. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 15 illustrates operating system 1034, application programs 1035, other program modules 1036, and program data 1037.

The computer 1010 may also include other removable/non-removable volatile/nonvolatile computer storage media. By way of example only, FIG. 15 illustrates a hard disk drive 1041 that reads from or writes to non-removable, nonvolatile magnetic media, an optical disk drive 1055, and non-volatile optical disk 1056. The hard disk drive 1041 is typically connected to the system bus 1021 through a non-removable memory interface such as interface 1040, and optical disk drive 1055 is typically connected to the system bus 1021 by a removable memory interface, such as interface 1050.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 15, provide storage of computer readable instructions, data structures, program modules and other data for the computer 1010. In FIG. 15, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037.

A user may enter commands and information into the computer 1010 through input devices such as a keyboard 1062, a microphone 1063, and a pointing device 1061, such as a mouse, trackball or touch pad. Other input devices (not shown) may include a joystick, game pad, satellite dish, scanner, or the like. These and other input devices are often connected to the processing unit 1020 through a user input interface 1060 that is coupled to the system bus, but may be connected by other interface and bus structures. A visual display 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1010 is operated in a networked environment using logical connections (such as a local area network—LAN, or wide area network—WAN or a controller area network—CAN) to one or more remote computers, such as a remote computer 1080.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. In a networked environment, program modules may be stored in a remote memory storage device. FIG. 15 illustrates, for example, that remote application programs 1085 can reside on remote computer 1080.

It should also be noted that the different examples described herein can be combined in different ways. That is, parts of one or more examples can be combined with parts of one or more other examples. All of this is contemplated herein.

Example 1 is a computer-implemented method comprising:
  obtaining a weed map of a field including a crop, the weed map representing weed plant locations on the field;
  identifying, based at least in part on the weed map, weed seed locations that represent presence of weed seeds on the field; and
  generating a control signal for a pre-emergence weed mitigation operation based on the weed seed locations.

Example 2 is the computer-implemented method of any or all previous examples, wherein the weed map is based on one or more images of the field.

Example 3 is the computer-implemented method of any or all previous examples, wherein the one or more images are obtained from a remote imaging sensor.

Example 4 is the computer-implemented method of any or all previous examples, wherein the one or more images are obtained from an imaging sensor on an agricultural harvesting machine during a crop harvesting operation on the field.

Example 5 is the computer-implemented method of any or all previous examples, and further comprising:
  generating the weed map based on classifying the one or more images using plant attributes.

Example 6 is the computer-implemented method of any or all previous examples, wherein identifying the weed seed locations comprising:
  identifying the weed seed locations based on environmental data representing an environment of the field.

Example 7 is the computer-implemented method of any or all previous examples, wherein the environment data represents weather conditions.

Example 8 is the computer-implemented method of any or all previous examples, wherein identifying the weed seed locations comprising:
  identifying the weed seed locations based on terrain data representing a terrain of the field.

Example 9 is the computer-implemented method of any or all previous examples, wherein the terrain data represents at least one of a topology of the field or soil conditions of the field.

Example 10 is the computer-implemented method of any or all previous examples, and further comprising:
  generating a weed seed map that maps the weed seed locations on the field, wherein the pre-emergence weed mitigation operation comprises a post-harvesting operation performed after the crop is harvested from the field.

Example 11 is the computer-implemented method of any or all previous examples, wherein the pre-emergence weed mitigation operation comprises at least one of:
  applying a chemical to the weed seed locations on the field; or
  performing a tilling operation that buries the weed seeds to a threshold depth.

Example 12 is the computer-implemented method of any or all previous examples, and further comprising:
  generating a weed seed map that maps the weed seed locations on the field, wherein the pre-emergence weed mitigation operation is performed during a harvesting operation that harvests the crop from the field.

Example 13 is the computer-implemented method of any or all previous examples, and further comprising:
  receiving a weed seed presence signal from a weed seed detector on an agricultural machine; and
  identifying the weed seed locations based on the weed seed presences signal.

Example 14 is the computer-implemented method of any or all previous examples, wherein the agricultural machine comprises an agricultural harvesting machine.

Example 15 is a computing system comprising:
  weed map identification logic configured to identify a weed map of a field including a crop, the weed map representing weed plant locations on the field;
  weed seed location identification logic configured to identify, based at least in part on the weed map, weed seed locations that represent presence of weed seeds on the field; and
  control logic configured to generate a control signal for a pre-emergence weed mitigation operation based on the weed seed locations.

Example 16 is the computing system of any or all previous examples, wherein the weed map is based on one or more images of the field.

Example 17 is the computing system of any or all previous examples, wherein the weed seed location identification logic is configured to applying a weed seed movement model to determine the weed seed locations.

Example 18 is the computing system of any or all previous examples, wherein the weed seed movement model is based on at least one of:
  environment data representing an environment of the field,
  terrain data representing a terrain of the field, or
  machine data representing machine operating characteristics.

Example 19 is a control system for an agricultural machine, the control system comprising:
  a weed seed mapping system configured to:
  obtain a weed map of a field including a crop, the weed map representing weed plant locations on the field;
  identify, based at least in part on the weed map, weed seed locations that represent presence of weed seeds on the field; and
  a control logic configured to generate a control signal for a pre-emergence weed mitigation operation based on the weed seed locations.

Example 20 is the control system for an agricultural machine of any or all previous examples, wherein the weed seed mapping system is configured to:
  identify the weed seed locations by applying a weed seed movement model, wherein the weed seed movement model is based on at least one of:
  environment data representing an environment of the field, terrain data representing a terrain of the field, or
machine data representing machine operating characteristics.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
obtaining a weed plant map of a field including a crop, the weed plant map identifying a plurality of weed areas on the field,
each weed area, of the plurality of weed areas, being defined in the weed plant map by a spatial boundary that identifies a relative position on the field of the weed area having weed plants;
applying a movement model to the plurality of weed areas defined in the weed plant map, wherein the movement model represents movement of weed seeds from a first location on one or more weed plants to a second location in which the weed seeds are detached from the one or more weed plants and deposited on or in a ground surface of the field;
based on applying the movement model to the weed plant map, generating a weed seed map that identifies one or more regions of the field having a number of weed seeds above a threshold; and
generating a control signal for a pre-emergence weed mitigation operation based on the one or more regions identified in the weed seed map.

2. The computer-implemented method of claim 1, wherein the weed plant map is based on one or more images of the field.

3. The computer-implemented method of claim 2, wherein the one or more images are obtained from a remote imaging sensor.

4. The computer-implemented method of claim 2, wherein the one or more images are obtained from an imaging sensor on an agricultural harvesting machine during a crop harvesting operation on the field.

5. The computer-implemented method of claim 2, and further comprising:
generating the weed plant map based on classifying the one or more images using plant attributes.

6. The computer-implemented method of claim 1, wherein the movement model is based on environmental data representing an environment of the field.

7. The computer-implemented method of claim 6, wherein the environment data represents weather conditions.

8. The computer-implemented method of claim 1, wherein the movement model is based on terrain data representing a terrain of the field.

9. The computer-implemented method of claim 8, wherein the terrain data represents at least one of a topology of the field or soil conditions of the field.

10. The computer-implemented method of claim 1, wherein the pre-emergence weed mitigation operation comprises a post-harvesting operation performed after the crop is harvested from the field.

11. The computer-implemented method of claim 10, wherein the pre-emergence weed mitigation operation comprises at least one of:
applying a chemical to the one or more regions on the field; or
performing a tilling operation that buries the weed seeds to a threshold depth.

12. The computer-implemented method of claim 1, wherein the pre-emergence weed mitigation operation is performed during a harvesting operation that harvests the crop from the field.

13. The computer-implemented method of claim 12, wherein the pre-emergence weed mitigation operation is performed by an agricultural harvesting machine.

14. The computer-implemented method of claim 1, wherein the movement model is based on machine data representing machine operating characteristics of an agricultural harvesting machine.

15. A computing system comprising:
at least one processor; and
memory storing instructions executable by the at least one processor, wherein the instructions, when executed, cause the computing system to:
identify a weed plant map of a field including a crop, the weed plant map identifying a plurality of weed areas on the field,
each weed area, of the plurality of weed areas, being defined in the weed plant map by a spatial boundary that identifies a relative position on the field of the weed area having weed plants;
generate a weed seed map, that maps weed seed locations on the field, by
applying a factor that represents movement of weed seeds from a first location on one or more weed plants to a second location in which the weed seeds are detached from the one or more weed plants and deposited on or in a ground surface of the field, and
identifying one or more regions of the field having a number of weed seeds above a threshold; and
generate a control signal for a pre-emergence weed mitigation operation based on the one or more regions identified in the weed seed map.

16. The computing system of claim 15, wherein the weed plant map is based on one or more images of the field.

17. The computing system of claim 15, wherein the instructions, when executed, cause the computing system to apply a weed seed movement model to determine the one or more regions.

18. The computing system of claim 17, wherein the weed seed movement model is based on at least one of:
environment data representing an environment of the field,
terrain data representing a terrain of the field, or
machine data representing machine operating characteristics.

19. A control system for an agricultural machine, the control system comprising:
a processor configured to:
obtain a weed map of a field including a crop, the weed map identifying a plurality of weed areas on the field,
each weed area, of the plurality of weed areas, being defined in the weed map by a spatial boundary that identifies a relative position on the field of the weed area having weed plants;
apply a movement model to the plurality of weed areas defined in the weed map, wherein the movement model represents movement of weed seeds from a first location on one or more weed plants to a second location in which the weed seeds are detached from the one or more weed plants and deposited on or in a ground surface of the field, and wherein the movement model is based on at least one of:
environment data representing an environment of the field,
terrain data representing a terrain of the field, or
machine data representing machine operating characteristics;
identify, based on applying the movement model to the weed map, one or more regions of the field having a number of weed seeds above a threshold; and
a controller configured to generate a control signal for a pre-emergence weed mitigation operation based on the one or more regions of the field.

* * * * *